(12) United States Patent
Keagy et al.

(10) Patent No.: US 8,533,305 B1
(45) Date of Patent: *Sep. 10, 2013

(54) SYSTEM AND METHOD FOR ADAPTING A SYSTEM CONFIGURATION OF A FIRST COMPUTER SYSTEM FOR HOSTING ON A SECOND COMPUTER SYSTEM

(75) Inventors: John Martin Keagy, San Francisco, CA (US); Jeffery Carr, San Francisco, CA (US); Paul Lappas, San Francisco, CA (US)

(73) Assignee: Gogrid, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/481,762

(22) Filed: May 25, 2012

Related U.S. Application Data

(63) Continuation of application No. 12/421,611, filed on Apr. 9, 2009, now Pat. No. 8,219,653.

(60) Provisional application No. 61/099,254, filed on Sep. 23, 2008, provisional application No. 61/140,838, filed on Dec. 24, 2008, provisional application No. 61/140,835, filed on Dec. 24, 2008, provisional application No. 61/145,962, filed on Jan. 20, 2009, provisional application No. 61/145,965, filed on Jan. 20, 2009, provisional application No. 61/159,437, filed on Mar. 11, 2009, provisional application No. 61/159,438, filed on Mar. 11, 2009.

(51) Int. Cl.
*G06F 15/16* (2006.01)

(52) U.S. Cl.
USPC .............................................. 709/222; 718/1

(58) Field of Classification Search
USPC .............................................. 709/222; 718/1
See application file for complete search history.

(56) References Cited

U.S. PATENT DOCUMENTS

| | | | |
|---|---|---|---|
| 6,985,937 | B1 | 1/2006 | Keshav et al. |
| 7,158,972 | B2 | 1/2007 | Marsland |
| 7,257,811 | B2 | 8/2007 | Hunt et al. |
| 7,321,893 | B1 | 1/2008 | Rambacher et al. |
| 7,383,327 | B1 | 6/2008 | Tormasov et al. |
| 7,392,403 | B1 | 6/2008 | Munetoh |
| 7,398,471 | B1 | 7/2008 | Rambacher et al. |
| 7,421,533 | B2 | 9/2008 | Zimmer et al. |

(Continued)

OTHER PUBLICATIONS

U.S. Appl. No. 11/834,722, filed Aug. 7, 2007, Lappas, Paul, et al.

(Continued)

*Primary Examiner* — Alina N Boutah
*Assistant Examiner* — Adam Cooney
(74) *Attorney, Agent, or Firm* — Adeli & Tollen LLP

(57) ABSTRACT

Some embodiments provide a method for a server hosting environment having several nodes. Each node is for using one or more hypervisors in order to host several configurations of several computer systems. The method receives a first configuration of a computer system. The first configuration includes an operating system that directly accesses hardware of the computer system. The method generates a second configuration that is based on the first configuration. The second configuration includes the first configuration modified to be operable on a particular hypervisor of a particular node in the several nodes. The method installs the second configuration on the particular node in order to allow the particular node to operate on the second configuration in conjunction with the particular hypervisor. The second configuration accesses a set of virtual hardware provided by the particular hypervisor.

20 Claims, 32 Drawing Sheets

(56) References Cited

U.S. PATENT DOCUMENTS

| | | | |
|---|---|---|---|
| 7,512,815 B1 | 3/2009 | Munetoh | |
| 7,519,696 B2 | 4/2009 | Blumenau et al. | |
| 7,536,541 B2 | 5/2009 | Isaacson | |
| 7,577,722 B1 | 8/2009 | Khandekar et al. | |
| 7,587,492 B2 | 9/2009 | Dyck et al. | |
| 7,702,843 B1 | 4/2010 | Chen et al. | |
| 7,716,446 B1 | 5/2010 | Chen et al. | |
| 7,730,486 B2 | 6/2010 | Herington | |
| 7,743,107 B2 | 6/2010 | Kovacs et al. | |
| 7,757,231 B2 | 7/2010 | Anderson et al. | |
| 7,783,856 B2 * | 8/2010 | Hashimoto et al. | 711/173 |
| 7,802,251 B2 * | 9/2010 | Kitamura | 718/1 |
| 7,814,495 B1 | 10/2010 | Lim et al. | |
| 7,827,294 B2 * | 11/2010 | Merkow et al. | 709/229 |
| 7,840,964 B2 | 11/2010 | Schoenberg et al. | |
| 7,843,821 B2 | 11/2010 | Kunhappan et al. | |
| 7,856,549 B2 | 12/2010 | Wheeler | |
| 7,865,893 B1 | 1/2011 | Omelyanchuk et al. | |
| 7,912,955 B1 * | 3/2011 | Machiraju et al. | 709/226 |
| 7,917,811 B2 | 3/2011 | Yamamoto | |
| 7,925,850 B1 | 4/2011 | Waldspurger et al. | |
| 7,941,470 B2 | 5/2011 | Le et al. | |
| 7,962,496 B2 * | 6/2011 | Gu et al. | 707/756 |
| 7,970,917 B2 * | 6/2011 | Nakano et al. | 709/229 |
| 7,979,863 B2 | 7/2011 | Esfahany et al. | |
| 7,987,289 B2 | 7/2011 | Mason et al. | |
| 7,996,835 B2 | 8/2011 | Griffith et al. | |
| 8,006,079 B2 | 8/2011 | Goodson et al. | |
| 8,032,899 B2 | 10/2011 | Archer et al. | |
| 8,037,280 B2 | 10/2011 | Pandey et al. | |
| 8,046,694 B1 | 10/2011 | Lappas et al. | |
| 8,095,662 B1 | 1/2012 | Lappas et al. | |
| 8,095,931 B1 | 1/2012 | Chen et al. | |
| 8,117,495 B2 | 2/2012 | Graham et al. | |
| 8,127,290 B2 | 2/2012 | Suit | |
| 8,146,079 B2 | 3/2012 | Gupta et al. | |
| 8,161,479 B2 | 4/2012 | Sedukhin et al. | |
| 8,171,485 B2 | 5/2012 | Muller | |
| 8,184,631 B2 | 5/2012 | Kunhappan et al. | |
| 8,209,684 B2 | 6/2012 | Kannan et al. | |
| 8,219,653 B1 | 7/2012 | Keagy et al. | |
| 8,275,885 B2 | 9/2012 | Hu et al. | |
| 8,280,790 B2 | 10/2012 | Lappas et al. | |
| 8,352,608 B1 | 1/2013 | Keagy et al. | |
| 8,364,802 B1 | 1/2013 | Keagy et al. | |
| 8,374,929 B1 | 2/2013 | Lappas et al. | |
| 2003/0159028 A1 * | 8/2003 | Mackin et al. | 713/100 |
| 2004/0143664 A1 | 7/2004 | Usa et al. | |
| 2004/0145605 A1 | 7/2004 | Basu et al. | |
| 2005/0120160 A1 | 6/2005 | Plouffe et al. | |
| 2005/0216920 A1 | 9/2005 | Tewari et al. | |
| 2006/0089995 A1 | 4/2006 | Kerr et al. | |
| 2006/0136761 A1 | 6/2006 | Frasier et al. | |
| 2006/0168224 A1 | 7/2006 | Midgley | |
| 2006/0174087 A1 | 8/2006 | Hashimoto et al. | |
| 2006/0184653 A1 | 8/2006 | van Riel | |
| 2006/0195715 A1 | 8/2006 | Herington | |
| 2007/0028239 A1 | 2/2007 | Dyck et al. | |
| 2007/0043860 A1 | 2/2007 | Pabari | |
| 2007/0050763 A1 | 3/2007 | Kagan et al. | |
| 2007/0074208 A1 | 3/2007 | Ling et al. | |
| 2007/0136042 A1 | 6/2007 | Grose et al. | |
| 2007/0174429 A1 | 7/2007 | Mazzaferri et al. | |
| 2007/0233838 A1 | 10/2007 | Takamoto et al. | |
| 2007/0234302 A1 | 10/2007 | Suzuki et al. | |
| 2007/0250608 A1 | 10/2007 | Watt | |
| 2007/0260721 A1 | 11/2007 | Bose et al. | |
| 2007/0266433 A1 | 11/2007 | Moore | |
| 2007/0271560 A1 | 11/2007 | Wahlert et al. | |
| 2007/0283348 A1 | 12/2007 | White | |
| 2007/0297428 A1 | 12/2007 | Bose et al. | |
| 2008/0028410 A1 | 1/2008 | Cherkasova et al. | |
| 2008/0033902 A1 | 2/2008 | Glaizel et al. | |
| 2008/0049786 A1 * | 2/2008 | Ram et al. | 370/468 |
| 2008/0059556 A1 | 3/2008 | Greenspan et al. | |
| 2008/0065854 A1 | 3/2008 | Schoenberg et al. | |
| 2008/0086726 A1 | 4/2008 | Griffith et al. | |
| 2008/0104608 A1 | 5/2008 | Hyser et al. | |
| 2008/0148300 A1 | 6/2008 | Archer et al. | |
| 2008/0163210 A1 | 7/2008 | Bowman et al. | |
| 2008/0201414 A1 | 8/2008 | Amir Husain et al. | |
| 2008/0244600 A1 | 10/2008 | Wong et al. | |
| 2008/0301674 A1 | 12/2008 | Faus | |
| 2008/0320561 A1 | 12/2008 | Suit et al. | |
| 2008/0320583 A1 | 12/2008 | Sharma et al. | |
| 2009/0016220 A1 | 1/2009 | Uysal et al. | |
| 2009/0024994 A1 | 1/2009 | Kannan et al. | |
| 2009/0049453 A1 | 2/2009 | Baran et al. | |
| 2009/0063750 A1 | 3/2009 | Dow | |
| 2009/0172662 A1 | 7/2009 | Liu | |
| 2009/0228883 A1 | 9/2009 | Gebhart et al. | |
| 2009/0235067 A1 | 9/2009 | Miller et al. | |
| 2009/0265707 A1 | 10/2009 | Goodman et al. | |
| 2009/0300210 A1 | 12/2009 | Ferris | |
| 2009/0328030 A1 | 12/2009 | Fries | |
| 2010/0058106 A1 | 3/2010 | Srinivasan et al. | |
| 2010/0070970 A1 | 3/2010 | Hu et al. | |
| 2010/0082799 A1 * | 4/2010 | DeHaan et al. | 709/224 |
| 2010/0138828 A1 * | 6/2010 | Hanquez et al. | 718/1 |
| 2010/0235831 A1 | 9/2010 | Dittmer | |
| 2011/0153697 A1 * | 6/2011 | Nickolov et al. | 707/827 |

OTHER PUBLICATIONS

U.S. Appl. No. 11/834,732, filed Aug. 7, 2007, Lappas, Paul, et al.
U.S. Appl. No. 11/834,768, filed Aug. 7, 2007, Lappas, Paul, et al.
U.S. Appl. No. 12/421,597, filed Apr. 9, 2009, Keagy, John Martin, et al.
U.S. Appl. No. 12/421,599, filed Apr. 9, 2009, Keagy, John Martin, et al.
U.S. Appl. No. 12/421,604, filed Apr. 9, 2009, Keagy, John Martin, et al.
U.S. Appl. No. 12/421,605, filed Apr. 9, 2009, Keagy, John Martin, et al.
U.S. Appl. No. 12/421,608, filed Apr. 9, 2009, Keagy, John Martin, et al.
U.S. Appl. No. 12/421,610, filed Apr. 9, 2009, Keagy, John Martin, et al.
U.S. Appl. No. 12/421,612, filed Apr. 9, 2009, Keagy, John Martin, et al.
U.S. Appl. No. 12/421,613, filed Apr. 9, 2009, Keagy, John Martin, et al.
U.S. Appl. No. 12/421,614, filed Apr. 9, 2009, Keagy, John Martin, et al.
U.S. Appl. No. 12/652,730, filed Jan. 5, 2010, Lappas, Paul, et al.
U.S. Appl. No. 12/982,487, filed Dec. 30, 2010, Lappas, Paul, et al.
U.S. Appl. No. 13/225,372, filed Sep. 2, 2011, Lappas, Paul, et al.
U.S. Appl. No. 13/316,431, filed Dec. 9, 2011, Lappas, Paul, et al.
U.S. Appl. No. 13/607,642, filed Sep. 9, 2012, Lappas, Paul et al.
Portions of Prosecution history of U.S. Appl. No. 12/421,610, filed Jul. 3, 2013, Keagy, John Martin, et al.
Portions of prosecution history of U.S. Appl. No. 12/421,611, filed Jun. 7, 2012 Keagy, John Martin, et al.
Portions of prosecution history of U.S. Appl. No. 12/421,612, filed Feb. 7, 2012 Keagy, John Martin, et al.
Portions of prosecution history of U.S. Appl. No. 12/421,613, filed Jan. 17, 2013 Keagy, John Martin, et al.
Portions of prosecution history of U.S. Appl. No. 12/421,614, filed Jan. 3, 2013 Keagy, John Martin, et al.
Author Unknown, "Introduction to VMware Infrastructure: ESX Server 3.5, ESX Server 3i version 3.5, VirtualCenter 2.5," Dec. 2007, Revision: 20071213, pp. 1-46, VMware, Inc., Palo Alto, CA, USA.
Author Unknown, iSCSI SAN Configuration Guide: ESX Server 3.5, ESX Server 3i version 3.5, VirtualCenter 2.5, Nov. 2007, Revision: 20071129, 134 pages, VMware, Inc., Palo Alto, CA, USA.
Author Unknown, "VMware Infrastructure 3 Primer: ESX Server 3.5, ESX Server 3i version 3.5, VirtualCenter 2.5," Nov. 2007, Revision: 20071129, 22 pages, VMware, Inc., Palo Alto, CA, USA.
Author Unknown, "Virtual Machine Backup Guide: Esx Server 3.5, Esx Server 3i version 3.5, VirtualCenter 2.5," Nov. 2007, Revision 20071129, 78 pp., VMware, Inc., Palo Alto, Ca, Usa.
Author Unknown, "Virtual Machine Mobility Planning Guide," Oct. 2007, Revision 20071018, 33 pages, VMware, Inc., Palo Alto, CA, USA.
Author Unknown, "Parallels Server Transporter Guide," Month Unknown, 2008, pp. 1- 101, Parallels Software International Inc.

* cited by examiner

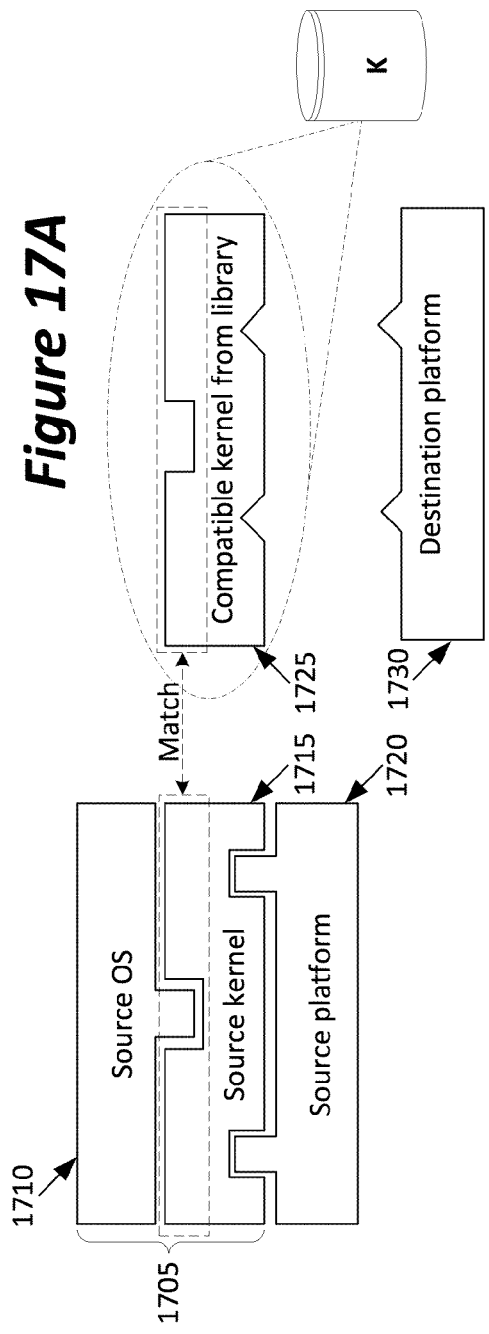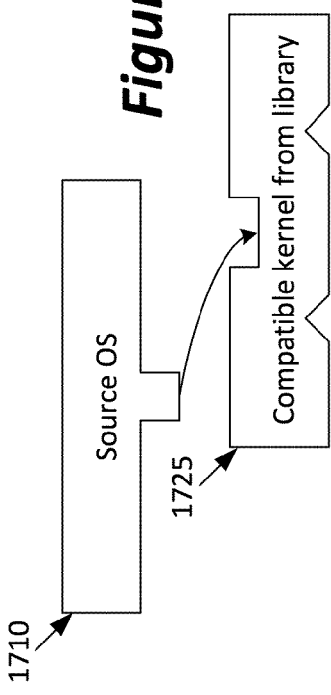
*Figure 17A*
*Figure 17B*

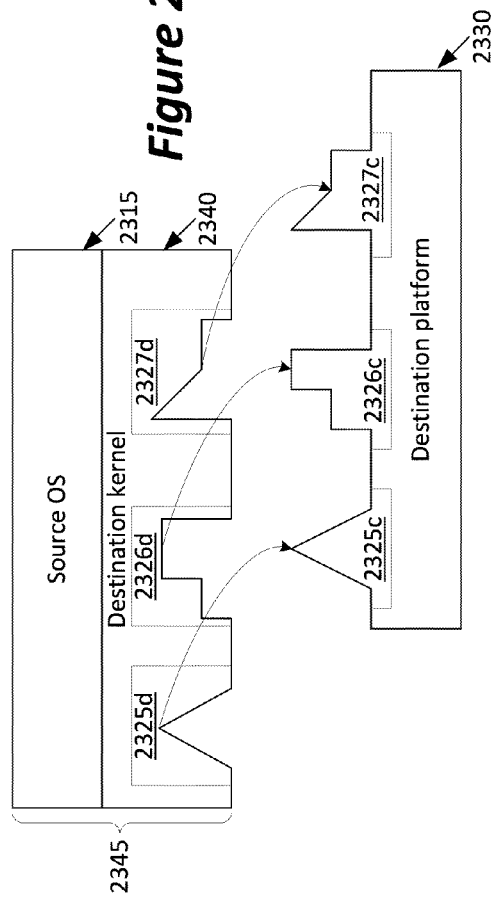
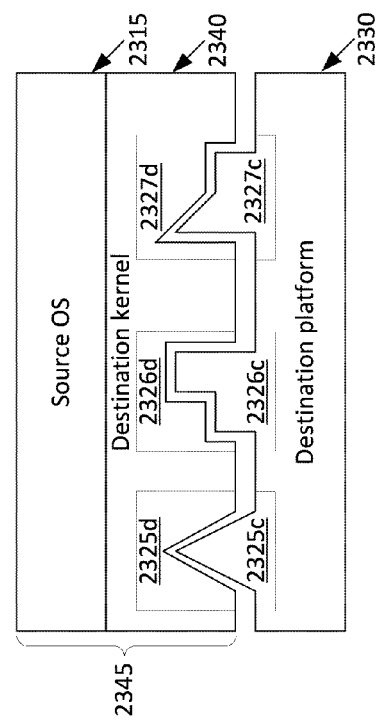

SYSTEM AND METHOD FOR ADAPTING A SYSTEM CONFIGURATION OF A FIRST COMPUTER SYSTEM FOR HOSTING ON A SECOND COMPUTER SYSTEM

CLAIM OF BENEFIT TO PRIOR APPLICATION

This patent application is a continuation application of U.S. patent application Ser. No. 12/421,611, filed Apr. 9, 2009, now issued as U.S. Pat. No. 8,219,653. U.S. patent application Ser. No. 12/421,611 claims the benefit of the U.S. Provisional Patent Application 61/099,254, entitled "System and Method for Automated Allocation and Configuration of Hosted Services", filed Sep. 23, 2008, the U.S. Provisional Patent Application 61/140,838, entitled "System and Method for Automated Allocation and Configuration of Hosted Services", filed Dec. 24, 2008, the U.S. Provisional Patent Application 61/140,835, entitled "Method and Apparatus for Adapting and Hosting a Configuration of a Computer System", filed Dec. 24, 2008, the U.S. Provisional Patent Application 61/145,962, entitled "System and Method for Automated Allocation and Configuration of Hosted Services", filed Jan. 20, 2009, the U.S. Provisional Patent Application 61/145,965, entitled "Method and Apparatus for Adapting and Hosting a Configuration of a Computer System", filed Jan. 20, 2009, the U.S. Provisional Patent Application 61/159,437, entitled "System and Method for Automated Allocation and Configuration of Hosted Services", filed Mar. 11, 2009, and the U.S. Provisional Patent Application 61/159,438, entitled "Method and Apparatus for Adapting and Hosting a Configuration of a Computer System", filed Mar. 11, 2009. All of the above enumerated Provisional Patent Applications and U.S. patent application Ser. No. 12/421,611, now issued as U.S. Pat. No. 8,219,653, are incorporated herein by reference.

FIELD OF THE INVENTION

The present invention relates to adapting a configuration that is operable on a first platform of a first computer system to be operable on a second platform of a second computer system.

BACKGROUND OF THE INVENTION

Modern day computer systems have many levels of complexity over computer systems of the past. Traditionally, a computer system included a hardware layer and a system configuration for interfacing with the hardware layer. A system configuration includes an operating system with a kernel layer on top of the hardware layer and interface application programs that facilitate operations of the operating system. Furthermore, the system configuration defines individualized user settings that customize each of these software components per user specifications. For example, the system configuration includes firewall settings for a firewall application of the operating system and display presentation settings for the graphical interface of the operating system.

However, advancements in the field of virtualization have begun to blur the distinction between hardware and software. Through virtualization, a virtualization engine (also referred to as a "hypervisor") emulates the hardware layer as distributable sets of "virtual" hardware. The hypervisor can then allocate each set of virtual hardware to different system configurations, thus allowing multiple distinct system configurations to reside on a single computer system.

As shown in FIG. 1, virtualization allows a single computing device 110 the ability to function as two or more different computing devices, with each device having a distinct set of virtual hardware and a distinct system configuration. For instance, system configuration 120 may be allocated 40% of the memory and 80% of the processor cycles of the device 110 and system configuration 130 may be allocated the remaining 60% of the memory and 20% of the processor cycles of the device 110. Additionally, the system configuration 120 may operate using a first operating system with a first set of configuration parameters and the system configuration 130 may operate using a second operating system with a second set of configuration parameters.

An added benefit of virtualization is that a failure in one set of virtual hardware or system configuration does not disrupt the operation of the other set of virtual hardware or system configurations, even though the virtual hardware and the system configurations operate over physical resources of a single device. With reference to FIG. 1, should any piece of the system configuration 120 crash due to an improper setting, the system configuration 130 will continue operating unhindered as the resources used by each system configuration 120 or system configuration 130 operate independent of one another.

At the core of each virtualization solution is the hypervisor. The hypervisor manages a logical partitioning of a physical set of hardware resources of a physical device, or "platform," between different virtualized "guests" (e.g., configurations). Each virtualized guest implements one or more virtual machines over a logical partition. The hypervisor partitions underlying hardware resources such that each virtual machine is provided what logically appears as a distinct and unshared set of hardware resources. However, the hypervisor maps the virtual machine hardware calls to a corresponding subset of physical hardware resources that are actually shared by all virtual machines operating on a particular hardware platform.

The hypervisor is thus responsible for mapping the hardware resources of a platform to a set of virtual resources that can then be distributed independently to one or more system configurations that together form the one or more virtual machines. In this manner, each virtual machine effectively is provided its own resources (e.g., a processor, memory, block device/disk storage, networking, etc.), and the operating system of each virtual machine operates with little to no change over the provided set of resources.

Different vendors implement hypervisors differently (e.g., Xen®, Parallels®, VMware®, Kernel Virtual Machine® ("KVM"), etc.). Specifically, two prominent hypervisor types are defined as "type 1" hypervisors and "type 2" hypervisors, which are further described with reference to FIG. 2.

FIG. 2 illustrates several different platforms (both virtual and physical) on which a system configuration can operate. FIG. 2 shows a computer system 200 having a system configuration 205 and a platform 210. The system configuration 205 includes a kernel layer 235 and operating system and application layers 240. The system configuration 205 may include a set of device drivers that allow hardware devices of the platform 210 to communicate with the kernel 235, the operating system, and/or the applications of the system configuration 205.

FIG. 2 also illustrates three different types of platforms 210 in three exploded views 250a-c. The first exploded view 250a illustrates a platform 210a of a "traditional" computer system (i.e., a computer system with no hypervisors). This platform 210a includes only the physical hardware 215 of the computer system. Thus, the configuration 205 directly interfaces with the physical hardware 215 of the computer system 200.

The second exploded view 250b illustrates a platform 210b of a computer system in which a type 1 hypervisor 255 is present. The type 1 hypervisor 255 interfaces with the physical hardware of the computer, and provides a set of virtual hardware to the system configuration 205. Thus, the system configuration 205 interfaces with the virtual hardware provided by the type 1 hypervisor 255, which itself directly accesses the physical hardware 215 of the computer system 200.

The third exploded view 250c illustrates a platform 210c of a computer system in which a type 2 hypervisor 230 is present. The platform 210 includes a "host" kernel layer 220 on top of the physical hardware 215 and a "host" operating system 225 on top of the host kernel layer 220. This platform 210 also includes an application layer (not shown) on top of the operating system layer. Additionally, the platform 210 includes a type 2 hypervisor 230, which interfaces with the host operating system 225. This type 2 hypervisor 230 may be one of the applications in the application layer (not shown) on top of the host operating system 225. The type 2 hypervisor 230 is allocated a set of the physical resources 215 by the host operating system 225. Accordingly, the system configuration 205 interfaces with virtual hardware provided by the type 2 hypervisor 230, which itself receives a set of hardware resources from the host operating system 225.

The computer system shown in the exploded view 250c may be considered a "traditional" computer system (e.g., a traditional computer system as shown in the exploded view 250a) with the type 2 hypervisor 230 as one of the applications in the application layer. In other words, the computer system of this exploded view 250c may be considered a traditional computer system with system configurations "stacked" on one another.

Hosting services allow users to implement their system configurations (e.g., system configuration 205) on remote computer systems without the pitfalls associated with owning and maintaining the hardware platforms on which the system configurations run. These pitfalls include overhead costs associated with purchasing, upgrading, and/or maintaining equipment and software needed to implement the system configuration. Instead of a user burdening him or herself with these headaches, a hosting service provider maintains and provisions a grid of hardware nodes that are shared amongst multiple users. More specifically, resources of a single node can be partitioned and each of these partitions can be allocated to a virtual server configuration of a different user.

In order to host a system configuration, some hosting systems allow a user to set up the system configuration "from scratch." In other words, the user selects one operating system from multiple different operating systems. The user can then custom configure the operating system by changing configuration parameters or by installing other interface applications to run in conjunction with the operating system. This methodology is problematic, however, when the user already has set up his or her system configuration on another computer (e.g., his or her own home computer, or another hosting service) and wants to host it at the hosting system.

Therefore, there is a need in the art for a method of adapting a system configuration of a computer system in order to host the system configuration in a server hosting environment. There is further a need to adapt a system configuration that is hosted in one server hosting environment in order to host the system configuration in a different server hosting environment.

BRIEF DESCRIPTION OF THE DRAWINGS

FIGS. 17A-17D conceptually illustrate a process that replaces a kernel of a system configuration with a compatible kernel found in a library that stores kernels.

FIGS. 23A-23D conceptually illustrate a process that imports a set of device drivers into a system configuration.

SUMMARY OF THE INVENTION

Figure 1:
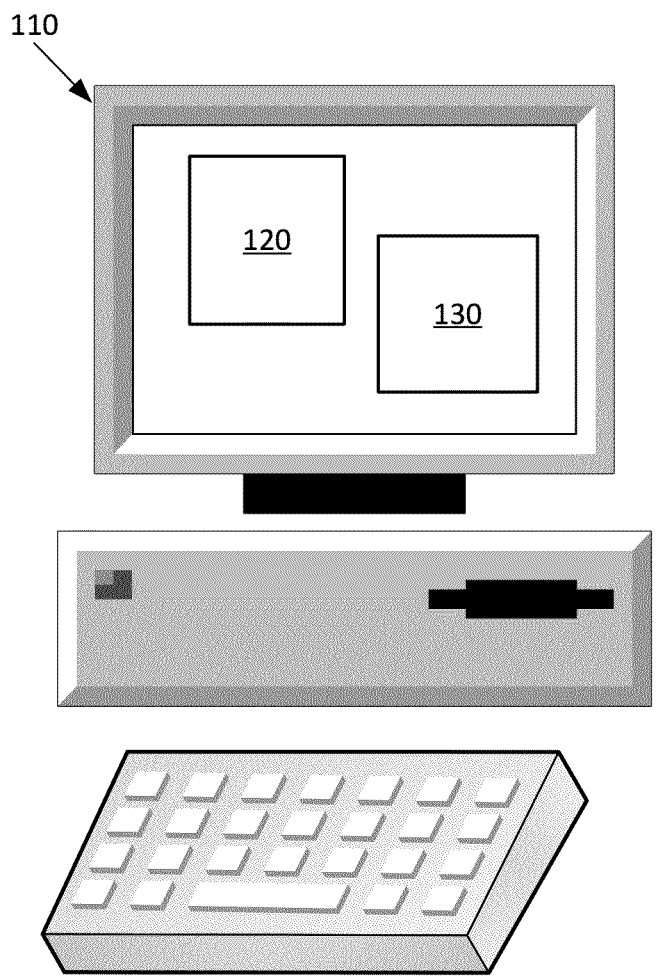
FIG. 1 illustrates a computer system that runs two different system configurations simultaneously.

Some embodiments provide an adaptation engine for adapting a system configuration that is operating as a virtual machine on a first computer system hosting one or more virtual machines to operate as a virtual machine on a second computer system hosting one or more virtual machines. The system configuration of some embodiments includes an operating system, a kernel, a set of drivers, and user specified configuration settings for these software components of the system configuration. In some embodiments, a virtualization engine (e.g., a "hypervisor") interfaces with a set of physical hardware components (e.g., memory, processor, hard drive, network card, etc.) of a computer system and provides a set of virtual hardware that the system configuration interfaces with in order to implement the user virtual machine.

Some embodiments provide a method for adapting a system configuration that is operating directly on a first computer system to allow the system configuration to operate as a virtual machine on a second computer system hosting one or more virtual machines. In some such embodiments, the system configuration directly accesses one or more physical hardware components of the first computer system. More specifically, the system configuration includes an operating system and/or kernel that directly accesses (e.g., using a set of device drivers that correspond to the one or more hardware components) the one or more physical hardware components of the first computer system. In other words, the system configuration does not access the one or more physical hardware components of the first computer system as a set of virtualized hardware where the set of virtualized hardware is managed by a virtualization engine.

Some embodiments provide a method for adapting a system configuration operating in a first hosting environment to operate in a second hosting environment. The second hosting environment, which hosts the adapted system configuration, is separate from the first hosting environment (e.g., operated by a different hosting system).

In order to adapt a system configuration operating on a first machine to be operable on a second machine, some embodiments replace an original (or "source") kernel of the system configuration with a new ("destination") kernel. In some embodiments, this replacement is performed automatically by the adaptation engine (e.g., a software module running on the second machine) without human intervention. Each of these kernels provides an interface between an operating system of the system configuration and a set of hardware components (either virtual or physical) of a machine on which the system configuration operates. In some embodiments, the new kernel includes the same interface to the operating system of the system configuration as the original kernel, but a different interface to hardware. In other words, the new kernel includes an interface to a set of hardware components of the second machine, while the original kernel includes an interface to a set of hardware components of the first machine.

In some embodiments, replacing a kernel of a source kernel includes retrieving a destination kernel from a library that stores multiple kernels. Additionally, in some embodiments, replacing a source kernel includes modifying one or more components (e.g., one or more core libraries, such as a C library or a device manager) of the source kernel.

In lieu of, or in addition to, replacing a kernel of a system configuration, some embodiments import one or more device drivers into the system configuration. In some embodiments, this importing of device drivers is performed automatically by the adaptation engine without human intervention. The imported device drivers each correspond to one or more hardware components (either virtual or physical) of the second machine.

In some embodiments, one or more of the device drivers are previously generated (e.g., by a manufacturer of the device to which the device driver corresponds). Some other embodiments automatically generate one or more of the device drivers through a development environment of an operating system and kernel of the system configuration. Still other embodiments generate the device driver(s) through a driver application programming interface ("API") based on (1) an operating system of the system configuration and (2) the hardware components of the second machine. The generated device drivers replace corresponding drivers (e.g., drivers of the same device type) in the source system configuration.

Some embodiments provide a method for determining whether to replace a kernel or to import a set of device drivers, as mentioned above, in order to adapt a system configuration that is operable on a first machine to be operable on a second machine. The method analyzes a set of attributes of the system configuration (e.g., operating system and/or kernel of the system configuration) in order to make the determination. Based on one or more of these attributes, the method determines that the system configuration can be imported in order to adapt the system configuration to be operable on the second machine by (1) replacing the kernel of the system configuration and/or (2) importing one or more device drivers into the system configuration.

Some embodiments provide an extraction engine that extracts attributes of a system configuration that operates on a first machine (either on a virtual machine or directly on a computer system) in order to allow the system configuration to be adapted to operate on a second machine. The extraction engine of some embodiments analyzes the system configuration in order to determine relevant attributes (e.g., operating system, kernel version, device drivers, number of hard drives, number of processors, IP address, hostname, etc.). Additionally, the extraction engine of some embodiments provides these attributes to the adaptation engine, which adapts the system configuration to be operable on the second machine. In some embodiments, the extraction engine provides an entire file system of the system configuration (e.g., some or all contents of storage devices used by the configuration) to the adaptation engine.

In some embodiments, the first machine locally runs an extraction engine that analyzes and extracts the system configuration of the first machine. In some other embodiments, a remote extraction engine analyzes and extracts the system configuration of the first machine where the remote extraction engine is an engine that runs on a different machine that is separate from the first machine. The remote extraction engine remotely accesses the first machine through a network (e.g., the Internet).

Some embodiments utilize a library that stores information as to customized settings of operating systems, kernels, drivers, development environments, and/or kernel driver APIs in order to adapt a system configuration operating on a first machine (either on a virtual machine or directly on a computer system) to be operable on a second machine. In some embodiments, the configuration information stored in the library is used by one or more of the processes described above (e.g., replacing a kernel of the system configuration, importing a set of device drivers into the system configuration, etc.). The library of some embodiments is adaptive. In other words, information that is generated when adapting a system configuration that is operable on a first machine to be operable on a second machine can be stored in the library. This stored information can then be retrieved and reused at a later time, instead of necessitating that the same information be generated again if it is needed again.

DETAILED DESCRIPTION OF THE INVENTION

In the following description, numerous details are set forth for purpose of explanation. However, one of ordinary skill in the art will realize that the invention may be practiced without the use of these specific details. For instance, well-known structures and devices are shown in block diagram form in order not to obscure the description of the invention with unnecessary detail.

I. Overview

Some embodiments provide a method for adapting a system configuration that is operable on a first platform (also referred to as a "source" platform) to operate on a second platform (also referred to as a "destination" platform). The system configuration includes an operating system with a kernel, device drivers, and interface applications of the operating system that facilitate operations of the operating system. Additionally, the system configuration includes user settings that customize the look, behavior, and operations of the operating system, kernel, device drivers, or interface applications. Accordingly, the adaptation performed by some embodiments occurs relative to a user's actual machine configuration. This is in contrast to adapting "clean" versions of an operating system, kernel, device drivers, and interface applications whereby a user has to reapply all previously applied custom settings in order for the adapted destination system configuration to operate in the same manner as the user's source system configuration.

Figure 3:
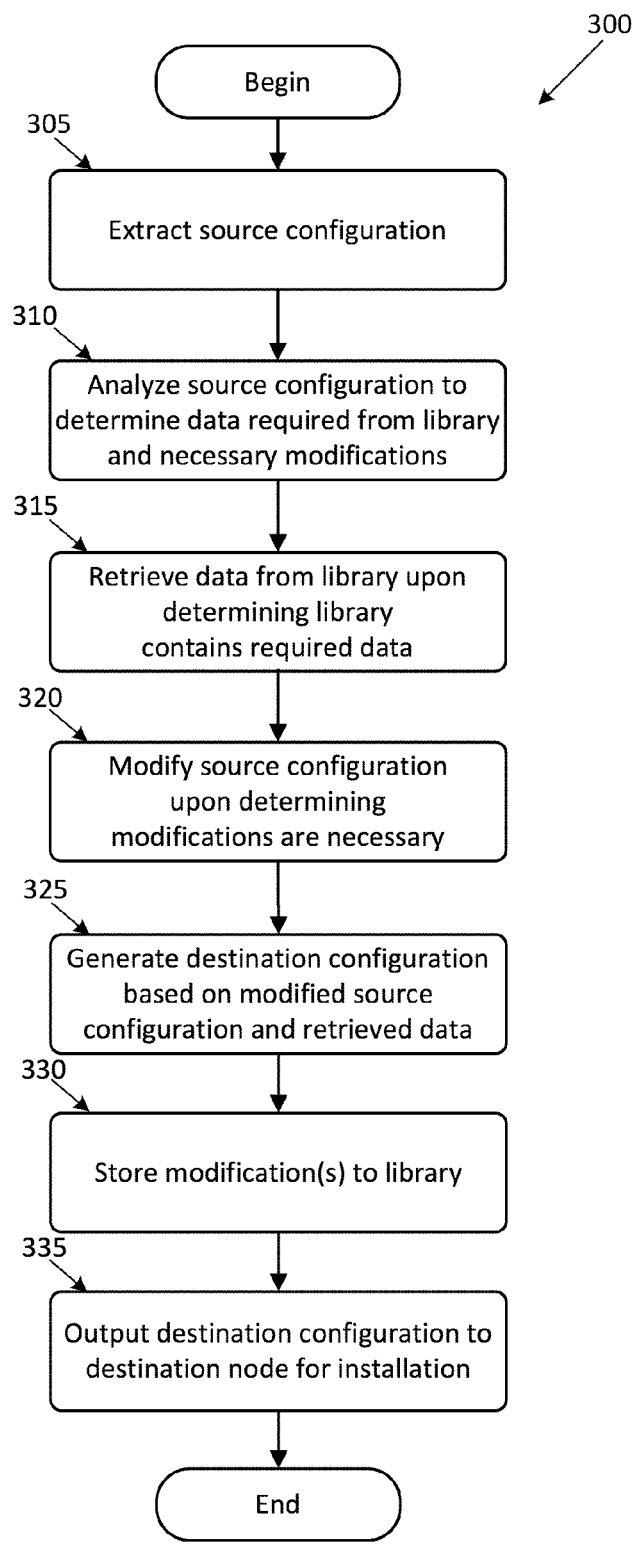
FIG. 3 illustrates a process that extracts a source system configuration and generates a destination system configuration based on the source system configuration.

FIG. 3 illustrates a process 300 by which some embodiments adapt a system configuration that is operable on a source platform with a first set of hardware resources (physical and/or virtual hardware resources) to allow the system configuration to operate on a destination platform with a different second set of hardware resources (physical and/or virtual hardware resources).

The process 300 begins by extracting (at 305) the source system configuration from the source platform. As further described below with reference to FIGS. 9-12, in some embodiments, the source platform locally runs an extraction engine that extracts the system configuration from the first platform, while in other embodiments, a remote extraction engine (i.e., an engine that runs on a platform that is separate from the source platform) extracts the system configuration from the source platform. The remote extraction engine of some embodiments accesses the source platform through a network (e.g., the Internet). The remote extraction engine optionally performs an authentication procedure (e.g., provides a log-in name and/or password) that indicates to the source platform that the remote extraction engine is authorized to access the source platform. In some embodiments, the extraction engine extracts an entire file system of the system configuration (e.g., entire contents of a set of storage devices used by the system configuration) to a data store for later analysis. In some other embodiments, the extraction engine extracts only necessary elements for a system configuration.

The process 300 analyzes (at 310) the extracted source system configuration. This analysis (at 310) determines whether any additional data is required from a library (e.g., the library 790 of FIG. 7, which is further described below) that stores information (e.g., operating systems, kernels, drivers, etc.) used for adapting system configurations to be operable on the destination platform. In some embodiments, this analysis (at 310) also determines what modifications (if any) are necessary to the source system configuration in order to adapt the source system configuration to be operable on the destination platform. For example, adapting the source system configuration may require modifying the operating system layer, the kernel layer, or the device driver layer of the source system configuration. Upon determining (at 310) that required data is present in the library, the process 300 retrieves (at 315) the necessary data. The library of some embodiments and its contents are further described in more detail below.

The process 300 then modifies (at 320) the source system configuration and/or the data retrieved from the library. As noted above, modifying the source system configuration and/or data includes modifying a kernel and/or operating system of the source system configuration. For example, some embodiments replace an original kernel of the system configuration with a new kernel. The new kernel includes the same interface to the operating system of the system configuration as the original kernel, but a different interface to hardware. In other words, the new kernel includes an interface to a set of hardware components of the destination platform, while the original kernel includes an interface to a set of hardware components of the source platform. In some embodiments, the new kernel is a kernel that was modified (at 320), while in some embodiments, the new kernel is a kernel that was retrieved (at 315) from the library.

Some embodiments modify the source system configuration by importing one or more device drivers into the system configuration. The imported device drivers each correspond to one or more hardware components (either virtual or physical) of the destination platform. In some embodiments, one or more of the device drivers are previously generated (e.g., by a manufacturer of the device to which the device driver corresponds). Such drivers may have been previously retrieved (at 315) from the library. Other embodiments generate one or more of the device drivers (e.g., through a development environment of a kernel and operating system of the system configuration, or through a driver application programming interface ("API"), both of which may be retrieved (at 315) from the library) based on (1) an operating system of the system configuration and (2) the hardware components of the destination platform.

Some embodiments provide a method for determining whether to replace a kernel and/or to import a set of device drivers, as mentioned above, in order to adapt the system configuration be operable on the destination platform. The method of some embodiments analyzes a set of attributes of the system configuration (e.g., operating system and/or kernel of the system configuration) in order to make the determination. In some embodiments, this set of attributes is provided by an extraction engine, as discussed above. Based on one or more of these attributes, the method of some embodiments determines that the system configuration can be imported in order to adapt the system configuration to be operable on the second platform by (1) replacing the kernel of the system configuration and/or (2) importing one or more device drivers into the system configuration.

Using the modifications and/or information from the library, the process 300 generates (at 325) a destination system configuration that is operable on the destination platform. In some embodiments, the library from which data is retrieved (at 320) is an adaptive library. In some of these embodiments, the process 300 stores (at 330) any modifications that were made (at 315) into the adaptive library. This stored information can then be retrieved at a later time, instead of necessitating that the same information be generated again if it is needed again. In this way, the adaptive library is constantly growing as it "learns" new information about adaptation processes. Future adaptation processes thus occur more quickly, as information that was generated through a previous adaptation process is retrieved from the adaptive library. The adaptive library of some embodiments is further described below in Section V.

The process 300 then outputs (at 335) the destination system configuration to the destination platform for installation on the destination platform. Finally, the process 300 ends.

Figure 2:
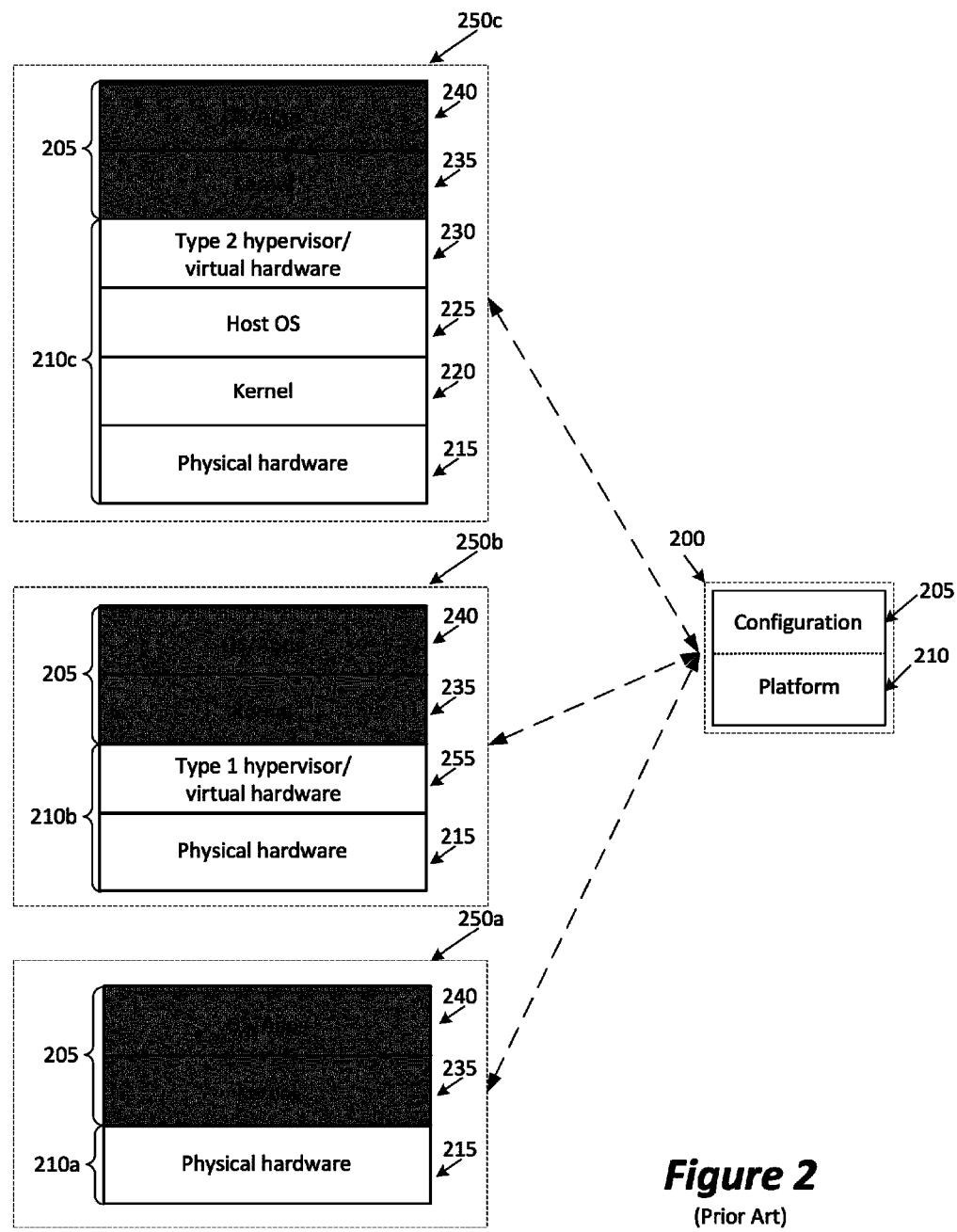
FIG. 2 illustrates different examples of platforms that may be present on a computer system.

As discussed above with reference to FIG. 2, a system configuration includes (1) an operating system, (2) a kernel, (3) a set of device drivers, and/or (4) a set of interface application programs that operate in conjunction with the operating system. In some embodiments, a system configuration does not include one or more of these software elements. In some embodiments, the system configuration includes other software elements not specifically enumerated above.

Also as discussed above with reference to FIG. 2, a "platform," or a "machine," includes (1) physical hardware of a computer system and/or (2) a virtualization engine that provides a set of virtual hardware components to the system configuration. A virtualization engine of some embodiments includes a type 1 hypervisor that accesses (or "resides on") physical hardware of a computer system, and/or a type 2 hypervisor that resides on a host operating system and kernel of a computer system (which itself accesses physical hardware of the computer system).

A system configuration that operates on physical hardware of a computer system directly accesses one or more hardware components (e.g., memory, central processing unit "(CPU")", hard drive, etc.) of the computer system. On the other hand, a system configuration of some embodiments that operates on a hypervisor (either type 1 or type 2) does not directly access one or more hardware components of the computer system. Rather, the system configuration accesses a set of virtual hardware components that are managed by the hypervisor.

In some embodiments, a platform (e.g., the source platform and/or the destination platform) is a node in a grid of nodes (e.g., a node in a server hosting environment). In other embodiments, a platform is a single desktop computer system that is not a node in the grid of nodes.

Some embodiments adapt a source system configuration operable on any type of platform (e.g., any of the three types of platforms 250a-c described above with reference to FIG. 2) such that it is made operable on any type of platform (e.g., any of the three types of platforms mentioned above with reference to FIG. 2), including the same type of platform. For example, some embodiments adapt a system configuration that is operable on physical hardware of a source computer system to be operable on a type 1 hypervisor that operates on physical hardware of a destination computer system. Additionally, some embodiments adapt a system configuration that is operable on a type 1 hypervisor that operates on physical hardware of a source computer system to be operable on a type 1 hypervisor that operates on physical hardware of a destination computer system. Moreover, in addition to these two examples, one of ordinary skill in the art would recognize that any other combination of types of source and destination platforms is possible.

Several more detailed embodiments of the invention are described in the sections below. Before describing these embodiments further, an overview of a server hosting system architecture of some embodiments is provided in Section II below. This discussion is followed by Section III, which discusses local and remote extraction of a source system configuration. Section IV then describes a process by which an adaptation engine adapts a system configuration that is operable on a source platform to be operable on a destination platform. Next, Section V discusses an adaptive library of some embodiments. Then, Section VI describes advantages of some embodiments of the invention. Lastly, Section VII describes a computer system of some embodiments.

II. Server Hosting System Architecture

Figure 4:
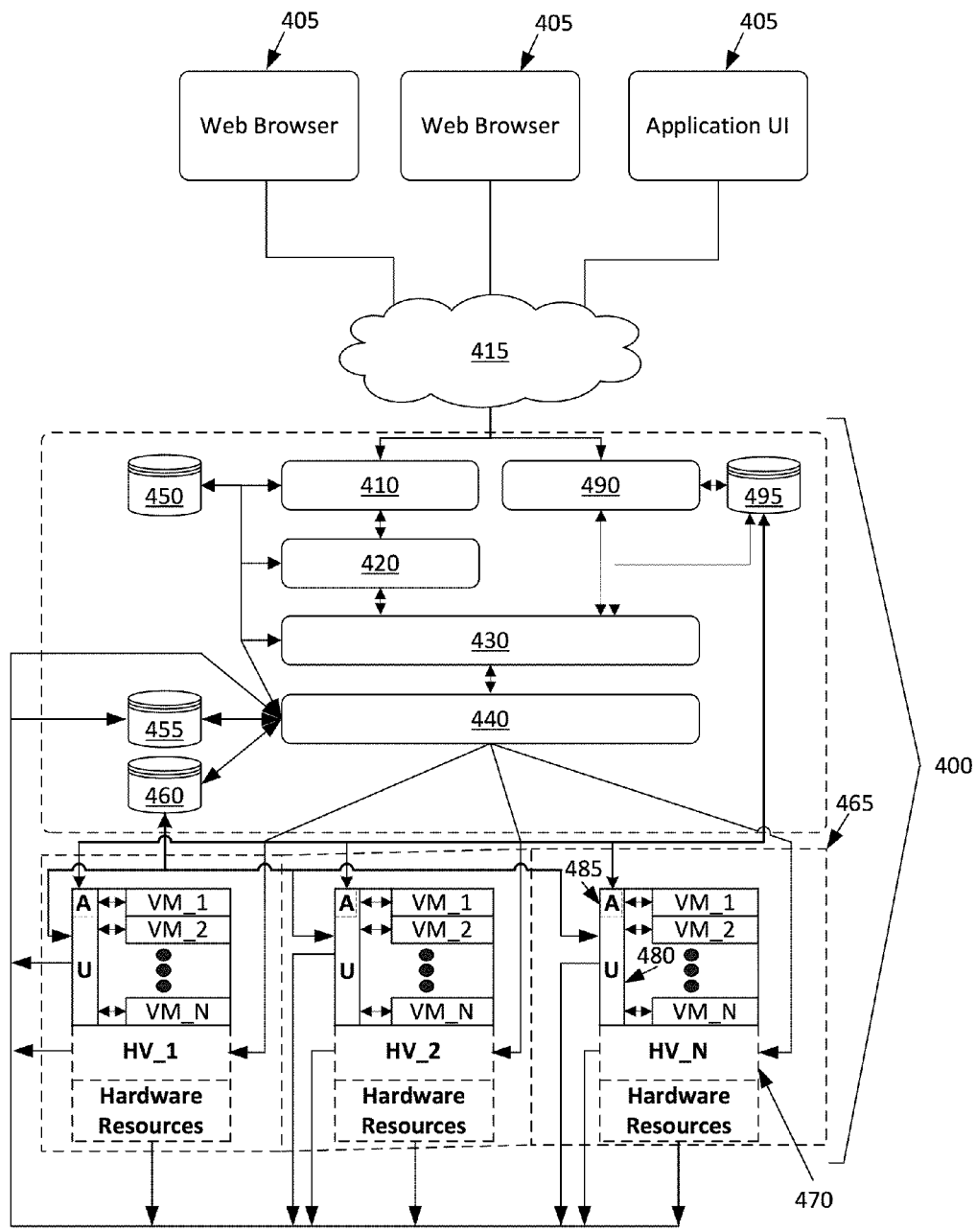
FIG. 4 conceptually illustrates a system architecture of some embodiments of the invention.

FIG. 4 illustrates a hosting system 400 that implements some embodiments of the invention. This system receives new or modified system configurations in an automated fashion through front-end user interface ("UI") logic and then deploys the system configuration onto a grid of hardware nodes through automated back-end placement logic. In some embodiments, the hosting system 400 provides hosting services for multiple unrelated users over the shared grid of hardware nodes. As shown in FIG. 4, the hosting system 400 includes: (1) a service request server 410, (2) front-end provisioning manager 420, (3) a resource management system module 430, (4) a hypervisor management module 440, (5) a data storage 450, (6) a statistics storage 455, (7) an image store 460, (8) an extraction engine 490, (9) an extracted configuration store 495, and (10) a grid 465 of hardware nodes.

The service request server 410 (1) receives communications (i.e., service requests) from external users through a network 415 and (2) routes the communications to the front-end provisioning manager 420. In some embodiments, the service request server 410 is a web server, which communicates to a user through a network 415 such as the Internet. Specifically, in such embodiments, a user accesses the hosting system 400 through the user's web browser or through a downloadable client application 405, which may reside on the user's computer. The user's computer of some embodiments is a particular machine, such as a general purpose desktop computer, portable notebook computer, personal digital assistant ("PDA"), digital cellular telephone, or other electronic device that is capable of communicating through the network 415.

In some embodiments, the network 415 is a local area network ("LAN"), an intranet, and/or a network of networks, such as the Internet. The network 415 of some embodiments also includes wireless data services (e.g., general packet radio service ("GPRS"), or other variations of 2G or 3G packet data services) or other electronic communication interfaces. In this manner, users can access the hosting system 400 while being located anywhere throughout the world.

The service request server 410 routes user communications to the front-end provisioning manager 420. On an initial communication, the front-end provisioning manager 420 passes the user communication to a registration module (not shown) for user verification and authentication (e.g., username and password verification). In some embodiments, the registration module is a fully automated component of the hosting system 400 that performs the verification and authentication operations without human intervention.

When the user cannot authenticate him or herself (e.g., is not an existing customer of the hosting system), the registration module of some embodiments presents a graphical interface with editable fields through which the user enters additional identification information for creating a user account. The user-specified information is then stored within data storage 450 for subsequent authentication and authorization of the user. When the user can authenticate him or herself (e.g., is an existing customer), the user's prior system configuration(s) (also referred to as "virtual machine configurations") and/or usage information is/are retrieved from the data storage (i.e., database) 450. The retrieved information is passed to the front-end provisioning manager 420.

The front-end provisioning manager 420 is responsible for generating a graphical user interface ("GUI") through which a user may specify graphical representations for various virtual machine configurations. In some embodiments, the graphical representations contain sets of selected graphical items (e.g., icons), where each item represents a component of the system configuration. For instance, a user desiring to create a system configuration having a load balancer, multiple web servers, and a database server simply selects the three graphical elements within the GUI that represent such components. In some embodiments, such selection occurs when a user clicks (e.g., left-clicks, right-clicks, double-clicks, etc.) on items within the graphical display to add, modify, or delete the graphical representations for these items, while some other embodiments allow users the ability to drag and drop the graphical representations for these items across the graphical display. In some embodiments, each graphical representation includes one or more configurable parameters associated with configuring resources or characteristics of a physical device in the grid of nodes represented by the graphical representation.

In some embodiments, the specified system configuration is scalable to increase or decrease allocated resources in response to demand through simple modification of the graphical representation. To facilitate the scaling of a system configuration, the front-end provisioning manager 420 acts as a user interface manager that provides a tiered hierarchical representation of the system configuration.

Some embodiments of the front-end manager 420 further permit users the ability to specify custom settings for each component of the system configuration or for the system configuration as a whole. For instance, the front-end manager 420 of some embodiments allows users the ability to specify a desired set of software (e.g., operating systems, anti-virus protection, anti-spam protection, applications, etc.) to operate in conjunction with the specified hardware configuration. In addition to specifying the operating system and applications to include within the user system configuration, some embodiments permit users the ability to further specify settings within the selected operating system and applications. For instance, a user can enter network addresses for load balancers and firewalls or specify hostnames.

After the graphical specification for the system configuration is complete, some embodiments of the front-end manager 420 automatically provide the system configuration to the hosting system's back-end logic, which is formed by the resource management system module 430 and the hypervisor management module 440.

In lieu of, or in addition to, selecting a system configuration and parameters using the front-end manager 420, a user uploads his or her own system configuration for hosting. The extraction engine 490 of some embodiments allows users the ability to identify a system configuration of a user's platform in order to migrate the system configuration into the hosting system 400. In some embodiments, identifying includes uploading a system configuration package that includes an image (i.e., the entire file system) and/or attributes of the configuration's file system in some embodiments. Moreover, the identifying of some embodiments includes identifying the user's platform (e.g., an IP address of the platform) and providing authentication credentials (e.g., log in name and password) in order to allow the platform to be accessed and the system configuration (i.e., entire file system image and/or relevant attributes of the system configuration) to be extracted by the extraction engine 490.

The extraction engine 490 supplies the extracted image and/or attributes to the extracted configuration store 495 and/or image store database 460 for later retrieval. The extraction engine 490 also supplies the extracted image and/or the attributes to the resource management system module 430, which identifies resources required by the system configuration (e.g., by determining attributes of the system configuration such as number of processors, amount of storage space needed, etc.).

The resource management system module 430 of some embodiments of the back-end logic receives the specified system configuration from the front-end manager 420 or the extraction engine 490. Alternatively, the resource management system module 430 of some embodiments receives the specified system configuration from the extracted image store 495. The resource management system module 430 of some embodiments performs a logical assignment (i.e., identifies a mapping) of the components within the system configuration to the grid of hardware nodes 465. This logical assignment identifies a set of resources (e.g., RAM, hard drive space, etc.) required by the system configuration.

In some embodiments, the logical assignment is stored within the data storage 450 where it can be later accessed by other components of the hosting system 400. The data storage 450 of some embodiments includes one or more databases that reside on one or more particular machines (e.g., data storage devices of a computer system).

The hypervisor management module 440 of some embodiments receives the logical assignment from the resource management system module 430 or from the data storage 450 after the resource management system module 430 stores the logical assignment in the data storage 450.

As further described in the concurrently filed U.S. patent application Ser. No. 12/421,604 entitled "Automated System and Method to Customize and Install Virtual Machine Configurations for Hosting in a Hosting Environment", the hypervisor management module 440 then automatically deploys the logical assignment across one or more of the physical hardware nodes 465. U.S. patent application Ser. No. 12/421,604 is hereby incorporated by reference.

In some embodiments, the hypervisor management module 440 acts as a virtualization manager to emulate a single virtual machine as if it existed on a single hardware node, even though the hypervisor management module 440 may physically leverage the resources of multiple nodes to host the single system configuration. Additionally, a single functional component of the system configuration may be virtualized by distributing its functionality across multiple nodes 465. For instance, when a database server of a system configuration requires a large allocation of disk space, the hypervisor management module 440 may deploy this database server over two nodes such that the disk space of any one node is not proportionally used by the database server.

The hypervisor management module 440 automatically allocates the logical assignment across one or more of the physical hardware nodes 465 by interfacing with a hypervisor 470 operating on each node. The hypervisor 470 manages the allocation of resources at the individual node level whereas the hypervisor management module 440 of some embodiments manages the allocation of resources at the grid level for all nodes within the grid 465. Accordingly, the hypervisor 470 of each node allows for a non-conflicting provisioning of a node's resources to two or more virtual machines and the hypervisor management module 440 allows several such nodes with multiple virtual machines to operate seamlessly together.

Also operating on each node is a utility management module ("UVM") 480 of some embodiments. As described in further detail in the concurrently filed U.S. patent application Ser. No. 12/421,604, the UVM 480 is a utility manager that customizes the resources allocated by the hypervisor management module 440. The UVM custom configures the resources based on a user virtual machine system configuration specified/modified through the front-end manager 420 or received from the extraction engine 490. The UVM 480 of some embodiments also includes an adaptation engine 485, which receives extracted system configurations from the extracted configuration store 495 and adapts them to be operable on the hypervisor 470 of the node. In some embodiments, the hypervisor management module 440 instructs the UVM 480 to retrieve the extracted system configurations from the extracted configuration store 495 and/or the image store database 460.

The UVM 480 optimizes and customizes the system configurations by receiving adapted system configurations or retrieving system configuration images from an image store database 460 and modifying the retrieved image according to user specifications. The UVM 480 of some embodiments also performs other operations (e.g., making an adapted system configuration bootable on the hypervisor 470). In this manner, the UVM 480 permits each virtual machine system configuration operating on a node of the grid 465 to be unique based on (1) a user's extracted system configuration and/or (2) user parameters specified through the graphical user interface of the front-end logic.

In some embodiments, the image store database 460 is a database storing several operating system software images and/or software images for applications to run in conjunction with the operating system of a virtual machine configuration. Additionally, in some embodiments, image store database 460 physically represents a single database that stores single server appliances and multi-server appliances.

A single server appliance is a stand-alone image. Such a single server appliance includes a single operating system image or a single software application image. In other words, a single server appliance represents a single element of a virtual machine.

A multi-server appliance is an image composed of a combination of one or more operating system images and application program images. A multi-server appliance represents all or some of the elements of a virtual machine deployed within the hosting system's grid of nodes. In some embodiments, a multi-server appliance specifies a tiered organization for the elements of a virtual machine. For example, the multi-server appliance may include two web servers at a first tier that interact with an application server at a second tier.

The images in the image store database 460 are provided by the hosting system provider or by users of the hosting system. For instance, some users specify virtual machine configurations that include an operating system and various commonly used applications that are configured to optimally operate with the operating system. Also, as further discussed below, the images in the image store database 460 may be adapted system configurations supplied by an adaptation module 485 of a node. By storing these system configurations within the image store database 460, the system configurations, and more specifically the optimizations made to the system configurations, can be reused when instantiating virtual machines for other users.

Figure 5:
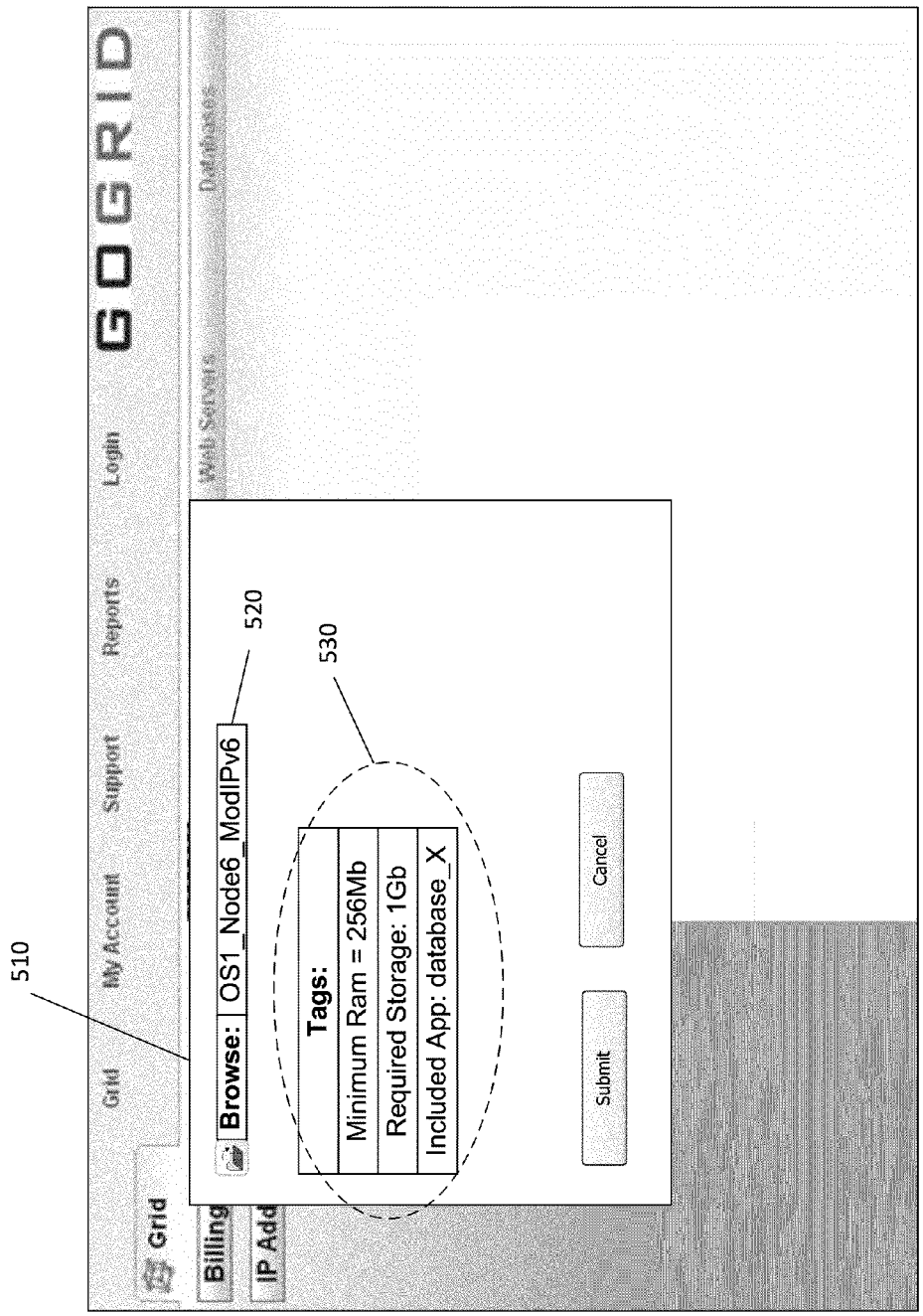
FIGS. 5 and 6 illustrate graphical user interfaces of some embodiments through which a user may specify images to run on a node.

Some embodiments provide means by which users may submit images to the image store database 460 using a graphical interface of the front-end logic of the hosting system. FIG. 5 illustrates a graphical interface in accordance with some embodiments by which users of the hosting system submit images that may be used by other users of the hosting system. The front-end logic of some embodiments described above generates the graphical interface 510. The interface 510 includes an image selection tool 520 and a set of tags 530.

The image selection tool 520 selects the image that the user desires to submit to the image database of the hosting system provider. When selected, the image selection tool 520 opens a browser window from which the user navigates to select an image that can then be shared with other users of the hosting system. In some embodiments, the image selection tool 520 may be used to select a user's virtual machine that has already been adapted, configured, and deployed to a specific node within the grid of nodes of the hosting system. Once the virtual machine is selected, the corresponding image for the virtual machine is stored within the image store database 460 such that the image is directly accessible by other subsequent users that define virtual machine configurations through the front-end logic of some embodiments.

In some embodiments, the image selection tool 520 is a drag and drop field within the graphical interface 510. To upload an image, users drag an icon or other representation of a desired image and drop the representation within the area of the image selection tool 520.

Instead of submitting whole operating system images or software application images, some embodiments allow users to submit parameters for modifying generic unmodified images of operating systems or application programs. Accordingly, in some such embodiments, the image store database 460 stores unmodified images and sets of parameters or configuration files that are used to modify parameters of the unmodified images. Users submit the parameters or configuration files using an interface similar to interface 510 of FIG. 5.

Some embodiments then allow subsequent users the ability to select between previously submitted images or previously submitted configuration files for unmodified images that are stored in the image store database 460. Specifically, when a user specifies a virtual machine system configuration through the front-end logic of the hosting system, the user is presented a graphical interface from which to select between the various user submitted images or user submitted configuration files. The user then selects an image or configuration file that best suits the user's needs.

To assist a user in selecting an appropriate image, some embodiments provide various performance metrics for each of the submitted images. In some embodiments, other users who have integrated the various images or configuration files into their virtual machines and have monitored the performance and effectiveness of the images provide some of the performance metrics.

Figure 6:
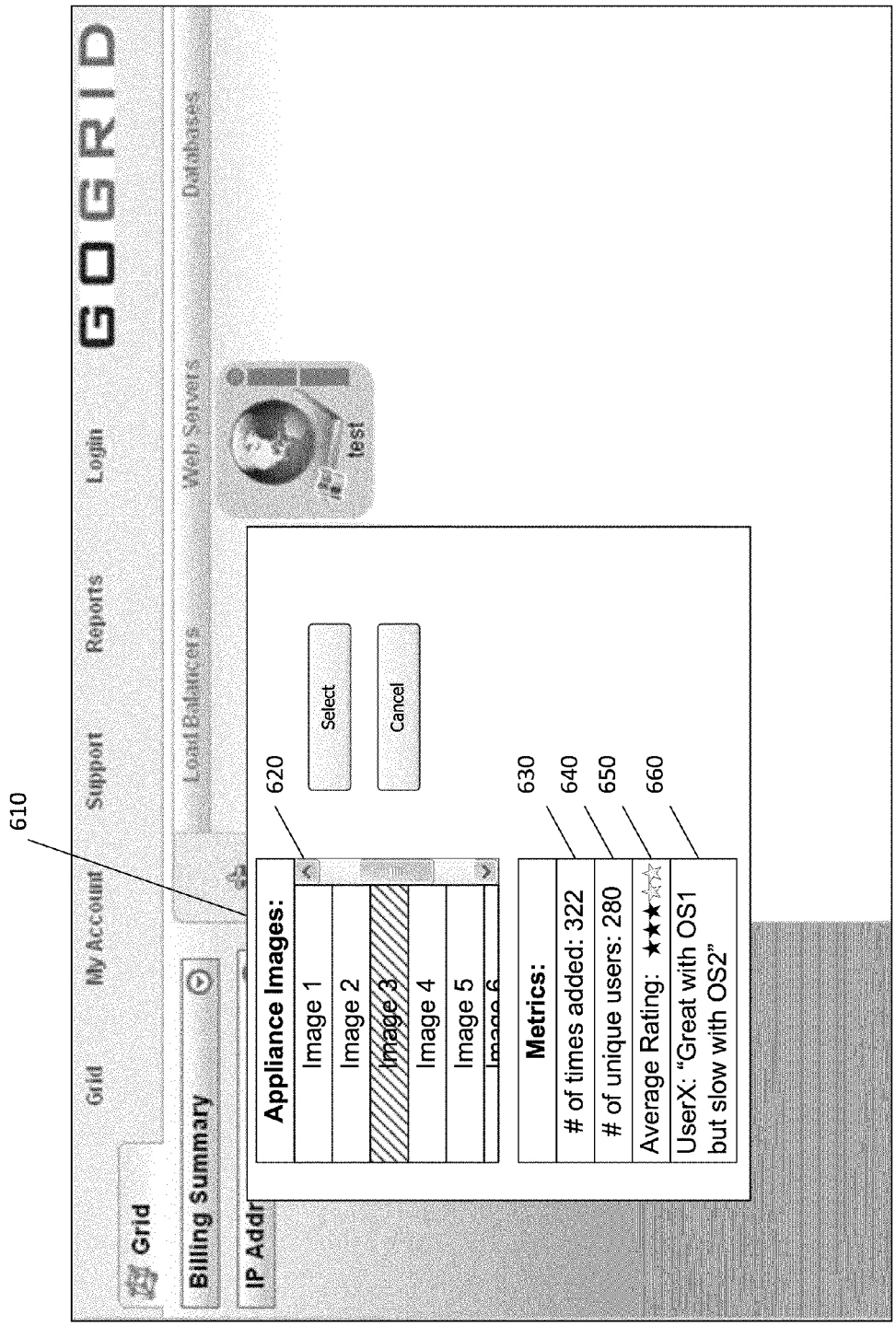

FIG. 6 illustrates an image selection interface in accordance with some embodiments. The image selection interface 610 provides a list of available images 620 that may be selected as part of a subsequent user's virtual machine configuration. For each image, the image selection interface 610 provides a set of performance metrics 630-660. As illustrated, some examples of performance metrics include: (1) metric 630 that specifies the number of times that users have added a particular image to their virtual machine configurations, (2) metric 640 that specifies the number of unique users that have added a particular image to their virtual machine configurations, (3) metric 650 that provides a average performance rating, on a scale of one to five stars, that other users have provided as to the performance or effectiveness of a particular image, and (4) metric 660 that specifies a set of comments regarding the performance of a particular image from other users that have deployed the image. It should be apparent to one of ordinary skill in the art that performance metrics 630-660 are an exemplary set of performance metrics. However, additional performance metrics may be specified in addition to or in place of some of the performance metrics 630-660.

The performance metrics allow users to select between images that are known to be effective or that are known to provide a specified level of performance based on previous users' experiences. It should be apparent to one of ordinary skill in the art that even though the interface of FIG. 6 is described for selecting between images, the same interface is adaptable for selecting between different configuration files for unmodified images that are stored within the image store database 460.

Figure 7:
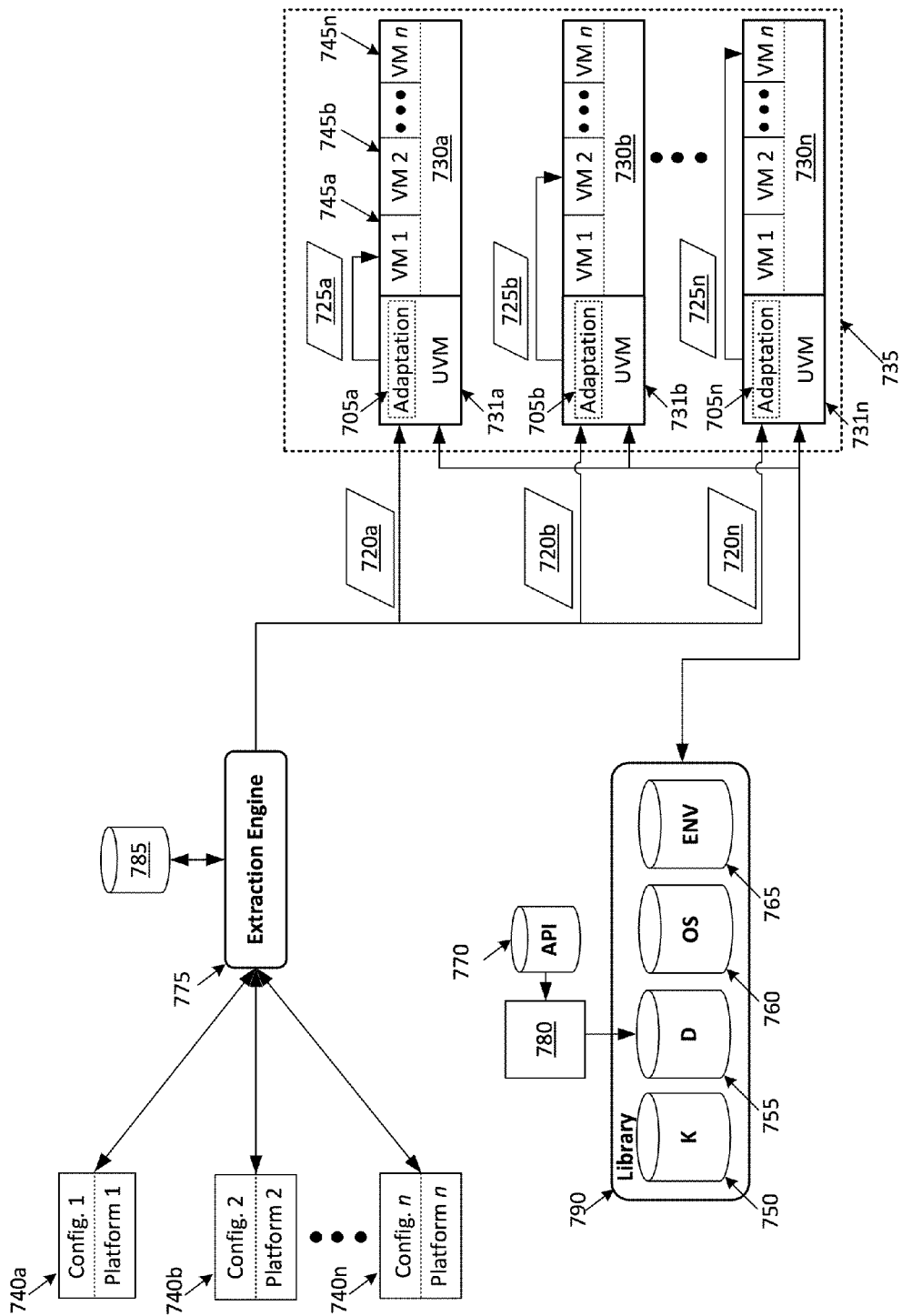
FIG. 7 conceptually illustrates a system architecture of some embodiments of the invention.

FIG. 7 illustrates some components illustrated in FIG. 4 in more detail, as well as other components with which some of the components of FIG. 4 interact. Namely, FIG. 7 illustrates an extraction engine 775 (e.g., the extraction engine 490 of FIG. 4), an extracted image store 785 (e.g., the extracted image store 495 of FIG. 4), a library 790, a kernel application programming interface ("API") store 770, a workstation 780, and a grid 735 of nodes (e.g., nodes 731*a-n*). FIG. 7 also illustrates several computer systems 740*a-n*, some or all of which are computer systems of different users.

The extraction engine 775 is communicatively coupled to one or more user computer systems (e.g., physical computer systems or virtual machines) 740*a-n*. While a single extraction engine 775 is shown in this figure, some embodiments provide an extraction engine locally at one or more of the computer systems 740*a-n*. The extraction engine 775 interfaces with these computer systems in order to generate system configuration packages 720*a-n*, which include images of file systems of the system configurations and/or attributes of the system configurations of the computer systems 740*a-n*. The extraction engine 775 provides these system configuration packages 720*a-n* to the adaptation engines 705*a-n* of nodes 731*a-n* for which the system configuration packages are intended. As described above with reference to FIG. 4, a hypervisor management module (e.g., hypervisor management module 440) of some embodiments makes this determination in conjunction with a resource management server (e.g., resource management server 430).

A particular node 731*a* includes a platform 730*a*. The platform 730*a* may be any type of platform (e.g., one of the platforms enumerated in FIG. 2, such as a virtualized platform which runs one or more system configurations on a hypervisor). The node 731*a* runs several virtual machine system configurations 745*a-n*. The node 731*a* includes a UVM, which includes an adaptation engine 705*a* (e.g., the adaptation engine 485 of FIG. 4). As mentioned above, the adaptation engine 705*a* receives a system configuration package 720*a* from an extraction engine 775 and/or an extracted image store 785 and generates an adapted system configuration 725*a* which is operable on the platform 730*a*. This adapted system configuration 725*a* is then run by the node 731*a* as the virtual machine system configuration 745*a*. In order to perform this adaptation, the adaptation engine of some embodiments retrieves information from the library 790.

The library 790 of some embodiments is made up of sub-libraries. These sub-libraries include: (1) a library that stores multiple computer system core kernels (also referred to as a "core kernel library" that stores kernels separately from third party drivers) 750, (2) a device driver library 755, (3) an operating system library 760, and/or (4) a development environment library 765 that stores development environments, also known as "clean versions" of kernels and operating systems (e.g., versions that are unchanged compared to versions released by vendors and/or original developers of the operating systems and kernels). The adaptation engine 705 of some embodiments uses information from some or all of these sub-libraries when performing an adaptation of a source system configuration to be operable on a destination platform. In some embodiments, the library 790 is implemented as part of a file store array that is made up of many data storage devices (e.g., hard drives) used by a server hosting system.

In some embodiments, the library 790 is coupled to the workstation 780, through which the library 790 may be managed. Data (e.g., kernels, device drivers, etc.) may be manually added to or deleted from the library 790. Additionally, the library 790 of some embodiments is an adaptive library, and data may be automatically added to the library. For examples, when a device driver is updated by the manufacturer of the device, the driver may be automatically downloaded from the device manufacturer's website and added to the driver library 755. Additionally, the adaptive library of some embodiments receives new information to store from the adaptation engine 705 when the adaptation engine 705 generates new information.

While not explicitly shown in the figure, one or more of the interfaces between the various components shown in FIG. 7 is a network interface. In some embodiments, the network interface is through a LAN, a network of networks such as the Internet, a wireless cellular telecommunication network such as GPRS, or any other type of network. Moreover, as mentioned above, one or more of the components described above, such as the extraction engine 775, have a programmatic interface on a single computer system with each other in some embodiments.

It should be apparent to one of ordinary skill in the art that the grid of hardware nodes 735 includes several distinct physical servers or clusters of servers located in a single server farm or distributed across multiple server farms in multiple disparate locations. Accordingly, the grid of hardware nodes 735 of some embodiments represents a cloud of computing resources shareable by multiple users. One of ordinary skill will appreciate that servers in other embodiments encompass any standalone computational element that can process requests it receives.

In some embodiments, the grid of hardware nodes 735 is uniformly used to implement all components of a system configuration. However, some embodiments segregate various functionalities across groups of nodes. For instance, in some embodiments, a first grouping or cluster of nodes is used to implement the load-balancing servers of a system configuration and a second grouping or cluster of nodes are used to implement other server components (e.g., web servers, database servers, etc.) of the system configuration. In some such embodiments, the load-balancing servers are dedicated F5 load balancing server appliances that can be configured to work in conjunction with the other nodes of the grid.

In some embodiments, the grid of nodes contains an intercommunication pathway by which each node shares data with other nodes of the array and the hypervisor management module. Through, the inter-communication pathway, physically separated nodes together operate as a single functional unit.

Additionally, as mentioned above, the various physical resources of each node can be logically partitioned and allocated to one or more virtual machines. For instance, each node 705 in the grid of hardware nodes 735 includes at least one processing unit, where through the various partitioning, allocation, and deployment performed by the hypervisor management module, hypervisor, and/or utility management module, each physical processing unit conceptually operates as multiple separate processing units for two or more virtual machines of the node. Other resources of a node (e.g., memory, disk space, network bandwidth, etc.) can also be logically split to be shared by multiple users.

Figure 8A:
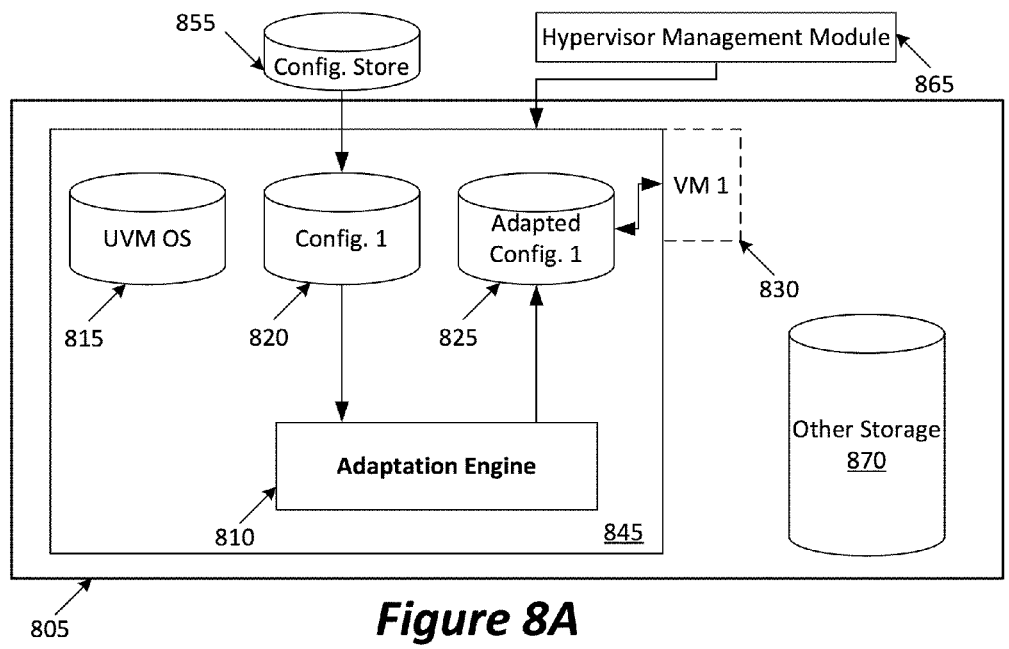
FIGS. 8A-8D illustrate a particular node before and after system configurations are adapted to be operable on the node.

FIGS. 8A-BD further illustrate a node before and after receiving an extracted system configuration for adaptation. FIG. 8A illustrates a node 805 (e.g., the node 731a of FIG. 7) of a hosting system of some embodiments. The node includes a UVM 845, which includes an adaptation engine 810. The UVM 845 is associated with three logical storage devices (e.g., mounted hard drives): (1) a UVM operating system storage 815, (2) an extracted configuration storage 820, and (3) an adapted configuration storage 825. The node 805 also has other storage 870, which represents other storage devices of the node 805. In some embodiments, these storage devices 815, 820, 825, and 870 each correspond to one or more physical storage devices. In some other embodiments, each of these storage devices 815, 820, 825, and 870 is a partition of one or more physical storage devices of the node 805.

The UVM operating system storage 815 stores the operating system of the UVM, including executable instructions that the UVM 845 executes to carry out its various functions. In some embodiments, the executable instructions that carry out the functions of the UVM 845 or adaptation engine 810 are defined by a set of scripts remotely stored in a file system of the hypervisor management module. The UVM 845 mounts the file system in order to access the set of scripts. In some other embodiments, the executable instructions that carry out the functions of the UVM 845 or adaptation engine 810 are stored as scripts in the UVM operating system store 815.

The configuration store 820 stores an extracted system configuration ("configuration 1") received from a configuration store 855 or an extraction engine in some embodiments (e.g., the extraction engine 775 of FIG. 7). The adaptation engine 810 accesses the configuration store 820 in order to adapt the stored system configuration to be operable on the node 805.

The adapted configuration store 825 stores a system configuration adapted by the adaptation engine 810 ("adapted configuration 1") once the adaptation engine has adapted an extracted system configuration. As shown by the figure, this adapted system configuration will later be used by a virtual machine 830 that runs on the node 805.

In some embodiments, the UVM 845 allocates the space required by the adapted system configuration (e.g., mounts the drive 825) in response to a message from a hypervisor management module 865 of a server hosting system (e.g., hypervisor management module 440 of FIG. 4), which indicates the resources required by the system configuration. The other storage 870 stores other data stored on the node, including virtual machine configurations not mentioned with reference to FIGS. 8A-8D, as well as unallocated space in some embodiments.

Figure 8B:
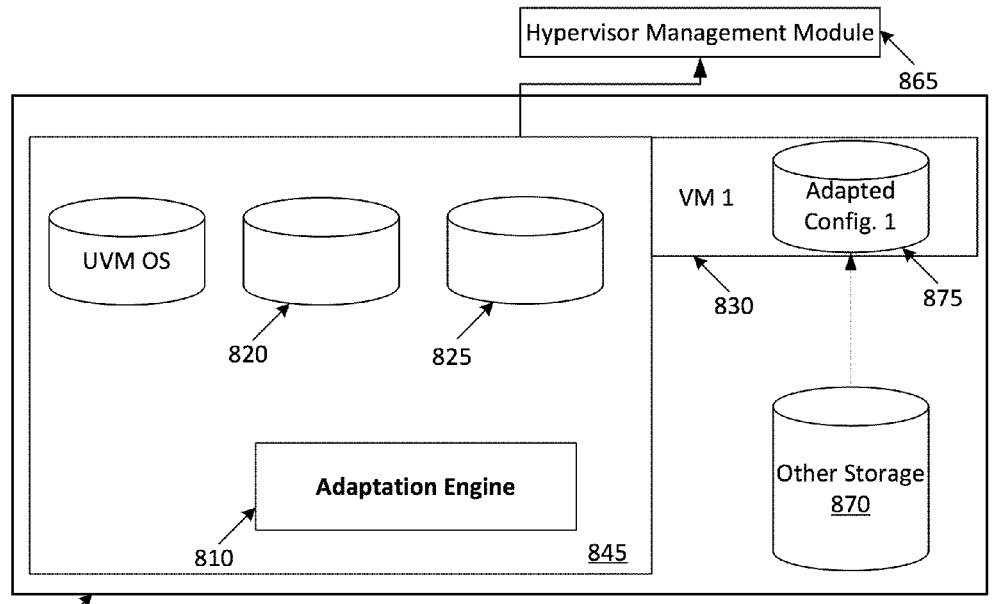

FIG. 8B illustrates the node 805 of FIG. 8A after the system configuration has been adapted by the adaptation engine 810. In this figure, the UVM 845 has erased the data stored in the configuration store 820 and the adapted configuration store 825. The UVM 845 has also allocated storage space 875 (e.g., mounted a file system) for the virtual machine 830. In this storage space 875, the UVM 845 has copied the adapted system configuration that was previously stored in the adapted configuration store 825. In some embodiments, the amount of storage space 875 allocated for the virtual machine 830 is determined by a request from the hypervisor management module 865. Additionally, the capacity of storage space 875 is greater than or equal to the size of the adapted system configuration (e.g., the storage space 875 has a capacity of 500 GB, while the adapted system configuration occupies 4 GB of the storage space 875).

In some embodiments, the configuration store 820 and/or the adapted configuration store 825 are not erased. Instead, these stores 820 and 825 continue to store their respective contents, but are simply not accessed by the UVM 845.

After the system configuration is adapted, the UVM 845 of some embodiments notifies the hypervisor management module 865 that the adapted system configuration has been installed on the node 805 (i.e., installed on the hypervisor of the node 805 in some embodiments). In some embodiments, the hypervisor management module 865 informs a front-end provisioning manager (e.g., the front-end provisioning manager 420 of FIG. 4) that the adapted system configuration has been installed on the node 805. The front-end provisioning manager then presents a notification to a user. For example, the front-end provisioning manager presents the notification through a service request server, such as the service request server 410 of FIG. 4. In some embodiments, this notification is a visual notification presented in a GUI.

Figure 8C:
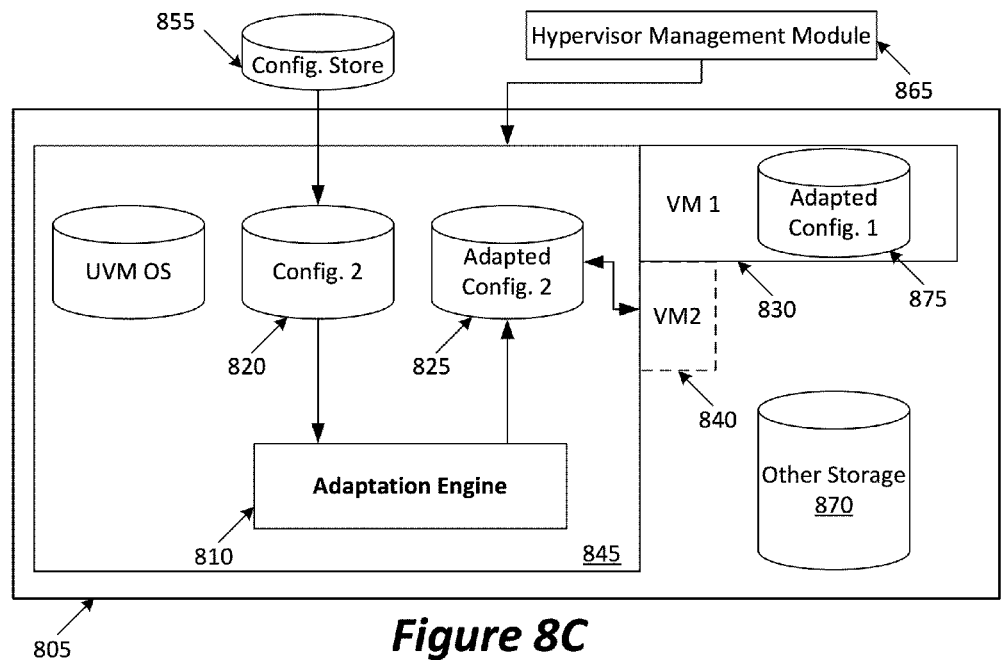
Figure 8D:
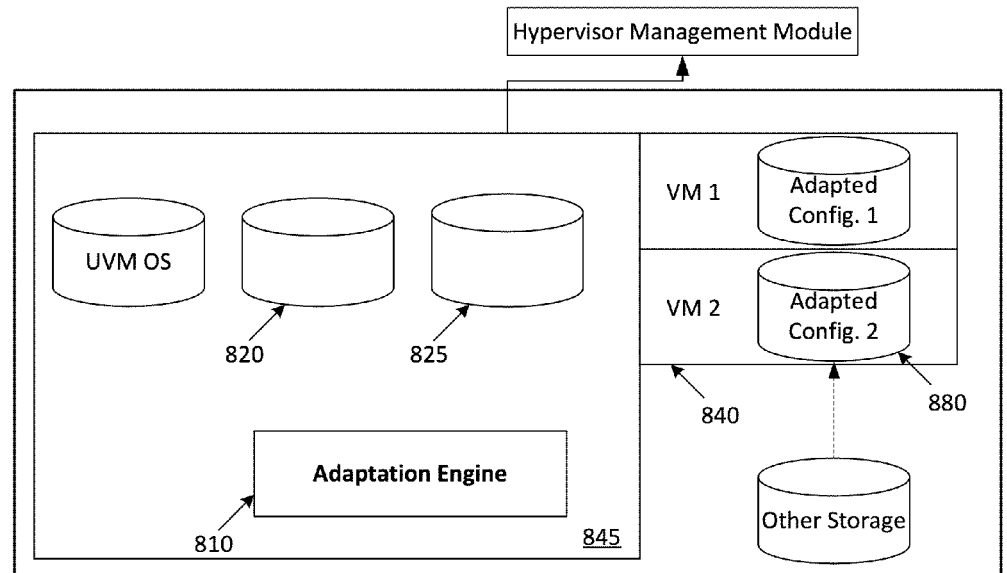

FIGS. 8C and 8D illustrate the subsequent adaptation of a second system configuration on the node 805. In FIG. 8C, the configuration store 820 receives another system configuration ("configuration 2") from the extracted configuration store 855 or an extraction engine (not shown). The UVM 845 stores configuration 2 in the configuration store 820. The adaptation engine 810 adapts configuration 2 into adapted configuration 2. The UVM 845 stores adapted configuration 2 in the adapted configuration store 825. As shown, adapted configuration 2 may be run as a second virtual machine system configuration ("VM 2") 840.

Like FIG. 8B, FIG. 8D illustrates the node 805 after the adaptation engine 810 has performed an adaptation. Also in FIG. 8D, the UVM 845 has allocated space 880 for the second virtual machine 840 and copied the adapted system configuration into allocated space 880. As mentioned above, the UVM 845 of some embodiments erases the contents of one or both of the configuration store 820 and the adapted configuration store 825.

It should be apparent to one of ordinary skill in the art that the architecture depicted in FIGS. 4, 7, and 8A-8D do not encompass all embodiments of the invention. Some embodiments of the architecture may include other various functional components to work in conjunction with or instead of the enumerated components illustrated in FIGS. 4, 7, and 8A-8D. While the above discussion was a description of a system architecture of some embodiments, the following sections describe processes that may be performed by various components of the above described system.

III. Extraction of a Source System Configuration

Some embodiments provide a method for extracting a source system configuration that operates on a source platform in order to allow the system configuration to be adapted to be operable on a destination platform. In some embodiments, extraction includes analyzing the source system configuration in order to determine attributes that are relevant to adapting the source system configuration to be operable on the destination platform. These attributes include operating system name, kernel name, kernel version, and/or other attributes. Sub-section A below describes some embodiments that extract the system configuration locally at the source platform, while sub-section B below describes some other embodiments that remotely access the source platform in order to extract the system configuration.

A. Local Extraction of a Source System Configuration

Figure 9:
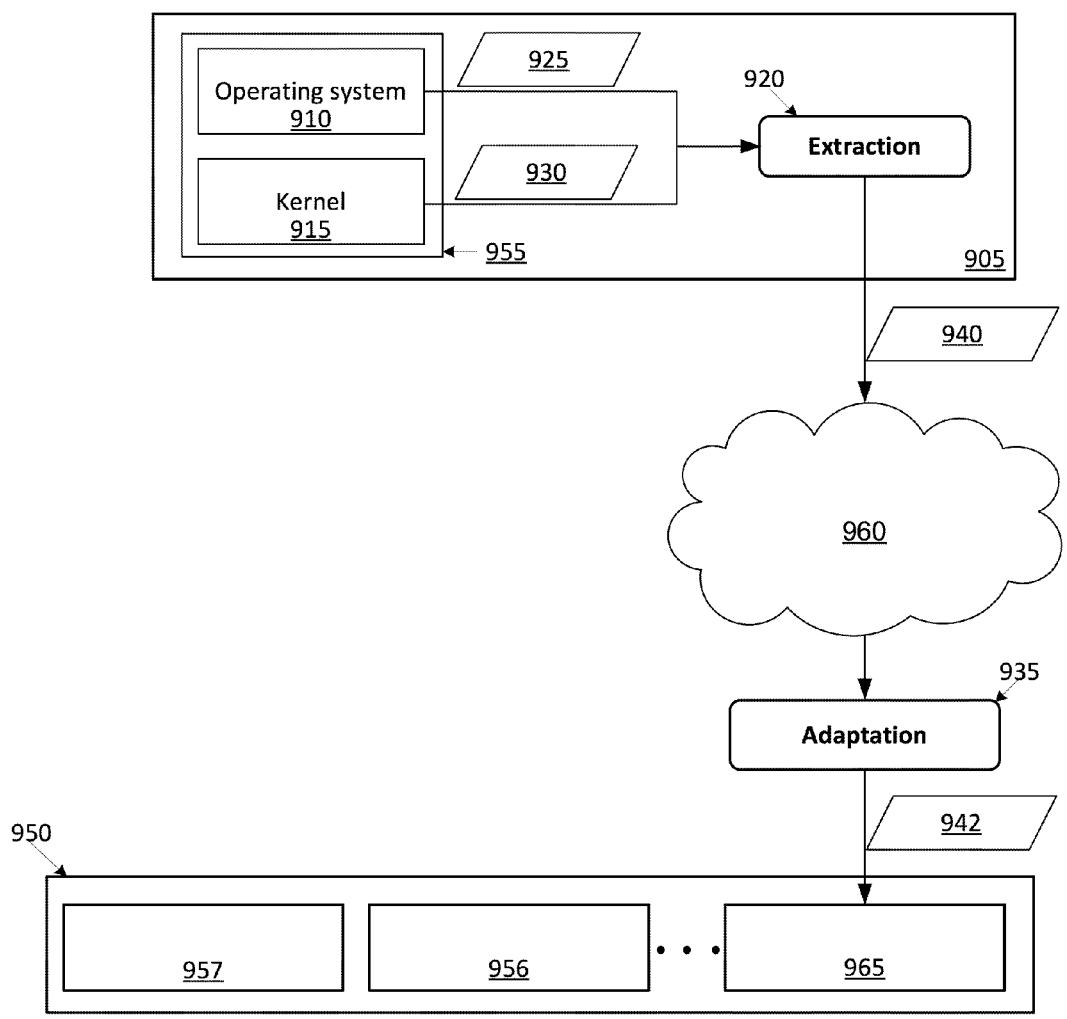
FIG. 9 illustrates data flow of a local system configuration extraction engine.

FIG. 9 conceptually illustrates a system that performs local extraction of a source system configuration. This figure shows a source platform 905 that runs a local extraction engine 920. The source platform 905 of some embodiments may be any type of computer system (e.g., a single computer system, a node in a grid of nodes, etc.). In some embodiments, the local extraction engine 920 is a software module (e.g., a software application program) that a user of the source platform 905 installs on the source platform 905. The source platform 905 also stores a source system configuration 955, which includes an operating system 910 and a kernel 915. In some embodiments, the source platform 905 stores other software modules (e.g., application programs that are not shown in FIG. 9). While the extraction engine 920 is illustrated in the figure as being separate from the system configuration 955, the extraction engine 920 is a software module that may be installed as part of the system configuration 955 in some embodiments. In some embodiments, a user of the source platform 905 downloads the extraction engine 920 software application from the hosting system that is to host the source system configuration.

The extraction engine 920 of some embodiments analyzes the source system configuration 955 in order to determine attributes that are relevant to adapting the source system configuration 955 to be operable on a different platform. In some embodiments, these attributes include operating system attributes 925 (e.g., operating system name, operating system version, etc.) and/or kernel attributes 930 (e.g., kernel name, kernel version, etc.). Determining these attributes includes identifying devices and/or drivers of the system configuration in some embodiments. The extraction engine bundles some or all of the identified attributes and generates a system configuration package 940 that stores the bundled attributes.

The source platform 905 of some embodiments is communicatively coupled to an adaptation engine 935 through a network 960 (e.g., a LAN, the Internet, or any other type of network). Through the network 960, the source platform 905 provides the system configuration package 940 to the adaptation engine 935 of some embodiments. As mentioned above, the adaptation engine 935 may be present on a separate physical device than the source platform 905. The adaptation engine 935 uses the system configuration package 940 in order to generate a destination system configuration package 942. The processes of some embodiments by which the adaptation engine 935 generates the destination system configuration package 942 are described below in Section IV. The destination system configuration package 942 of some embodiments includes the source system configuration 955, adapted to be operable on a destination platform.

The adaptation engine 935 is communicatively coupled to a destination platform (e.g., through a network such as a LAN or the Internet, not shown). In some embodiments, the destination platform is a node 965 in a grid of nodes 950, while in some embodiments, the destination platform is a virtual machine on a node 965 in the grid of nodes 950. The grid of nodes 950 includes the node 965, as well as one or more other nodes, such as nodes 956 and 957. Through its connection with the destination node 965, the adaptation engine 935 provides the destination configuration 942 to the destination node 965 in some embodiments so that the destination configuration 942 can be installed on the destination node 965 (e.g., by a UVM of the destination node 965).

Figure 10:
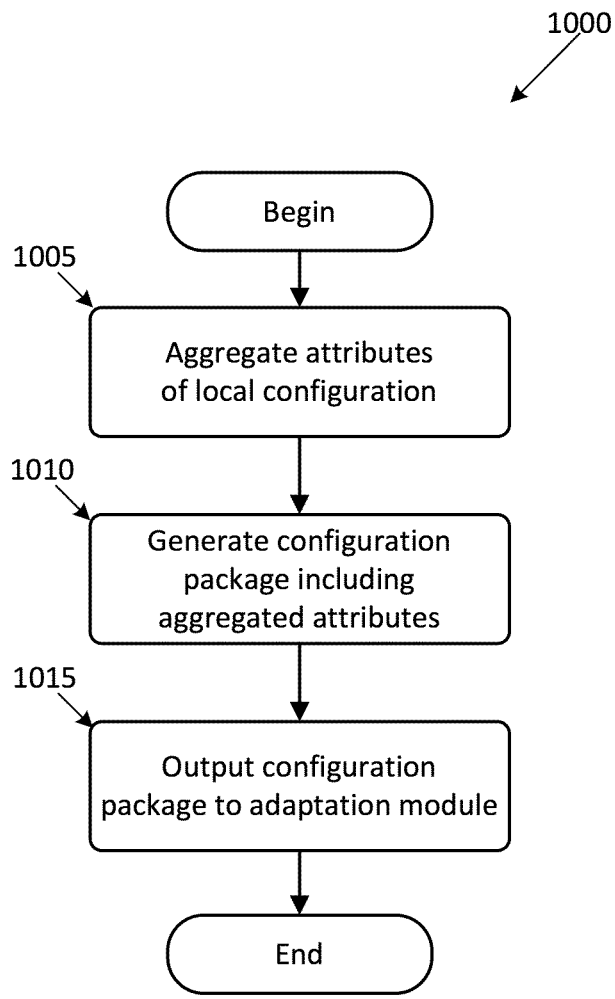
FIG. 10 illustrates a process that performs local extraction of a system configuration.

FIG. 10 illustrates a process 1000 by which a local extraction engine of some embodiments (e.g., the local extraction engine 920 of FIG. 9) performs an extraction of a system configuration a source platform. The process 1000 begins by aggregating (at 1005) a set of attributes of the source system configuration of the source platform. As mentioned above, these attributes include operating system name, operating system version, kernel name, kernel version, device drivers, and/or other attributes. In order to aggregate these attributes, the local extraction engine of some embodiments analyzes the system configuration by executing one or more commands that scan the file system of the source platform.

For instance, when the operating system of the source system configuration is a Linux operating system, the local extraction engine of some embodiments executes a uname-a command that provides information about the kernel such as name, version number. It should be apparent to one of ordinary skill in the art that the local extraction engine also performs other commands that provide other attributes of the system configuration. For example, the local extraction engine issues commands to identify the kernel release date, CPU type, operating system name, number of processors, number of hard drives, number of network devices, etc. The local extraction engine of some embodiments also analyzes the source system configuration in order to determine a set of device drivers of the source system configuration. Moreover, some embodiments programmatically check a device manager of an operating system of the source system configuration in order to determine device drivers of the source system configuration. In some embodiments, these attributes are recorded and stored in a file or set of files (e.g., text file(s), XML file(s), etc.).

After aggregating (at 1005) the attributes of the local configuration, the local extraction engine generates (at 1010) a system configuration package (e.g., the system configuration package 940 of FIG. 9) that includes some or all of the attributes that were previously aggregated (at 1005). In some embodiments, this system configuration package is a single file. For example, the system configuration package may include an image file, such as an .iso file. Alternatively, the system configuration package may be organized as multiple files.

In addition to including some or all of the attributes, the system configuration package of some embodiments also includes a file system of the source system configuration (i.e., some or all of the data stored on the source platform, such as the operating system, the kernel, a set of device drivers, and/or a set of application programs). The attributes of the computer system may be listed in a separate file or set of files (e.g., text file(s), XML file(s), etc.) in the system configuration package. Thus, the system configuration package includes (1) attributes of the system configuration, (2) a file system of the system configuration, or (3) both.

After preparing (at 1010) the system configuration package, the local extraction engine of some embodiments outputs (at 1015) the system configuration package from the source platform. In some embodiments, the system configuration package is received by an adaptation engine (e.g., the adaptation engine 935 of FIG. 9) through a network (e.g., the network 960 of FIG. 9, which is a LAN, the Internet, or any other network). As mentioned above, the adaptation engine of some embodiments then uses this system configuration package in order to adapt the system configuration to be operable on a different platform.

B. Remote Extraction of a Source System Configuration

Figure 11:
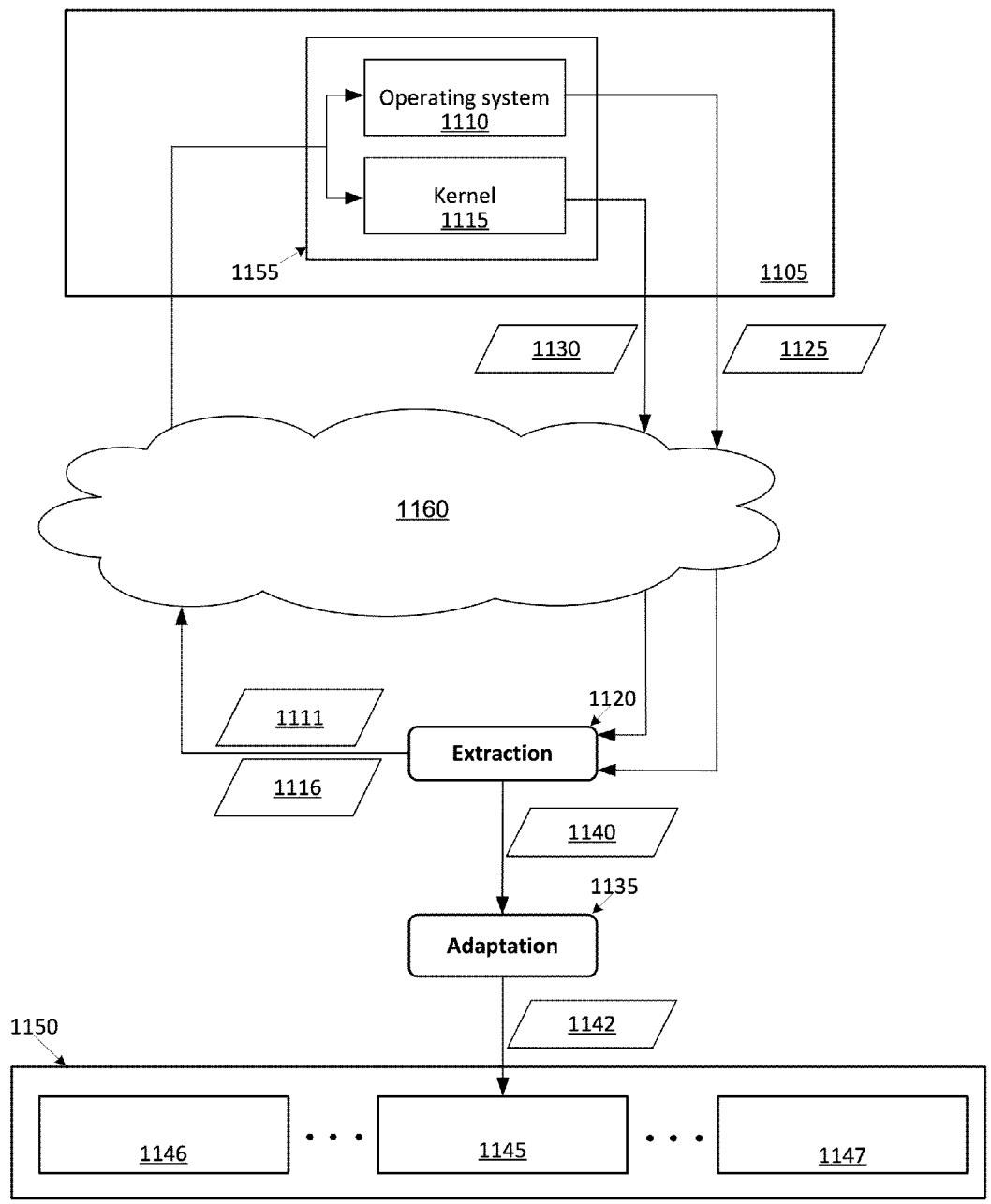
FIG. 11 illustrates data flow of a remote system configuration extraction engine.

While some embodiments perform extraction through a completely local process, as described above, some other embodiments perform extraction through a remote process. FIG. 11 conceptually illustrates a system that performs remote extraction of a source system configuration. Like FIG. 9, FIG. 11 shows a source platform 1105 (e.g., a single computer system, a node in a grid of nodes, etc.) that includes a source system configuration 1155. The source system configuration 1155 includes an operating system 1110 and a kernel 1115. In some embodiments, the source system configuration 1155 also includes other software modules, such as application programs (not shown).

The source platform 1105 is communicatively coupled through a network 1160 (e.g., a LAN, the Internet, or any other network) to a remote extraction engine 1120. In some embodiments, the remote extraction engine 1120 is present on a particular machine which is a different physical device (e.g., a different computer system) than the source platform 1105. The device of the remote extraction engine 1120 may be part of the hosting system of some embodiments where the system configuration of the source platform 1105 is to be hosted.

Through the network 1160, the remote extraction engine 1120 requests attributes (e.g., kernel name, kernel version, device drivers, as discussed above) of the source system configuration 1155. These requests include a request 1111 for attributes of the operating system 1110 and/or a request 1116 for attributes of the kernel 1115. In response, the source platform 1105 provides the requested attributes (e.g., operating system attributes 1125, kernel attributes 1130, and device drivers (not shown)) to the remote extraction engine 1120. The remote extraction engine 1120 then generates a system configuration package 1140 that identifies some or all of the requested attributes.

The remote extraction engine 1120 is communicatively coupled to an adaptation engine 1135. In some embodiments, the remote extraction engine 1120 and the adaptation engine 1135 are present on the same device (e.g., the same computer system) and communicate through a programmatic software interface. In other embodiments, the remote extraction engine 1120 and the adaptation engine 1135 are present on different physical devices (e.g., different computer systems) and communicate through a network interface (e.g., through a LAN, the Internet, or any other network). The remote extraction engine 1120 provides the system configuration package 1140 to the adaptation engine 1135, which uses the system configuration package 1140 in order to generate a destination system configuration 1142. The processes of some embodiments by which the adaptation engine 1135 generates the destination system configuration 1142 are described below in Section IV. The destination system configuration 1142 includes the source system configuration 1155, adapted to be operable on a destination platform.

Figure 12:
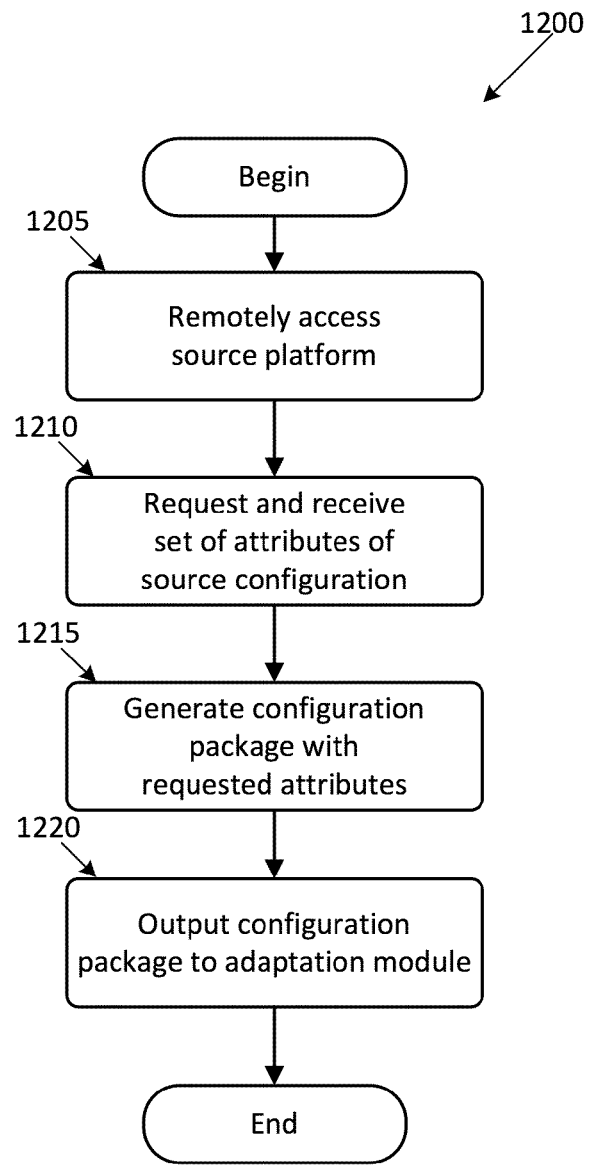
FIG. 12 illustrates a process of some embodiments that performs remote extraction of a system configuration.

FIG. 12 illustrates a process 1200 by which a remote extraction engine of some embodiments (e.g., the remote extraction engine 1120 of FIG. 11) performs an extraction of a system configuration of a source platform. The process 1200 begins by remotely accessing (at 1205) a source platform (e.g., the source platform 1105 of FIG. 11). In some embodiments, this accessing includes providing a set of authentication information, such as a log-in name and/or a password. This accessing is performed through any methodology that allows remote access to the source platform. Examples of such methodology include the remote desktop protocol ("RDP"), secure shell ("SSH"), virtual network computing ("VNC") application, etc.

In other embodiments, the process 1200 accesses the source platform through a web application (e.g., a Java "applet") running in a web browser on the source platform. The remote extraction engine of some of these embodiments runs an application server (e.g., a Java "servlet") that performs some or all of the process 1200. In yet other embodiments, a user uploads an image of the system configuration to the remote extraction engine 1120.

The process then requests (at 1210) and receives a set of attributes of the system configuration of the source platform. As mentioned above, these attributes includes operating system name, operating system version, kernel name, kernel version, and/or any other attribute. These requests invoke commands that are executed at the source platform. For instance, when the operating system of the source system configuration is a Linux operating system, one of these commands is a uname-a command that provides information about the kernel (e.g., name, version number), as well as other attributes of the system configuration (e.g., kernel release date, machine hardware name, CPU type, operating system name, etc.). The remote extraction engine of some embodiments also requests other attributes, including a set of device drivers of the source system configuration. While some embodiments of the remote extraction engine cause the source machine to execute a uname command, as mentioned above, other embodiments utilize other well-known methodologies for determining the attributes of the source system configuration in lieu of, or in addition to, executing a uname command (e.g., checking a device manager of an operating system of the source system configuration, as mentioned above).

The remote extraction engine of some embodiments issues a command that causes the source machine to record and store these attributes in a file or set of files (e.g., text file(s), XML file(s), etc.). In some of these embodiments, the remote extraction engine issues a command that causes the source machine to transmit the file or set of files to the remote extraction engine in addition to, or in lieu of storing these attributes at the source machine. Additionally, in some embodiments, the remote extractor issues a command that causes the source machine to transmit some or all of the data contents (e.g., operating system, kernel, drivers, document files, etc.) of the source system configuration (e.g., data stored on a hard drive of the source machine) to the remote extraction engine. In other words, the remote extraction engine of some embodiments creates a copy of the data contents of the hard drive(s) of the source system configuration and receives some or all of the data contents of the hard drive(s).

After receiving (at 1210) the attributes of the source system configuration, the remote extraction engine generates (at 1215) a system configuration package (e.g., the system configuration package 1140 of FIG. 11) that includes some or all of the attributes that were previously received (at 1110). In some embodiments, this system configuration package is a single file. For example, the system configuration package is an image file, such as an .iso file. Alternatively, the system configuration package may be organized as multiple files. In addition to including some or all of the attributes, the system configuration package of some embodiments also includes some or all of the data stored by the source machine, such as the operating system, the kernel, a set of device drivers, and/or a set of application programs. The attributes of the computer system may be listed in a separate file or set of files (e.g., text file(s), XML file(s), etc.) in the system configuration package.

After generating (at 1215) the system configuration package, the remote extraction engine of some embodiments transmits (at 1220) the system configuration package. In some embodiments, the system configuration package is received by an adaptation engine (e.g., the adaptation engine 1135 of FIG. 11) through a network (e.g., a LAN, the Internet, or any other network). As mentioned above, the adaptation engine of some embodiments then uses this system configuration package in order to adapt the system configuration to be operable on a different platform.

C. Other Embodiments

In some of the above described embodiments, a system configuration package generated by an extraction engine includes attributes of the system configuration. However, in some embodiments, a system configuration package includes an image of the entire file system of the system configuration, but does not include attributes of the system configuration. In other words, the system configuration package includes all of the contents of some or all storage devices (e.g., hard drive(s)) of the source system configuration. In some of these embodiments, the analysis operations described above are performed by an adaptation engine (e.g., the adaptation engine 705*a* of FIG. 7). Section IV, below, describes several exemplary methodologies of some embodiments that adapt a system configuration to be operable on a destination platform.

IV. Adaptation of a System Configuration Operable on a Source Platform to be Operable on Destination Platform As mentioned above, an adaptation engine of some embodiments (e.g., the adaptation engine 705*a* of FIG. 7) adapts a system configuration that is operable on a source platform to be operable on a destination platform. The adaptation engine uses one or more processes to perform this adaptation. Examples of these processes, which are further described below with reference to FIGS. 15-21, include importing a kernel into the system configuration, porting device drivers into the system configuration, and emulating hardware required by the system configuration.

Sub-section A below describes a software module diagram for the adaptation engine of some embodiments. Sub-section B describes a process that the adaptation engine uses in determining whether to import a kernel and/or port a set of drivers. Next, sub-sections C and D describe exemplary methodologies that perform the abovementioned importing of a kernel and porting of a set of device drivers. Finally, Sub-section E describes a process that emulates a set of hardware requested by a source system configuration in order to adapt the system configuration to be operable on a destination node.

A. Software Module Diagram of Adaptation Engine

Figure 13:
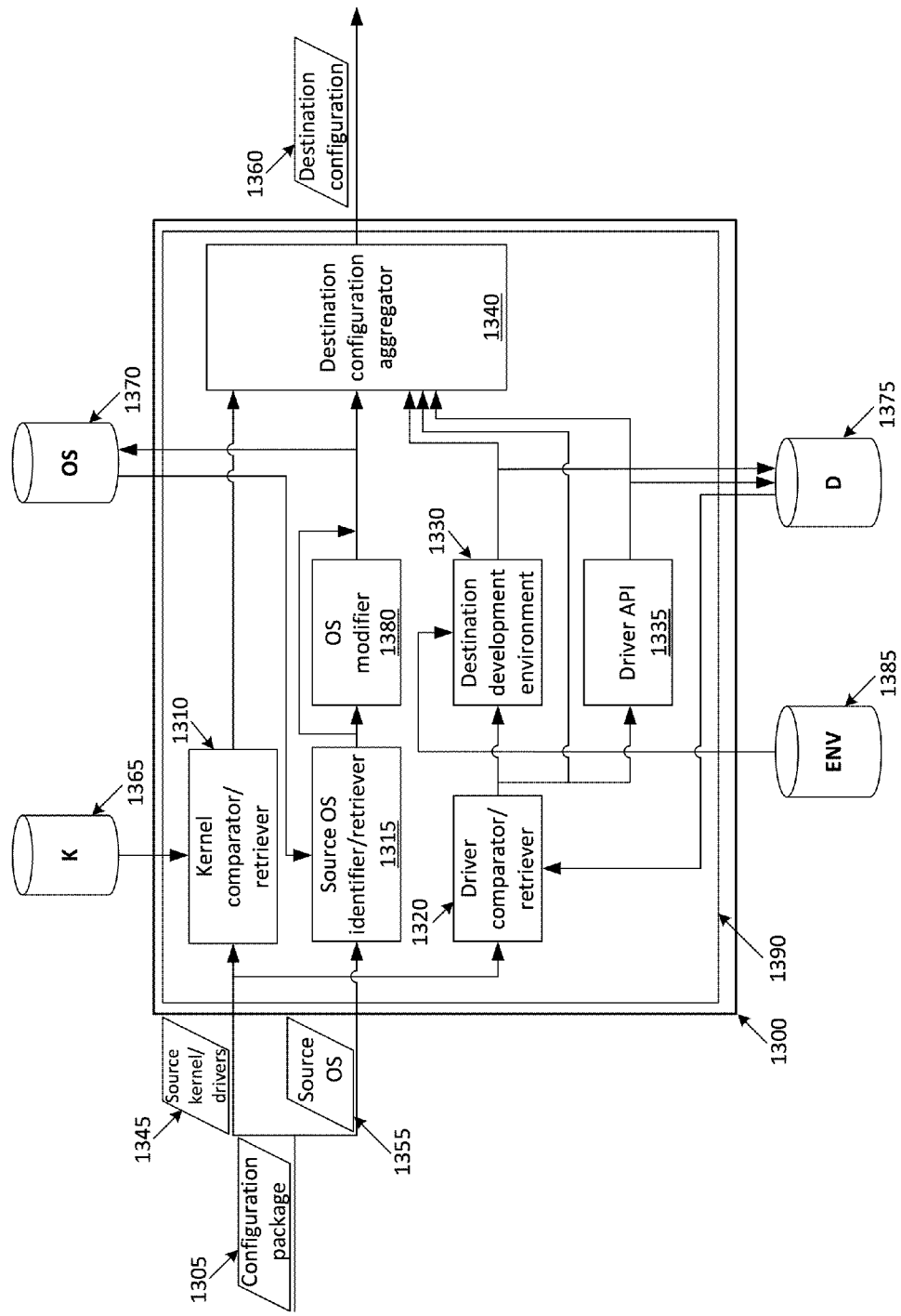
FIG. 13 illustrates a software block diagram of an adaptation engine of some embodiments of the invention.

The adaptation engine of some embodiments includes a set of software modules that run on one or more particular machines (e.g., computer systems used for adapting system configurations). These machines include each of the nodes of the hosting system described with reference to FIG. 4. Alternatively, these machines include a machine at a central location within the hosting system such as the hypervisor management module of some embodiments. FIG. 13 illustrates a software module block diagram of an adaptation engine 1390 of some embodiments that runs on a computer system 1300 in order to adapt a source system configuration of a source platform into a destination system configuration 1360 that runs on a destination platform.

The adaptation engine 1390 includes a kernel comparator/retriever module 1310, a source operating system identifier/retriever module 1315, a driver comparator/retriever module 1320, an operating system modifier module 1380, a destination development environment module 1330, a driver API module 1335, and a destination system configuration aggregator module 1340. The adaptation engine 1390 includes interfaces to several libraries, including a kernel library 1365, an operating system library 1370, a driver library 1375, and a development environment library 1385. In some embodiments, one or more of these libraries correspond to the libraries illustrated in FIG. 7. The functionality of these various modules and libraries is further elaborated below in Sub-sections B-E. However, the following is a brief discussion of the functionalities of these modules and libraries.

As mentioned above, the adaptation engine 1390 receives a system configuration package 1305 (e.g., a system configuration package that is provided by an extraction engine) of a source system configuration. The system configuration package 1305 includes a source kernel, a set of drivers 1345, and source operating system 1355. The kernel comparator/retriever module 1310 analyzes the source kernel 1345 and determines whether a compatible kernel is available in the kernel library 1365. Upon determining that a compatible kernel is available, the kernel comparator/retriever module 1310 retrieves the compatible kernel from the kernel library 1365. This determination is further described with reference to FIG. 16, below.

The kernel is then passed to the destination system configuration aggregator module 1340. The destination system configuration aggregator module 1340 aggregates data passed from the other modules of the adaptation module 1390 in order to output the destination system configuration 1360, which is a file or set of files in some embodiments.

The source operating system identifier/retriever module 1355 analyzes the source operating system 1355 and determines whether a compatible operating system is available in the operating system library 1370. Upon determining that a compatible operating system is available, the operating system comparator/retriever module 1315 retrieves the compatible operating system from the operating system library 1370.

The operating system comparator/retriever module 1315 also determines whether the operating system (either the retrieved operating system or the original source operating system) needs to be modified in the adaptation process. Upon determining that the operating system needs to be modified, the operating system comparator/retriever module 1315 provides the operating system (either the retrieved operating system or the original source operating system) to the operating system modifier module 1380. In some embodiments, the operating system comparator/retriever module 1315 also passes a message to the operating system modifier module 1380 that indicates what changes need to be made. The operating system modifier module 1380 then performs the indicated one or more modifications to the operating system. Some embodiments of a process that modifies the operating system are further described below with reference to FIGS. 18-19D.

After making the modification, the operating system modifier module 1380 of some embodiments provides the modified operating system back to the operating system library 1370 for retrieval in later adaptation processes, thereby eliminating the need for modifying the operating system in the same way again. The retrieved, modified, and/or original source operating system is then provided to the destination system configuration aggregator module 1340.

The driver comparator/retriever module 1320 determines whether one or more of the source drivers 1345 of the source platform need to be replaced by importing a set of device drivers into the source system configuration in order to generate the destination system configuration 1360. The driver comparator/retriever module 1320 also determines whether the drivers that need to be imported are available in the driver library 1375. Upon determining that compatible device drivers are available, the driver comparator/retriever module 1320 retrieves the compatible drivers from the driver library 1375.

Upon determining that the drivers are not available, the driver comparator/retriever module 1320 determines that these drivers need to be generated, either automatically through a destination development environment building process, or by using a device driver API of the source kernel and/or operating system. The driver comparator/retriever module 1320 supplies the source drivers to the driver API module 1335 or to the destination development environment module 1330. These modules 1330 and 1335 generate the required drivers and supply them to the destination system configuration aggregator 1340. In some embodiments, these modules 1330 and 1335 also supply the generated drivers to the driver library 1375 for retrieval in later adaptation processes, thereby eliminating the need for generating the same driver(s) again.

The destination development environment module 1330 retrieves a development environment of the kernel and operating system, also known as "clean versions" of the kernel and operating system (e.g., a version that is unchanged compared to a version released by a vendor or original developer of the operating system and kernel) from the development environment library 1385. The destination development environment module 1330 generates drivers using the retrieved development environment. The destination development environment module 1330 provides these generated drivers to the destination system configuration aggregator module 1340. Some embodiments of processes that generate device drivers are described below with reference to FIGS. 20-22.

One of ordinary skill in the art would recognize that the above-described software module block diagram describes some embodiments of the invention, but other embodiments are possible without departing from the scope of the invention. For instance, some software modules could be combined into a single software module. On the other hand, a software module that is represented as a single module in FIG. 13 may actually be implemented as two or more software modules in some embodiments. Additionally, it should be apparent to one of ordinary skill in the art that the software modules of the adaptation engine of some embodiments operate to perform a physical transformation of computer readable medium. For example, the adaptation engine converts the source system configuration operable on a source platform to a destination system configuration operable on a destination platform. The following sub-sections more specifically describe the functionality that is performed by the software modules of the adaptation engine 1390.

B. Determining an Appropriate Adaptation Process

Figure 14:
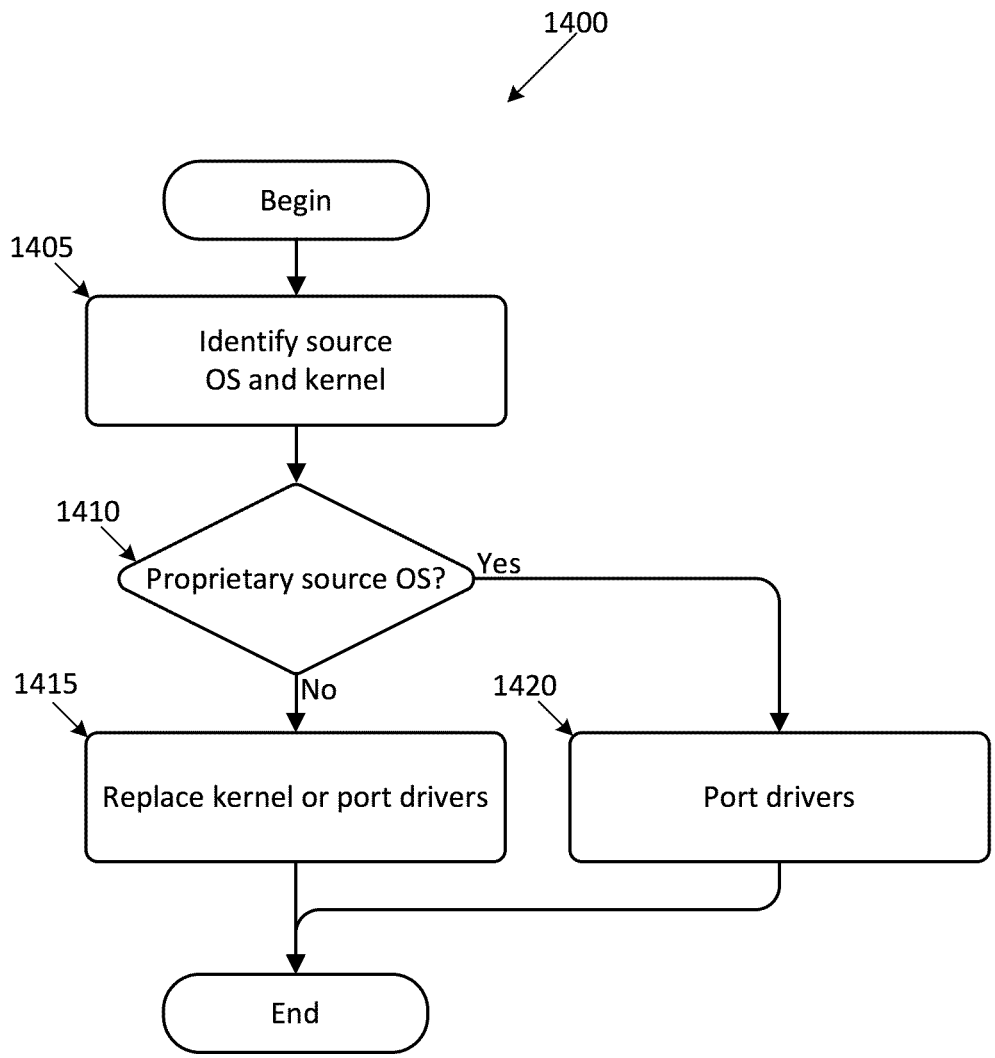
FIG. 14 illustrates a flowchart of a process that determines whether to import drivers into a system configuration or replace a kernel of the system configuration based on the operating system of the system configuration.

FIG. 14 illustrates a process 1400 by which some embodiments determine whether to import a kernel or port a set of drivers when adapting a source system configuration of a source platform to be operable on a destination platform. The process 1400 begins by identifying (at 1405) an operating system and kernel of the source system configuration. In some embodiments, the identification information is included in the system configuration package, as described above. The identification information includes an entry in a file of the system configuration package that indicates the operating system name, vendor, and/or version number. When the system configuration package does not include the identification information, some embodiments execute processes to identify the identification information before commencing the adaptation process.

Based on the identification information, the process 1400 determines (at 1410) whether the operating system is a proprietary operating system. A proprietary operating system is an operating system for which an associated kernel cannot be separately manipulated. In some embodiments, a proprietary operating system is not an open source operating system. A proprietary operating system is an operating system for which a licensing fee must be paid in order to install and/or use the operating system. Examples of such proprietary operating systems include Microsoft Windows XP® and Sun Microsystems Solaris®. To determine whether the operating system within the source system configuration is a proprietary operating system, the process 1400 checks a database that lists proprietary operating systems. When the operating system is a proprietary operating system, the process ports drivers (at 1420) into the system configuration in order to adapt the system configuration to be operable on a destination platform. A process of some embodiments of porting drivers is described below with reference to FIGS. 20-21.

A non-proprietary operating system is an open-source operating system. A non-proprietary operating system is available under the GNU General Public License. Examples of non-proprietary operating systems include some distributions of the Linux operating system, such as Fedora®, Debian®, Ubuntu®, etc. Upon determining that the operating system is not a proprietary operating system, the process 1400 performs (at 1415) a further investigation to determine whether to import a kernel or to port drivers. This further investigation is described with reference to FIG. 15, below, which also describes a process of some embodiments for importing a kernel. After making the determination of whether to import a kernel or to port a set of device drivers, the process 1400 ends.

C. Importing a Kernel

Figure 15:
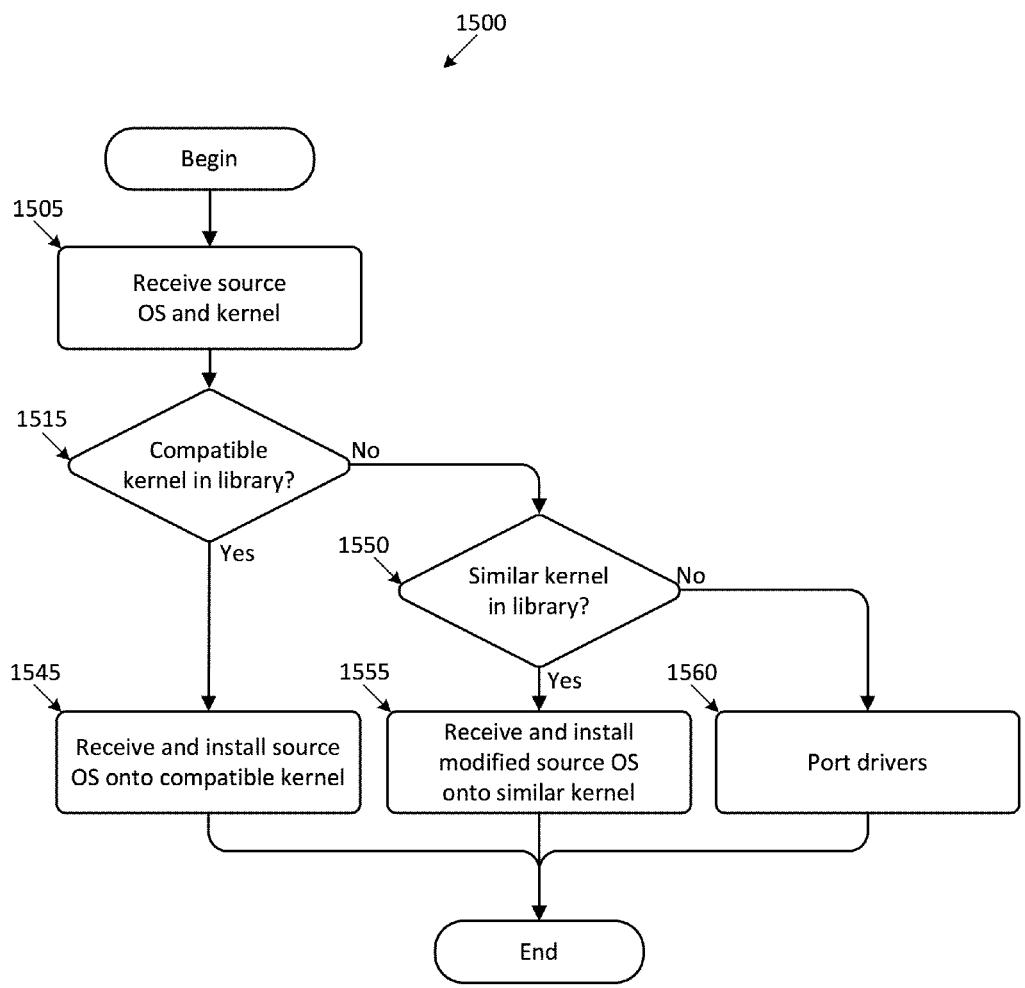
FIG. 15 illustrates a process that determines whether to import drivers into a system configuration or replace a kernel of the system configuration based on whether system configuration information is available in a library.

FIG. 15 illustrates a process 1500 of some embodiments that imports a kernel in order to adapt a source system configuration to be operable on a destination platform. The adaptation engine of some embodiments performs the process 1500 after determining that the operating system of a source system configuration is not a proprietary operating system.

The process 1500 begins by receiving (at 1505) the operating system and kernel of the source system configuration. The process 1500 then determines (at 1515) whether a compatible kernel is present in a library that stores multiple kernels. This determination is described below in further detail with reference to FIG. 16.

In some embodiments, a compatible kernel includes the same interface to the same source operating system as the interface of the source kernel. However, the compatible kernel includes a different hardware interface than the source kernel. In other words, the source kernel includes a hardware interface that interfaces with hardware (either physical hardware or virtual hardware) of the source platform, while the compatible kernel includes a hardware interface that interfaces with hardware (either physical hardware or virtual hardware) of the destination platform.

The process 1500 receives the compatible kernel and installs (at 1545) the source operating system onto the received compatible kernel. In some embodiments, installing (at 1545) the source operating system onto the received compatible kernel entails storing the source operating system and the received compatible kernel in a single location (e.g., a storage device of a computer system). In some embodiments, installing (at 1545) the source operating system entails overwriting one or more files of the source operating system. The source operating system and the received compatible kernel are referred to as the adapted source system configuration or the destination system configuration. After installing (at 1545), the process 1500 ends.

When the process 1500 determines (at 1515) that a compatible kernel is not present in the kernel library, the process determines (at 1550) whether a similar kernel is in the library. This may occur in the case where the source system configuration is modified and a compatible kernel with the same modification (also referred to as an "unsupported" modification) is not present in the kernel library. Such unsupported modifications include proprietary file systems (e.g., file systems developed by a developer that does not release the source code), proprietary networking protocols (e.g., networking protocols used in the banking industry), and/or other modifications of which the nature cannot be determined. In contrast, "supported" modifications (i.e., modifications for which a compatible kernel is present in the library) include an open-source file system (e.g., global file system ("GFS") or internet small computer system interface ("iSCSI")) or other common modifications of which the nature can be determined. The discussion of FIG. 18, below, further elaborates on how this determination (at 1515) is made.

Upon determining (at 1550) that a similar kernel is present in the library, the process 1500 receives a modified version of the source operating system and installs (at 1555) the modified source operating system onto the similar kernel. The process 1500 then ends.

If, however, the process 1500 determines (at 1550) that a similar kernel is not present in the kernel library, the process 1500 ports (at 1560) a set of device drivers into the source system configuration. As mentioned above, this porting (at 1560) of drivers is described below with reference to FIG. 20. The process 1500 then ends.

1. Importing a Compatible Kernel

Figure 16:
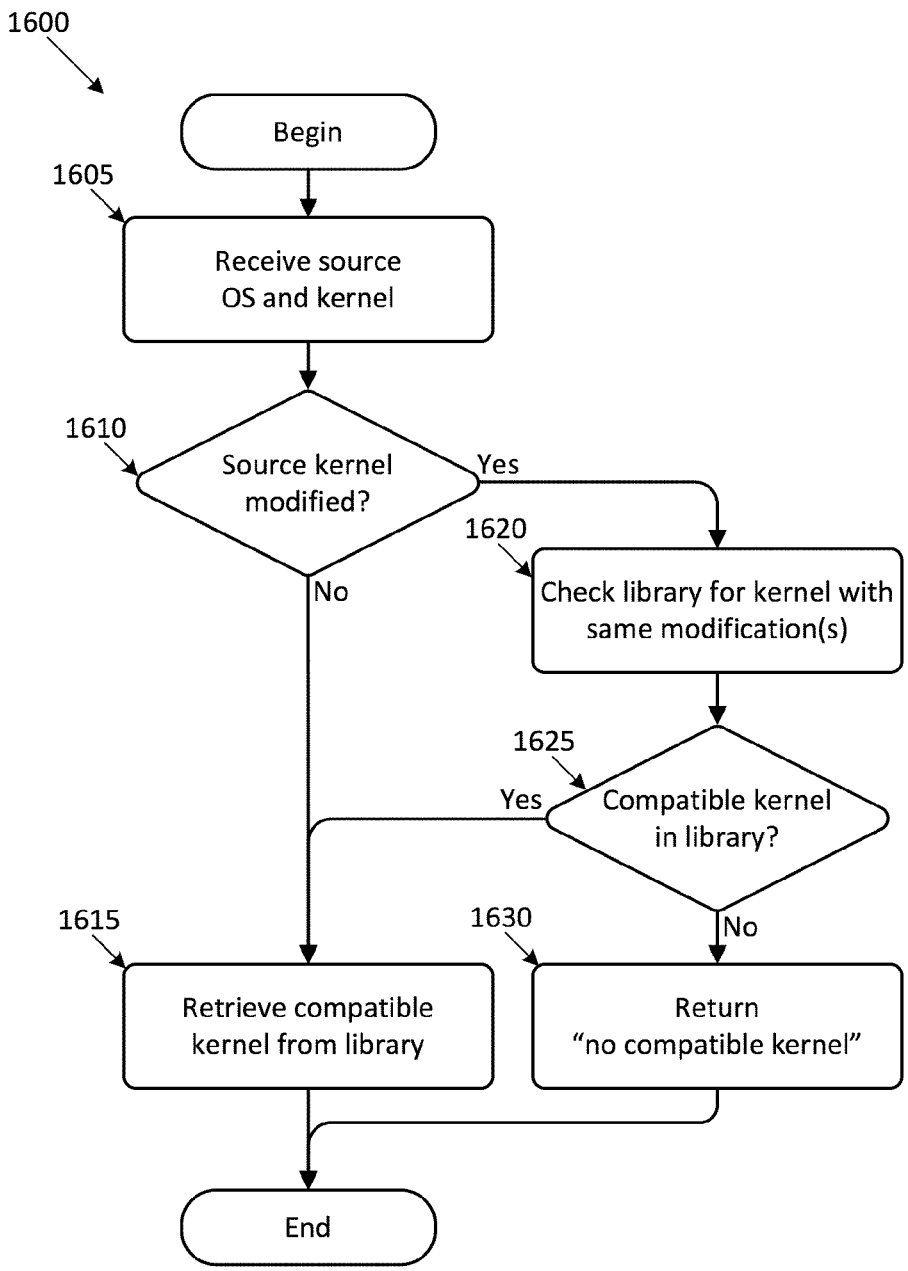
FIG. 16 illustrates a process that replaces a kernel of a system configuration with a compatible kernel found in a library that stores kernels.

FIG. 16 illustrates a process 1600 that determines whether a compatible kernel is in a kernel library. A "compatible" kernel of some embodiments includes the same interface to the source operating system, but a different hardware interface (i.e., the source kernel includes an interface to hardware of the source platform, while the compatible kernel includes an interface to hardware of the destination platform). The process 1600 may be performed at decision operation 1515 of the process 1500, as shown in FIG. 15.

The process 1600 begins by receiving (at 1605) the source operating system and kernel. The process 1600 determines (at 1610) whether the source kernel is modified. In some embodiments, a modified kernel is a kernel that includes modifications as compared to an unmodified (also referred to as "clean" or "standard") version of the kernel that was distributed by an entity that originally created the kernel. These modifications include modifying a file system of the source kernel, modifying a set of networking protocols, and modifying one or more drivers as some examples. In some embodiments, the process 1600 makes this determination by examining the version number of the source kernel and comparing this version number to a list of version numbers of unmodified kernels.

In addition to, or in lieu of comparing version numbers, some embodiments compare other parameters of the kernels in order to determine compatibility. In some embodiments, these other parameters are attributes listed in a system configuration package generated by an extraction engine. Examples of other parameters include a number of processors, number of network devices, input device (such as keyboard and/or mouse) drivers, display drivers, IP address, hostname, etc. When the process 1600 determines (at 1610) that the source kernel is not modified, then the process 1600 retrieves (at 1615) a compatible unmodified kernel for the destination platform from the kernel library. The process 1600 then ends.

When the process 1600 determines (at 1610) that the source kernel is a modified kernel, then the process 1620 checks (at 1620) the library for a kernel with the same modification (or modifications) as the source kernel. The process 1600 determines (at 1620) whether a compatible kernel is present in the kernel library. The process 1600 of some embodiments makes this determination by identifying version numbers of the kernels stored in the library and comparing them to the version number of the source kernel. In some embodiments, a matching version number indicates that a kernel in the kernel library includes the same modifications as the source kernel, and is thus a compatible kernel. When kernels are placed in the library (e.g., before the process 1600), unique identifiers may be appended to the version numbers in order to insure that a matching version number indicates an actual match.

When the process 1600 determines (at 1625) that a kernel with the same modifications as the source kernel (i.e., a compatible kernel) is present in the kernel library, then the process 1600 retrieves (at 1615) the compatible kernel from the kernel library. However, when the process 1600 determines (at 1625) that a compatible kernel is not present in the kernel library, then the process 1600 returns (at 1630) "no compatible kernel." The process 1600 then ends.

FIGS. 17A-17D conceptually illustrate hardware and software layers of the source and destination system configurations, and the relationships between these layers, during different stages of importing a compatible kernel that is found in a library during adaptation of a source system configuration to be operable on a destination platform. The various layers of these figures indicate compatibility with one another through conceptual notches and pegs that can be inserted into the notches. In other words, the conceptual notches and pegs represent interfaces between layers. For instance, a layer with a rectangular notch in the top-center of the layer (e.g., source kernel 1715) is compatible with a layer with a rectangular peg in the bottom-center of the layer (e.g., source OS 1710). One of ordinary skill in the art would recognize that these notches and pegs conceptually represent hardware and software interdependencies, and do not represent actual physical notches and pegs.

Each of these figures shows three different types of layers: hardware layers, kernel layers, and operating system layers. Each hardware layer is illustrated with one or more conceptual notches and/or pegs at the top of the layer to indicate that that the hardware layer interfaces with a kernel layer. Each kernel layer is illustrated with one or more conceptual notches and/or pegs at both the bottom and the top of the layer to indicate that the kernel layer interfaces with both a hardware layer and an operating system layer, respectively. Finally, each operating system layer is illustrated with one or more conceptual notches and/or pegs at the bottom of the layer to indicate that the operating system layer interfaces with a kernel layer. One of ordinary skill in the art would recognize that in some embodiments, one or more of the layers shown in the figures is illustrated with one or more of its interfaces omitted. For instance, a source operating system might include an interface to a set of application programs (not shown).

FIG. 17A illustrates a source system configuration 1705 that operates on a hardware layer 1720 of a source platform. In some embodiments, the hardware layer 1720 includes a set of hardware components (either physical or virtual). The source kernel 1715 of the source system configuration 1705 is compatible with the hardware layer of the source platform 1720 as the conceptual pegs and notches of the two layers "fit" together. In other words, the source kernel 1715 interfaces with the hardware layer 1720 of the source platform. Also as shown by the figure, the source operating system 1710 is compatible with the source kernel 1705. In other words, the source kernel 1715 interfaces with the source operating system 1710. Accordingly, the source kernel 1715 includes an interface to (1) the source hardware layer 1720 and (2) the source operating system 1710.

This figure also illustrates a compatible kernel 1725 that has been retrieved from a kernel library. In some embodiments, this compatible kernel 1725 is retrieved at operation 1615 of the process 1600 described above with reference to FIG. 16. As shown in FIG. 17A, this kernel 1725 is considered to be "compatible" with the source kernel 1715 because both kernels 1715 and 1725 have the same interface to the source operating system 1710. This same interface is emphasized in the figure by a dotted double-sided arrow labeled "match." The compatible kernel 1725 includes a hardware interface that is different from the hardware interface of the source kernel 1715. While the source kernel 1715 includes an interface to the source hardware layer 1720, the compatible kernel 1725 includes an interface to a hardware layer 1730 of a destination platform, as indicated by the matching conceptual notches and pegs.

FIG. 17B conceptually illustrates an installation of the source operating system 1710 of the source system configuration 1705 onto the compatible kernel 1725 that is retrieved from the library. In some embodiments, this installation is performed at operation 1545 of the process 1500, as shown by FIG. 15. FIG. 17B shows that the source operating system 1710 is compatible with the kernel 1725, as the operating system interface of the kernel 1725 matches the kernel interface of the source operating system 1710.

Figure 17C:
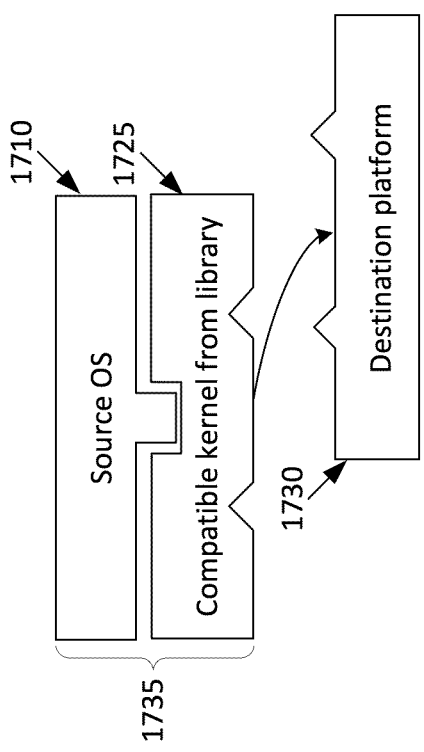

FIG. 17C illustrates an adapted source system configuration, also referred to as a "destination system configuration" 1735. The destination system configuration 1735 includes the source operating system 1710 and the kernel 1725 that was retrieved from the kernel library. In this figure, the destination system configuration 1735 is compatible with the hardware layer 1730 of the destination platform. In other words, the source system configuration 1705 has been adapted to be operable on the destination platform.

Figure 17D:
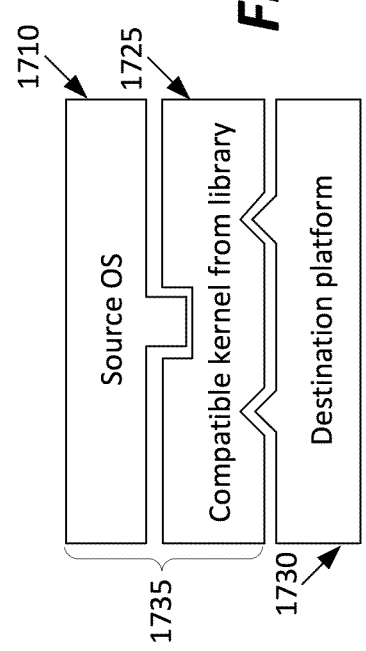

FIG. 17D illustrates the result of the adaptation, a destination platform with the destination system configuration 1735 installed on the hardware layer 1730 of the destination platform. As one of ordinary skill in the art would recognize, the adaptation described above is a transformation of a physical article. The transformation of some embodiments is a transformation of a computer system that does not run the adapted system configuration into a computer system that runs the adapted system configuration.

In some embodiments, a computer readable medium (e.g., a storage device, such as a hard drive) that does not store (e.g., is not physically encoded with) the adapted system configuration is transformed into a computer readable medium that stores (e.g., is physically encoded with) the adapted system configuration. Transforming a computer readable medium includes physically altering the computer readable medium (e.g., physically encoding different data onto a platter of a hard drive). Some embodiments transform a computer system configuration, which is stored on a computer readable medium, into a different computer system configuration, which is stored on the same computer readable medium.

As further described below in Section VII, a system configuration of some embodiments is stored on a computer readable medium as a set of instructions that are executable by a processor of a computer system. Section VII, below, also provides a non-exhaustive list of tangible articles which are considered as examples of computer readable media.

2. Importing a "Similar" Kernel

Figure 18:
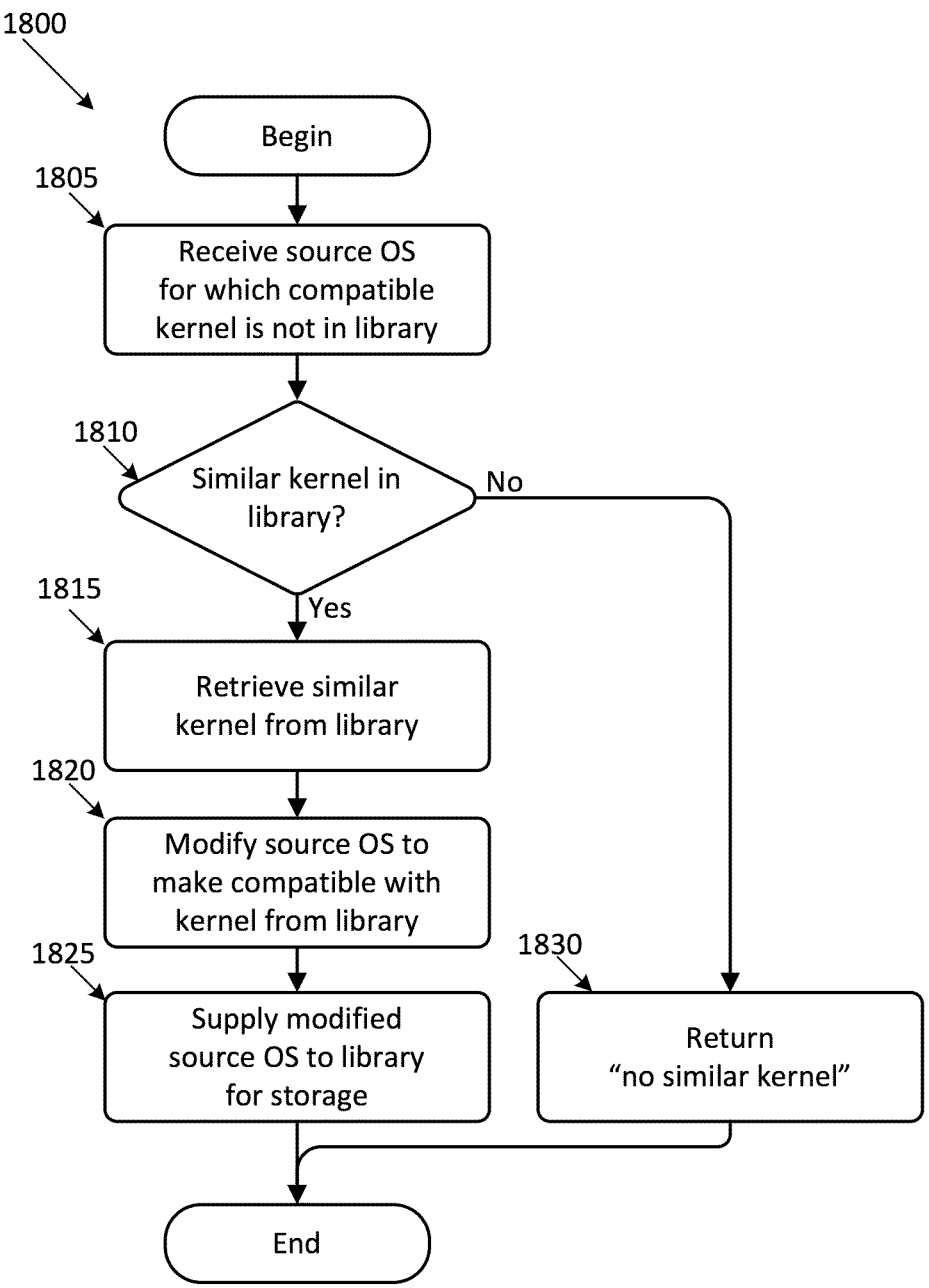
FIG. 18 illustrates a flowchart of a process that modifies an operating system of a system configuration and replaces a kernel of the operating system with a different kernel.

FIG. 18 illustrates a process 1800 of importing a "similar" kernel from a library that stores multiple kernels. A "similar" kernel of some embodiments is a kernel that would interface with the source operating system if one or more changes were made to the source operating system. In some embodiments, the changes that are needed in order to make the source operating system compatible with a similar kernel are previously determined and are stored in a database. Examples of some of these changes to the source operating system include modifying a device manager (e.g., udev in a Linux operating system), modifying a C library, and modifying a RAM disk (e.g., initrd in a Linux operating system). In some embodiments, the process 1800 is performed at the decision operation 1550 of FIG. 15.

The process 1800 begins by receiving (at 1805) an operating system. The process 1800 determines (at 1810) whether a kernel that is compatible with the received operating system is in the library. In some embodiments, this determination includes checking a database that maps operating systems to kernels in order to indicate which operating system is compatible with kernels stored in the library. The mapping in this database may be based on objective or subjective observations that were previously made about compatibility between various operating systems and kernels.

In some embodiments, this database is the same as the database that stores the changes needed in order to make the source operating system compatible with the similar kernel. In some embodiments, this database is physically stored within the library that stores kernels (e.g., the core kernel library 750 of FIG. 7).

When a similar kernel is not found in the library, the process 1800 returns (at 1830) "no similar kernel," and then ends. On the other hand, when a similar kernel is found in the library, the process 1800 retrieves (at 1815) the similar kernel from the library. The process 1800 then modifies (at 1820) the source operating system in order to make the source operating system compatible with the kernel from the library. As mentioned above, examples of modifying the source operating system include modifying udev (in a Linux operating system), modifying a C library, and modifying a RAM disk (or initrd in a Linux operating system).

In lieu of, or before, modifying (at 1820) the source operating system, the process 1800 of some embodiments checks an operating system library (e.g., operating system library 760 of FIG. 7) for a modified version of the source operating system. When the modified source operating system is already present, then the process 1800 does not need to modify (at 1820) the operating system again.

The process 1800 of some embodiments then supplies (at 1825) the modified source operating system to the operating system library for storage and later retrieval. The process 1800 then ends.

FIGS. 19A-19D conceptually illustrate hardware and software layers of the source and destination system configurations, and the relationships between these layers during different stages of the process 1800 described above with reference to FIG. 18. As in FIGS. 17A-17D, FIGS. 19A-19D illustrate three different types of layers: hardware layers, kernel layers, and operating system layers that are illustrated with conceptual notches and/or pegs in order to indicate interfaces with other layers.

Figure 19A:
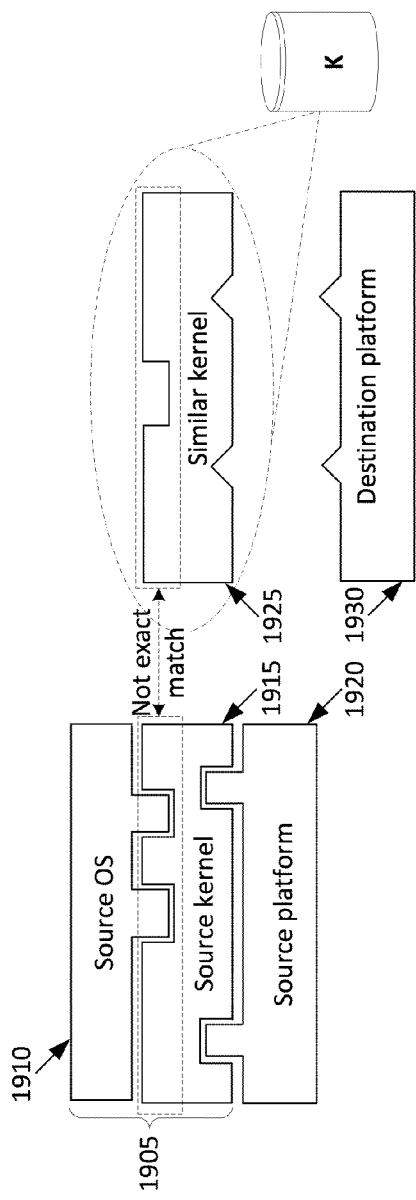
FIGS. 19A-19D conceptually illustrate a process that modifies an operating system of a system configuration and replaces a kernel of the operating system with a different kernel.

FIG. 19A illustrates a source system configuration 1905 that operates on a source platform 1920. The source system configuration 1905 includes a source operating system 1910 and a source kernel 1915. In some embodiments, the source system configuration 1905 also includes other components and/or layers that are not shown in the figure (e.g., a set of software applications that run on the source operating system 1910, etc.).

This figure also illustrates a kernel 1925 that is similar to the source kernel 1915. This similarity is illustrated by the conceptual notches on the tops of the kernels 1915 and 1925, which are similar, but not the same. In some embodiments, as mentioned above, the similar kernel 1925 is retrieved from a core kernel library (e.g., the core kernel library 750 of FIG. 7). This figure further illustrates a destination platform 1930. As indicated by the different conceptual notches, the destination platform 1930 has a different hardware interface (e.g., different physical or virtual hardware devices) than the source platform 1920.

Figure 19B:
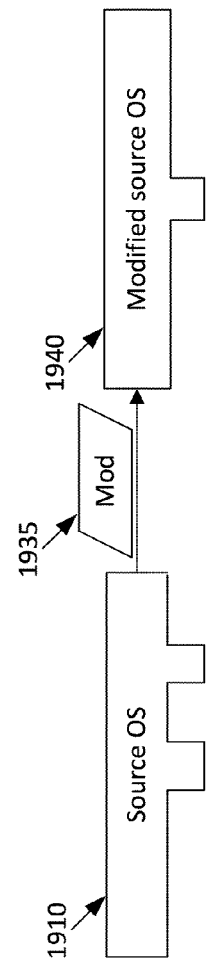

FIG. 19B illustrates the source operating system 1910 before and after a modification (or set of modifications) 1935 is made to the source operating system 1910. In some embodiments, this modification is made at operation 1820 of the process 1800 of FIG. 18. After the modification 1935 is made to the source operating system 1910, the source operating system 1910 becomes the modified source operating system 1940.

Figure 19C:
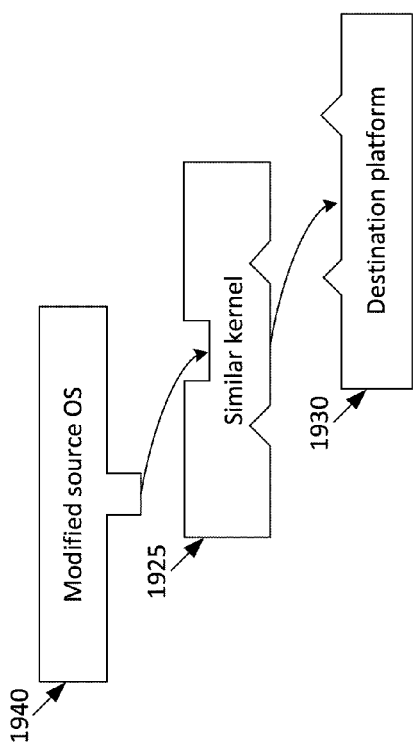
Figure 19D:
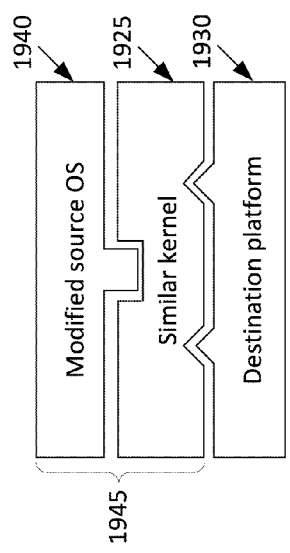

FIG. 19C illustrates that the modified source operating system 1940 is now able to interface with the similar kernel 1925, which is able to interface with the destination platform 1930. Finally, FIG. 19D illustrates a destination system configuration 1945 (i.e., the modified source operating system 1940 and the similar kernel 1925) installed on the destination platform 1930. As one of ordinary skill in the art would recognize, the adaptation described above is a transformation of a physical article. The physical transformation of some embodiments is a transformation of a computer system that does not run the adapted system configuration into a computer system that runs the adapted system configuration.

In some embodiments, a computer readable medium (e.g., a storage device, such as a hard drive) that does not store (e.g., is not physically encoded with) the adapted system configuration is transformed into a computer readable medium that stores (e.g., is physically encoded with) the adapted system configuration. Transforming a computer readable medium includes physically altering the computer readable medium (e.g., physically encoding different data onto a platter of a hard drive). Some embodiments transform a computer system configuration, which is stored on a computer readable medium, into a different computer system configuration, which is stored on the same computer readable medium.

As further described below in Section VII, a system configuration of some embodiments is stored on a computer readable medium as a set of instructions that are executable by a processor of a computer system. Section VII, below, also provides a non-exhaustive list of tangible articles which are considered as examples of computer readable media.

D. Porting Drivers

Figure 20:
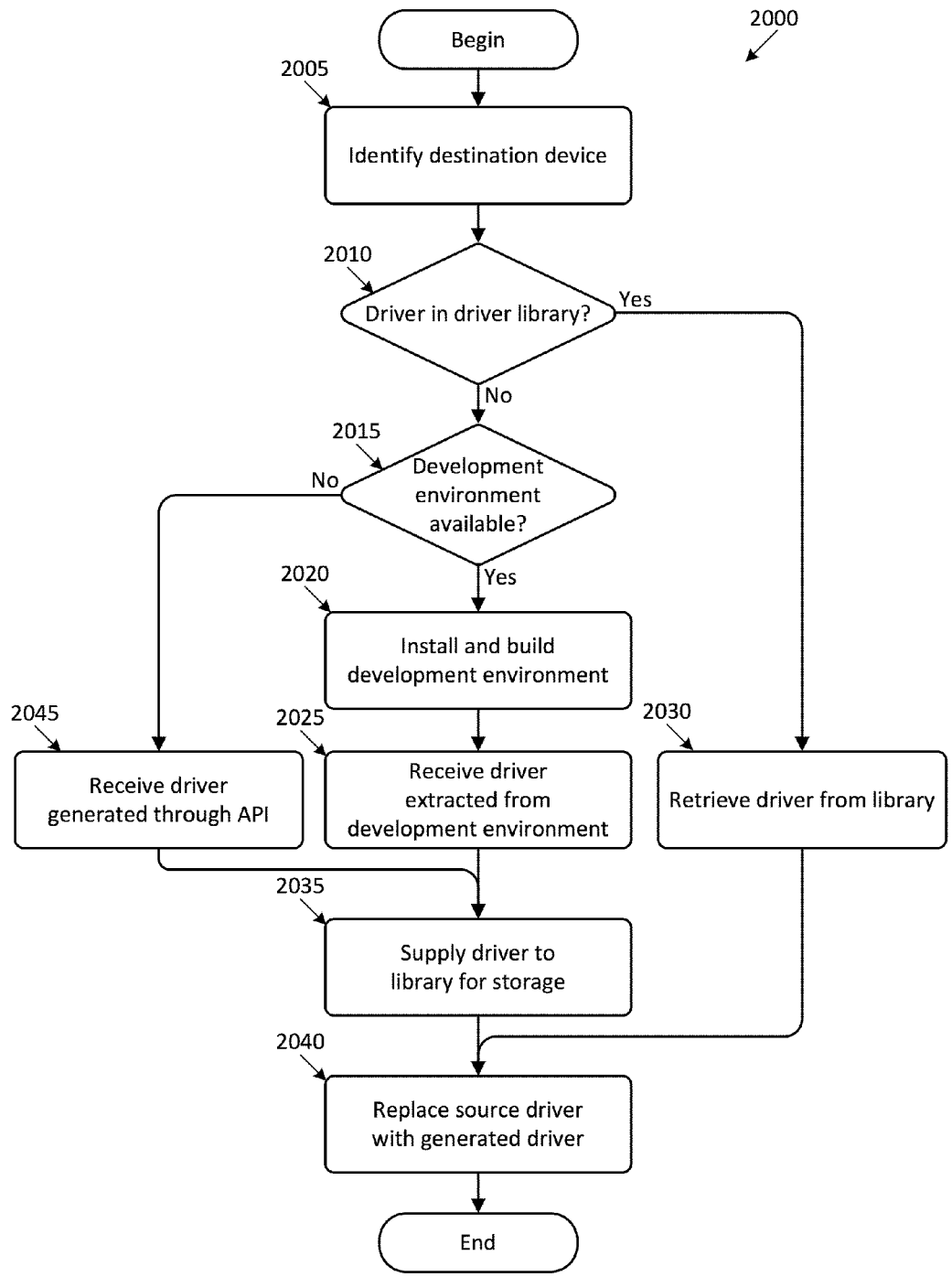
FIG. 20 illustrates a process that imports a set of device drivers into a system configuration.

FIG. 20 illustrates a process 2000 that the adaptation engine of some embodiments performs in order to port a set of device drivers into a source system configuration in order to make the source system configuration operable on a destination platform. The source system configuration includes a set of device drivers that allow the source system configuration to interface with hardware components (either physical or virtual) of the source platform. However, the source system configuration might not include device drivers that allow the source system configuration to interface with hardware components (either physical or virtual) of the destination platform. Thus, the process 2000 of some embodiments imports a set of device drivers into the source system configuration in order to allow the source system configuration to interface with the hardware components of the destination platform.

The process 2000 begins by identifying (at 2005) a hardware device (either physical or virtual) of the destination platform. The adaptation engine of some embodiments has access to a database that stores identifying information regarding the hardware devices of the destination platform. In some embodiments, this identification is received by the adaptation engine from the destination platform (e.g., from the UVM of a destination node). The identification indicates the name, type (e.g., a storage ("block") device driver, a network device driver, a PCI device driver, etc.), manufacturer, and/or any other attribute of the device.

The process 2000 determines (at 2010) whether a device driver that allows the identified device to communicate with the source system configuration is present in a library that stores multiple device drivers (e.g., the driver library 755 of FIG. 7). In some embodiments, this determination (at 2010) includes determining whether a driver in the library corresponds to (1) the same type of device and (2) an operating system and/or kernel of the source system configuration. In some embodiments, a corresponding device driver is similar, but is not an exact match. For instance, the corresponding device driver may be of the same type of device from a different manufacturer, or may be a generic device driver. In some embodiments, the process 2000 looks for such a similar device driver when an exact match is not found in the driver library.

In some of these embodiments, the process 2000 examines a database that correlates devices to acceptable "similar" device drivers. This database is stored within the driver library in some embodiments. This database may be previously generated based on objective or subjective observations that were made about compatibility between various devices and device drivers (e.g., during testing on the destination platform).

When a corresponding device driver is present in the library, the process 2000 retrieves (at 2030) the corresponding driver from the library. The process places (at 2040) the retrieved driver into the source system configuration. In some embodiments, placing the retrieved driver into the source system configuration includes copying a device driver file or set of device driver files of the retrieved driver into a storage (e.g., a folder of a hard drive) that also stores the source system configuration. In some embodiments, the process 2000 deletes the source driver from the source system configuration, while in other embodiments, the process 2000 does not delete the source device driver from the source system configuration. In some of these embodiments, the process 2000 renames the source device driver so that it can be easily located and reinstalled at a later time. The process then ends.

When the process 2000 determines (at 2010) that a corresponding device driver is not located in the driver library, the process determines (at 2015) whether a development environment for the source operating system and kernel is available in a library that stores development environments (e.g., the development environment library 765 of FIG. 7). When the process 2000 determines (at 2015) that a development environment is available in the development environment library, the process 2000 of some embodiments retrieves the development environment from the library and installs (at 2020) the development environment onto the destination platform in order to automatically generate the required device driver. This operation 2020 is further described below with reference to FIG. 21.

The process 2000 then receives (at 2025) a device driver generated using the development environment. In some embodiments, the process 2000 supplies (at 2035) the generated driver to an adaptive library that stores drivers (e.g., the driver library 755 of FIG. 7) in order to allow the generated driver to be retrieved later (e.g., at a later iteration of the process 700—specifically at determination operation 2010 in some embodiments). The adaptive driver library of some embodiments is further discussed below. The process 2000 of some other embodiments does not perform this supplying operation to a driver library and instead transitions directly to the next operation 2040.

At operation 2040, the process 2000 replaces, in the source system configuration, a device driver of the device that was identified (at 2005) with the generated driver. In other embodiments, the process 2000 does not replace (at 2040) this device driver with the generated driver. Rather, the process 2000 simply inserts the generated driver into the source system configuration while not modifying the source device driver in any way. Alternatively, the process 2000 of some embodiments inserts the generated driver into the source system configuration and alters the name and/or location of the source device driver (e.g., appends characters to the end of the name of the source device driver and/or moves the source device driver to a different directory, etc.). The process 2000 then ends.

When the process 2000 determines (at 2015) that a development environment for the source operating system and kernel is not available in the development environment library, then the process 2000 receives (at 2045) a driver that is generated through an application programming interface (or "API") of the kernel. The generating of this driver is further described below with reference to FIG. 22. After receiving (at 2045) the driver generated through the API of the kernel, the process 2000 of some embodiments transitions to operations 2035 and 2040, which are described above. Finally, the process 2000 ends.

As mentioned above, FIG. 21 illustrates a process 2100 of some embodiments that automatically generates a driver using a development environment of a source operating system and kernel. In some embodiments, the process 2100 occurs at operation 2020 of FIG. 20 (i.e., after the process 2000 determines that a required device driver is not in the driver library). The process 2100 is performed at a destination platform (e.g., by a UVM of a destination node) in some embodiments, while the process 2100 is performed at an adaptation engine (e.g., the adaptation engine 705a of FIG. 7) in some other embodiments.

Figure 21:
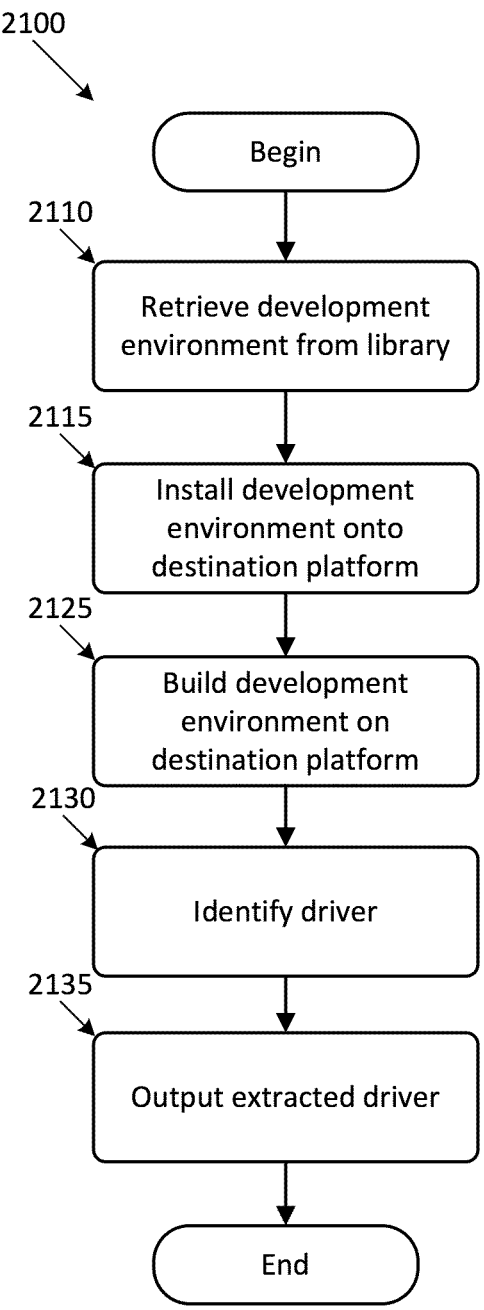
FIG. 21 illustrates a flowchart of a process that imports a set of device drivers into a system configuration using a development environment of an operating system of the system configuration.

The process 2100 of FIG. 21 begins by retrieving (at 2110) a development environment of a kernel and operating system from a development environment library (e.g., the development environment library 765 of FIG. 7). As mentioned above, the development environment includes "clean" versions of the operating system and kernel (e.g., unmodified as compared to the kernel and operating system as they are distributed by developers and/or vendors of the kernel and operating system). The process 2100 installs (at 2115) the retrieved development environment onto the destination platform.

In some other embodiments, in lieu of installing (at 2115) the kernel development environment onto the destination platform, the process 2100 installs the development environment onto a platform that is identical to the destination platform. In cases where the destination platform is a physical hardware platform, the process 2100 installs the development environment onto a platform that includes hardware that is identical to the destination platform. In cases where the destination platform is a virtual hardware platform (e.g., the destination platform includes a virtualization engine on which the destination system configuration runs), the process 2100 installs the development environment onto a platform that includes the same virtual hardware (e.g., the same virtualization engine) as the destination platform. In some of these embodiments, this platform onto which the development environment is installed includes different physical hardware than the destination platform.

Once the development environment is installed onto the destination platform (or an identical platform), the process 2100 builds (at 2120) the development environment on the platform on which the development environment is installed. Building (at 2120) the development environment may be initiated automatically (e.g., through a script) and causes a set of device drivers to automatically be generated. These device drivers allow the source system configuration to interface with the hardware devices of the destination platform. The process 2100 then identifies (at 2125) one or more of these drivers that are automatically generated. In some embodiments, identifying (at 2125) a driver includes comparing a device to which the source driver corresponds to a device to which a generated driver corresponds.

Next, the process 2100 outputs (at 2130) the identified driver. Finally, the process 2100 ends. As mentioned above with reference to FIG. 20, this identified driver may be used in generating a destination system configuration that is an adapted source system configuration.

Figure 22:
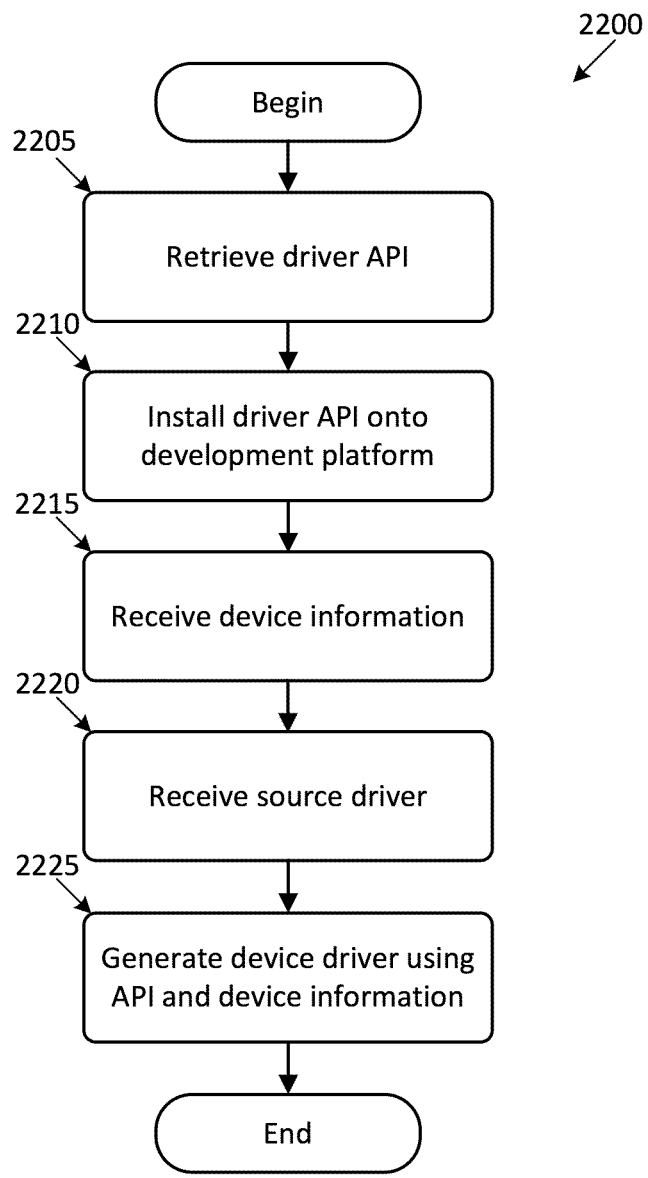
FIG. 22 illustrates a process that generates a set of device drivers using an application programming interface ("API") of a source kernel.

FIG. 22 illustrates a process 2200 that generates a driver using an API of a source kernel so that a hardware device of the destination platform can be used with the source kernel. In some embodiments, this generating of a new driver includes modifying a driver of the source system configuration. In some embodiments, the process 2200 is performed at operation 2045 of the process 2000 of FIG. 20.

The process 2200 of FIG. 22 begins by retrieving (at 2205) the API of the source kernel from a library that stores APIs of kernels (e.g., the API library 770 of FIG. 7). Next, the process 2200 installs (at 2210) the API onto a development platform (e.g., the destination platform, or a computer system that is neither the source platform nor the destination platform, such as the workstation 780 of FIG. 7). In some embodiments, the API is already installed on the development platform. In some of these embodiments, the process 2200 does not perform the retrieval (at 2205) and installation (at 2210) operations. The process 2200 merely performs a check on the development platform to determine that the API is already installed.

The process 2200 receives (at 2215) device information at the development platform. In some embodiments, this device information includes information relevant to developing a device driver that allows the source kernel to interface with the device (e.g., system calls that the device makes and commands to which the device responds). The process 2200 also receives (at 2220) a source device driver for which a matching driver is to be generated (e.g., a matching device driver was not found in the driver library).

Next, the process 2200 generates (at 2225) a device driver that allows the device to communicate with the kernel by using the device information received at operation 2215 and the API installed at operation 2210. In some embodiments, this generating (at 2220) includes manipulating computer code of the source device driver at the development platform. The process 2200 then ends once the device driver is generated.

FIGS. 23A-23D conceptually illustrate hardware and software layers of the source and destination system configurations, and the relationships between these layers during different stages of a driver porting process (e.g., the processes 2000, 2200, and/or 2500, as described above with reference to FIGS. 20-25). As in FIGS. 17A-17D, FIGS. 23A-23D illustrate three different types of layers: hardware layers, kernel layers, and operating system layers that are illustrated with conceptual notches and/or pegs in order to indicate interfaces with other layers.

Figure 23A:
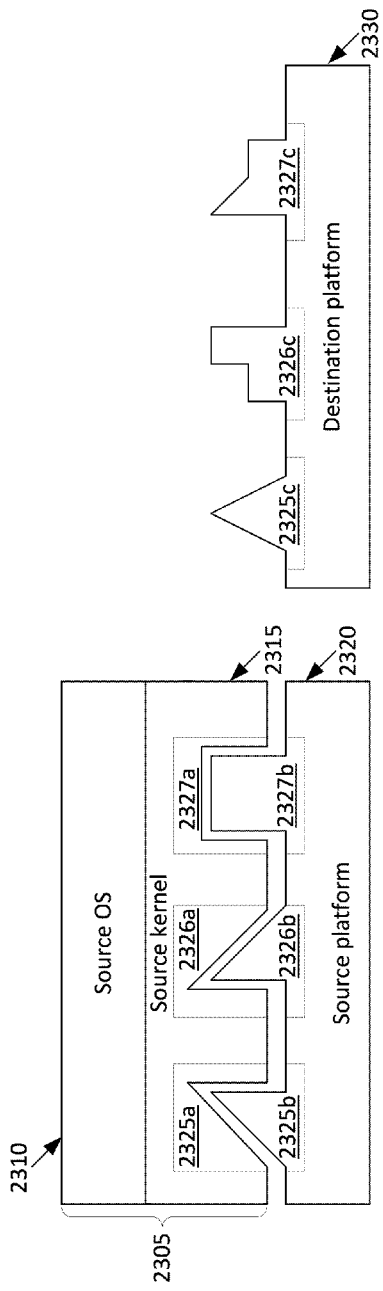

FIG. 23A illustrates a source system configuration 2305 that operates on a source platform 2320. The source system configuration 2305 includes a source operating system 2310 and a source kernel 2315. In some embodiments, the source system configuration 2305 also includes other components and/or layers that are not shown in the figure (e.g., a set of software applications that run on the source operating system 2310, etc.). The source platform 2320 includes a set of hardware devices 2325b, 2326b, and 2327b. These hardware devices include a storage (or "block") device (e.g., one or more hard drives), a network device (e.g., an Ethernet card), a graphics device (e.g., a graphics card), a peripheral component interconnect ("PCI") device, and/or any other type of device. As mentioned above, these devices can be virtual devices or actual physical devices. The source kernel 2315 of some embodiments includes a device driver (e.g., device drivers 2325a, 2325b, and 2325c) that corresponds to each hardware device of the source platform 2320.

FIG. 23A also illustrates a destination platform 2330. Like the source platform 2320, the destination platform includes a set of hardware devices 2325c, 2326c, and 2327c. As shown by the figure, the hardware devices 2325c, 2326c, and 2327c of the destination platform 2330 are different from the hardware devices 2325b, 2326b, and 2327b of the source platform 2320. However, the illustrated hardware devices 2325c, 2326c, and 2327c of the destination platform 2330 may be of the same type as the analogous hardware devices 2325b, 2326b, and 2327b of the source platform 2320. For instance, source device 2325b may be a first block device, while destination device 2325c is a different second block device.

Figure 23B:
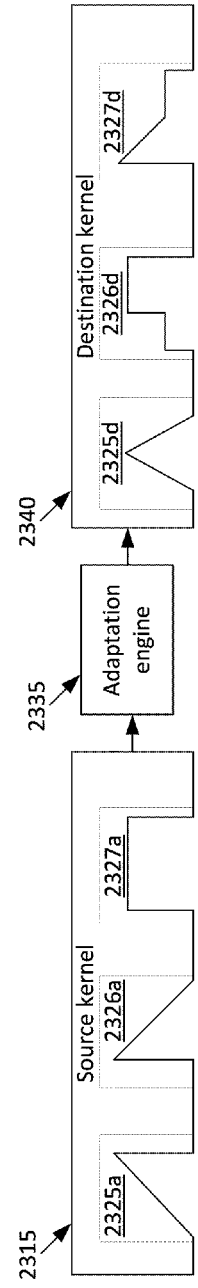

FIG. 23B illustrates the source kernel 2315 before and after device drivers for the hardware devices of the destination platform are ported into the source kernel 2315. As shown in the figure, an adaptation engine 2335 (e.g., the adaptation engine 705a of FIG. 7) receives the source kernel 2315, which includes the source drivers 2325a, 2326a, and 2327a. The adaptation engine 2335 then performs an adaptation process (e.g., the process 2000 described in FIG. 20) in order to replace the source drivers with device drivers 2325d, 2326d, and 2327d, which correspond to the hardware devices 2325c, 2326c, and 2327d of the destination platform 2330. The adaptation engine 2335 then outputs the source kernel with these drivers (also referred to as the "destination kernel").

FIG. 23C illustrates that the source operating system 2315 and the destination kernel 2340 may now be referred to together as the destination system configuration 2345. As shown by the figure, the destination system configuration 2345 can now be installed onto the destination platform 2330.

FIG. 23D illustrates the destination system configuration 2345 (i.e., the adapted source system configuration 2305) installed on the destination platform 2330. As one of ordinary skill in the art would recognize, the adaptation described above is a transformation of a physical article. The physical transformation of some embodiments is a transformation of a computer system that does not run the adapted system configuration into a computer system that runs the adapted system configuration.

In some embodiments, a computer readable medium (e.g., a storage device, such as a hard drive) that does not store (e.g., is not physically encoded with) the adapted system configuration is transformed into a computer readable medium that stores (e.g., is physically encoded with) the adapted system configuration. Transforming a computer readable medium includes physically altering the computer readable medium (e.g., physically encoding different data onto a platter of a hard drive). Some embodiments transform a computer system configuration, which is stored on a computer readable medium, into a different computer system configuration, which is stored on the same computer readable medium. The different computer system configuration is then executed by a processor of a computer system.

E. Emulating Hardware

Figure 24:
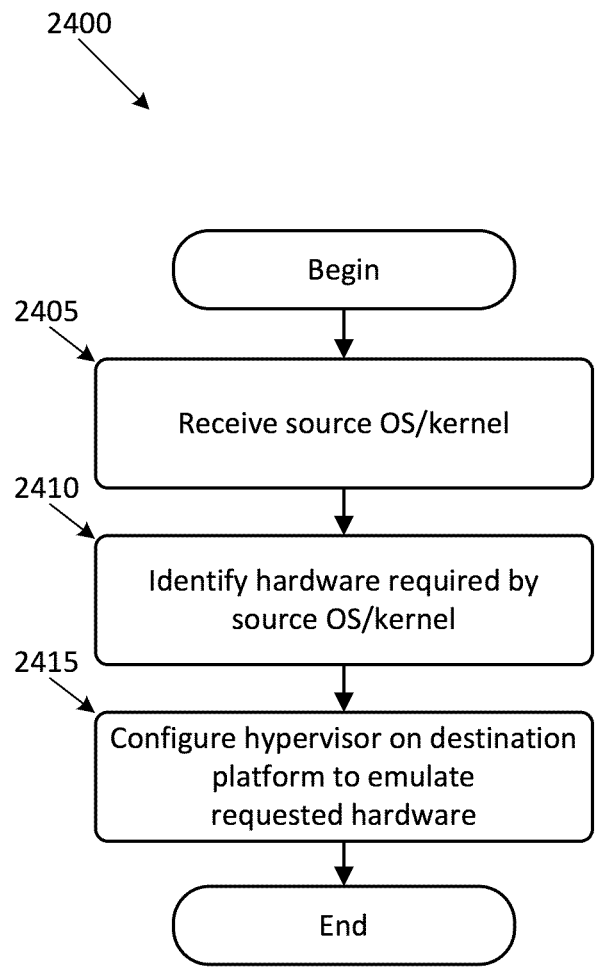
FIG. 24 illustrates a process that emulates a set of hardware requested by a system configuration.

FIG. 24 illustrates a process 2400 that the adaptation engine of some embodiments (e.g., the adaptation engine 705a of FIG. 7) performs to emulate hardware requested by a source system configuration in order to adapt the source system configuration to be operable on a destination platform. In some embodiments, this process 2400 is performed in lieu of the processes 1500 of FIG. 15 and/or 2000 of FIG. 20. In other embodiments, this process 2400 is performed in conjunction with one or both of the processes 1500 or 2000. For instance, when used in conjunction with the process 1500, the process 2400 may be performed after making a negative determination at one or both of the decision operations 1515 or 1550.

The process 2400 begins by receiving (at 2405) the source system configuration. This receiving (at 2405) may include receiving an operating system, a kernel of the source system configuration, and/or associated attributes of the source system configuration. In some embodiments, the process 2400 receives (at 2405) the source system configuration at the adaptation engine as a system configuration package from an extraction engine (e.g., the extraction engine 775 of FIG. 7).

The process 2400 then identifies (at 2410) a set of hardware devices that the source system configuration "expects." Examples of these devices include one or more central processing units ("CPUs"), storage devices (e.g., hard drives), display devices (e.g., graphics cards), networking devices (e.g., Ethernet cards), and/or any other type of hardware device. In some embodiments, this identifying (at 2410) includes identifying hardware devices for which the system configuration includes device drivers. This identifying (at 2410) includes examining a set of device drivers of the system configuration in order to identify devices of the system configuration. While some embodiments of the process 2400 receive the operating system and/or the kernel of the source system configuration, some other embodiments of the process 2400 instead receive an identification (e.g., a list of devices or device drivers in a system configuration package) received from an extraction engine, such as the extraction engine 775 of FIG. 7).

Next, the process 2400 configures (at 2415) a virtualization engine (e.g., a hypervisor) of the destination platform to emulate the identified hardware required by the source system configuration. An example of a hypervisor that is able to emulate hardware is QEMU which is available on the Internet at http://bellard.org/qemu/ under the GNU General Public License. In some embodiments, this system configuration (at 2415) is performed through an API of the hypervisor by a software programmer who has knowledge of the identified hardware (e.g., specific system calls that the identified hardware makes). Other embodiments search a library that stores hypervisor configurations (not shown) in order to determine whether the library already stores the desired hypervisor configuration. When the library does include the desired hypervisor configuration, the process 2400 of these embodiments retrieves the hypervisor configuration.

In some embodiments, configuring (at 2415) the hypervisor to emulate the required hardware includes configuring a hypervisor of the destination platform. Once the hypervisor of the destination platform is configured to emulate the required hardware, the original unmodified source system configuration is installed, and subsequently operated, on the destination platform. In some embodiments, the emulated hardware correlates to hardware (either physical or virtual) of the destination platform. In other embodiments, the emulated hardware is "dummy" hardware that does not correlate to hardware of the destination platform. In such a case, the hardware is emulated in order to satisfy the source system configuration, but performs no actual function.

V. Adaptive Library

Several of the processes of some embodiments described above make reference to one or more libraries (e.g., core kernel library 750, driver library 755, operating system library 760, development environment library 765, and API library 770 of FIG. 7), from which information can be retrieved. This information can be used (e.g., by an adaptation engine 705a of FIG. 7) in the adapting of a source system configuration that is operable on a source platform to be operable on a different destination platform. As further discussed below, the source platform of some embodiments is a node in a grid of nodes of a server hosting system. Moreover, the destination platform of some embodiments is a node in another grid of nodes in a different server hosting system. In some embodiments, the two server hosting systems are operated by two different service providers.

In some embodiments, any one or more of these libraries is an adaptive library. An adaptive library of some embodiments is a library which grows over time in terms of the information it stores. In other words, an adaptive library "learns" information that is used when adapting a source system configuration to be operable on a destination platform.

When information is present in the adaptive library from which the information is requested, the adaptive library is able to provide the requested information. However, cases may arise where the requested information is not present in the adaptive library (e.g., when the process 2000 of FIG. 20 determines (at 2010) that a requested driver is not in a driver library). As shown in FIG. 20, other operations may need to be performed in order to generate the requested driver (e.g., installing and building (at 2020) a development environment). Performing these operations to generate the requested driver is generally not as efficient as simply retrieving the driver from a driver library.

Once an operation (i.e., an operation besides retrieval, such as installing and building a development environment) is performed in order to generate new configuration information (e.g., a driver), the adaptive library of some embodiments stores the new configuration information for later retrieval. Thus, if the information is ever requested again (e.g., during adaptation of another source system configuration with the same or similar characteristics), a subsequent check of the library will yield the requested information, eliminating the need for performing an operation that generates the requested information. Accordingly, the adaptive library allows the adaptation of source system configurations to be operable on destination platforms to be more efficient and less time-consuming.

Additionally, in some embodiments, this adaptive library concept applies not only to aiding in the adapting of system configurations, but also in allowing users to select system configurations that have already been adapted to run on the destination platform. In some of these embodiments, the adaptation module supplies adapted system configurations to an image store database (e.g., image store database 460 of FIG. 4). These adapted system configurations may then be selected by a user for installation on a destination platform through a user interface (e.g., the user interface described above with reference to FIG. 6).

VI. Advantages

Figure 25:
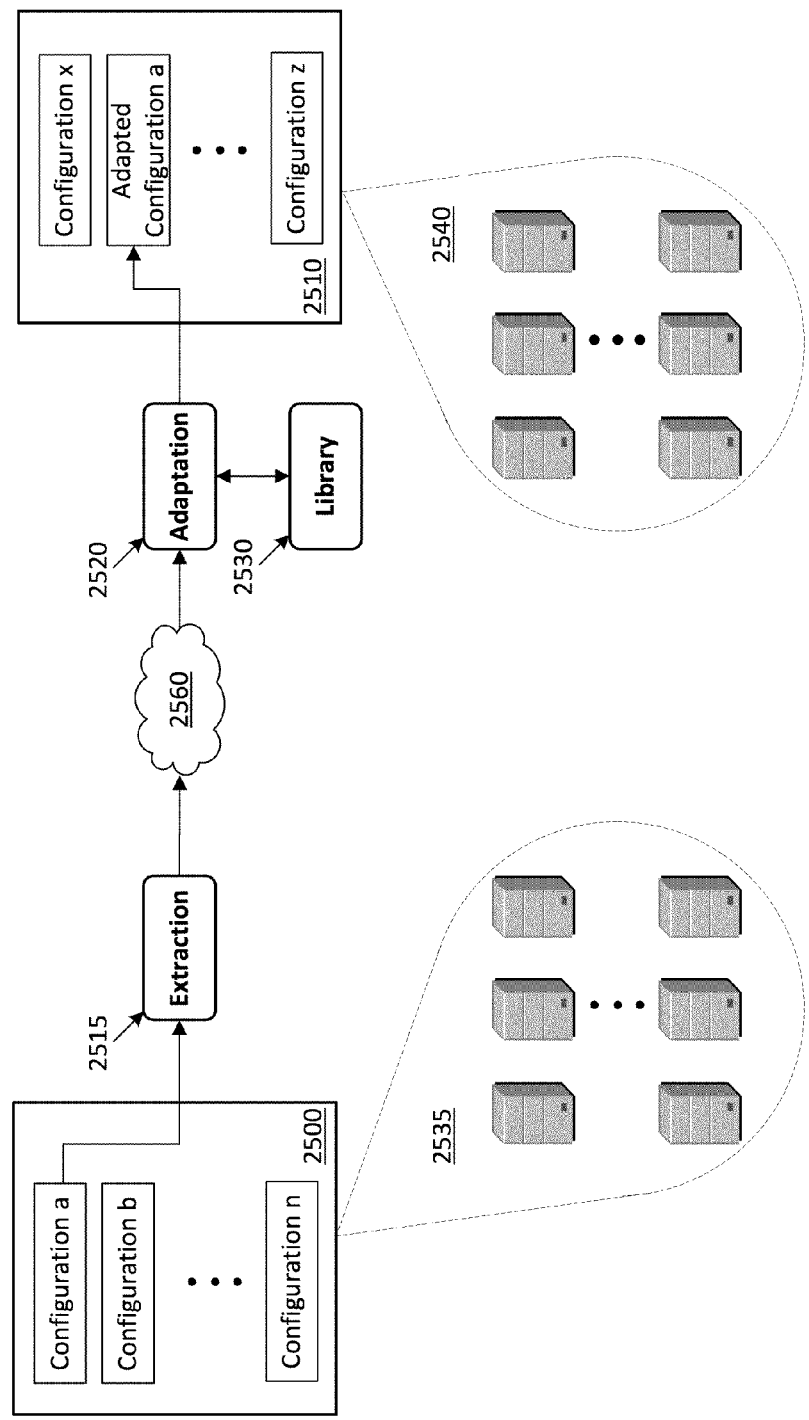
FIG. 25 conceptually illustrates that some embodiments adapt a system configuration that is hosted at a first hosting system to a second hosting system.

The above described embodiments provide several advantages. For instance, a system configuration (e.g., a kernel, an operating system, and/or a set of application programs) that is operable on a source platform may be adapted to be operable on a different destination platform that bears no relation to the source platform. For instance, FIG. 25 illustrates that a system configuration that is hosted in a first hosting environment may be adapted to be operable by a second hosting environment in order to allow the system configuration to be hosted in the second hosting environment. In other words, the first hosting environment includes the source platform and the second hosting environment includes the destination platform. In some embodiments, the first and second hosting environments are operated by different, unrelated service providers (e.g., competing hosting service providers).

Specifically, FIG. 25 illustrates a first hosting system of some embodiments, which is implemented as a grid 2500 of hardware nodes (e.g., hardware nodes shown in exploded view 2535), each of which may run one or more system configurations. In this figure, a source system configuration, "configuration a," runs on a particular node of the grid 2500 of nodes. Additionally, other system configurations, including "configuration b," "configuration n," and any number of other nodes (not shown), run on one or more nodes of the grid 2500 of nodes.

In some embodiments, the source system configuration runs directly on hardware of the source node. In other words, the source system configuration has direct access to hardware of the source node. In other embodiments, the source system configuration runs on a virtualization engine. In some of these embodiments, the virtualization engine is a type 1 hypervisor that directly accesses the physical hardware of the source node and provides a set of virtual hardware to the source system configuration. The virtualization engine of some other embodiments is a type 2 hypervisor that (1) receives access to physical hardware of the source node through an operating system and kernel that have direct access to the physical hardware of the source node and (2) provides a set of virtual hardware to the source system configuration.

Attributes of the source system configuration (i.e., configuration a in this example) are provided to the extraction engine 2515 (either remotely or locally in some embodiments, as described above). Through the network 2560, the extraction engine 2515 of some embodiments provides a system configuration package with extracted attributes of the source system configuration to the adaptation engine 2520, which uses the system configuration package to adapt the source system configuration to be operable on a destination platform. In some embodiments, the adaptation engine 2520 performs this adaptation in conjunction with a library 2530 that stores information such as operating systems, kernels, drivers, etc.

In this figure, the destination platform is located on a node of a second hosting system that is separate from the first hosting system. In some embodiments, the second hosting system is a grid 2510 of nodes (e.g., hardware nodes shown in exploded view 2540).

Figure 26:
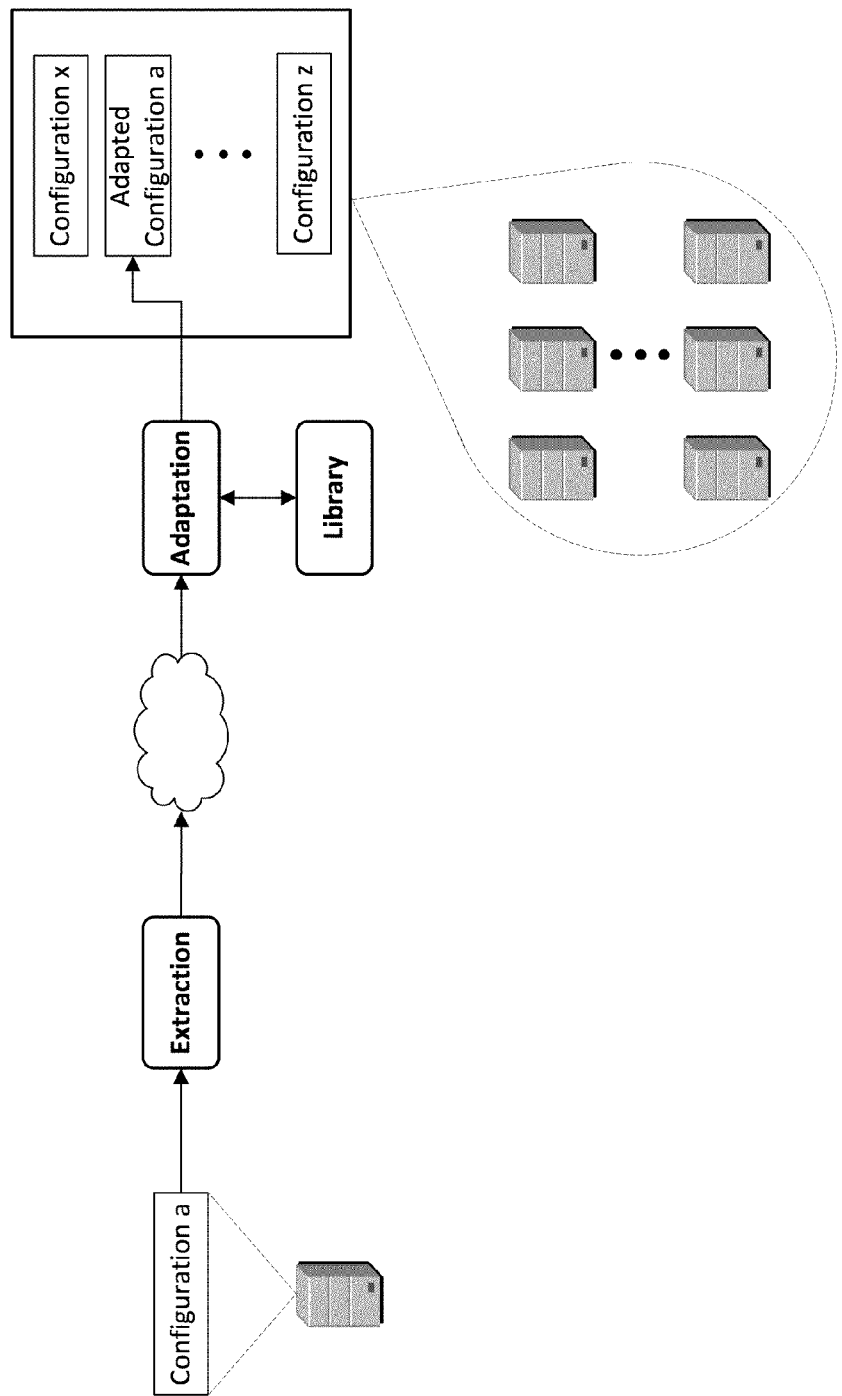
FIG. 26 conceptually illustrates that some embodiments adapt a system configuration that runs on a single computer to a hosting system.
Figure 27:
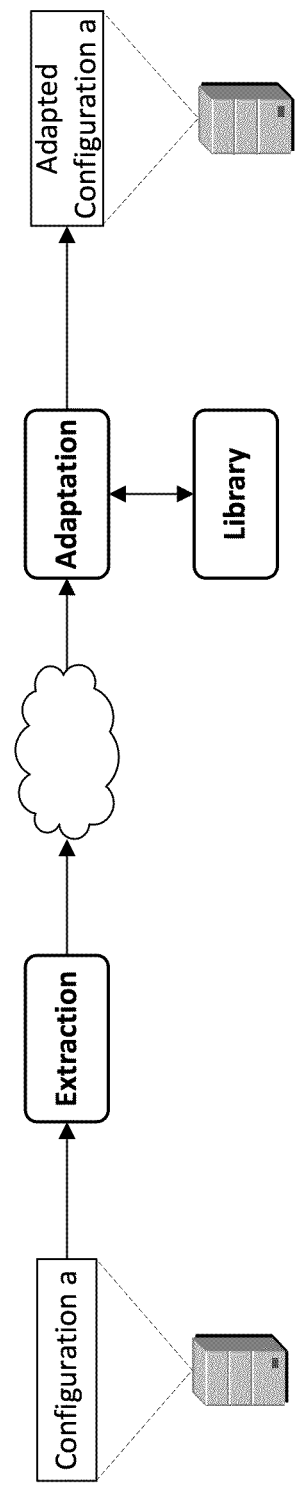
FIG. 27 conceptually illustrates that some embodiments adapt a system configuration that runs on a first single computer to a second single computer.

While some embodiments adapt a system configuration that runs on a node of a first hosting system to allow the system configuration to be operable on a node of a second hosting system, one skilled in the art would recognize that other embodiments of the invention provide other possibilities. For instance, FIG. 26 illustrates that a system configuration that is operable on a single computer system may be adapted to be operable on a node of a hosting system (e.g., a grid of nodes). Additionally, FIG. 27 illustrates that a system configuration that is operable on a single computer system may be adapted to be operable on another single computer system. One of ordinary skill in the art would recognize that FIGS. 25-27 illustrate only some examples of possible types of hardware on which the source and destination system configurations could run, and that other types of hardware not specifically enumerated could be used as well for the source and/or destination platforms.

In some embodiments, the adapted source system configuration (also referred to as the "destination configuration") runs directly on hardware of the destination platform. In other words, in some of these embodiments, the destination system configuration has direct access to hardware of the destination platform. In other embodiments, the destination system configuration runs on a virtualization engine. In some of these embodiments, the virtualization engine is a type 1 hypervisor that directly accesses the physical hardware of the destination platform and provides a set of virtual hardware to the destination system configuration. The virtualization engine of yet other embodiments is a type 2 hypervisor that (1) receives access to physical hardware of the destination platform through an operating system and kernel that have direct access to the physical hardware of the destination platform and (2) provides a set of virtual hardware to the destination system configuration.

In some embodiments, the source system configuration runs directly on physical hardware of the source platform and the destination system configuration runs on a virtualization engine (e.g., a type 1 or type 2 hypervisor), while in other embodiments, the source system configuration runs on a virtualization engine and the destination system configuration runs on physical hardware of the destination platform. In some embodiments, the source system configuration runs on a type 1 hypervisor and the destination system configuration runs on a different type 1 hypervisor, while in other embodiments, the destination system configuration runs on the same type 1 hypervisor as the source system configuration. In some embodiments, the source system configuration runs on a type 2 hypervisor and the destination system configuration runs on a different type 2 hypervisor, while in other embodiments, the destination system configuration runs on the same type 2 hypervisor as the source system configuration.

As is made apparent from the discussion above, some of the embodiments of the invention allow any system configuration that operates on any type of source platform to be adapted to be operable on any type of destination platform. Because of this capability, a user is able to migrate his or her system configuration from his or her computer system onto a hosting system. Moreover, a user may migrate his or her system configuration from one service provider's hosting system into a competing service provider's hosting system. In some embodiments, this migration occurs automatically, and without any human intervention once the migration is initiated. Thus, the migration can occur within a short amount of time (e.g., within five hours of initiation, or less).

VII. Computer System

Some or all of the above-described processes are machine-implemented processes. The processes of some embodiments are tied to one or more particular machines. A particular machine of some embodiments includes a computer system, as further described below. Some embodiments of the above-described processes are implemented as software processes that transform data. Some of the transformed data includes representations of real world items (e.g., a computer system configuration that includes photographs of real world objects, recorded video footage, recorded audio sounds, etc.) in some embodiments.

Software processes of some embodiments are specified as a set, or sets, of instructions recorded (or encoded) on a tangible computer readable storage medium (also referred to as computer readable medium). The computer readable storage medium of some embodiments is a tangible, physical article of manufacture. When the instructions recorded on the computer readable storage medium are executed by one or more computational element(s) (e.g., processors or other computational elements including application-specific integrated circuits ("ASICs") and/or field programmable gate arrays ("FPGAs")), the instructions cause the computational element(s) to perform the actions indicated by the instructions. In this specification, the term "computer" is meant in its broadest sense, and can include any electronic device with one or more processors. Examples of computer readable media include, but are not limited to, CD-ROMs, flash drives, RAM chips, hard drives, EPROMs, etc.

The term "software," as it used in this specification, is also meant in its broadest sense. Software can include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention.

Figure 28:
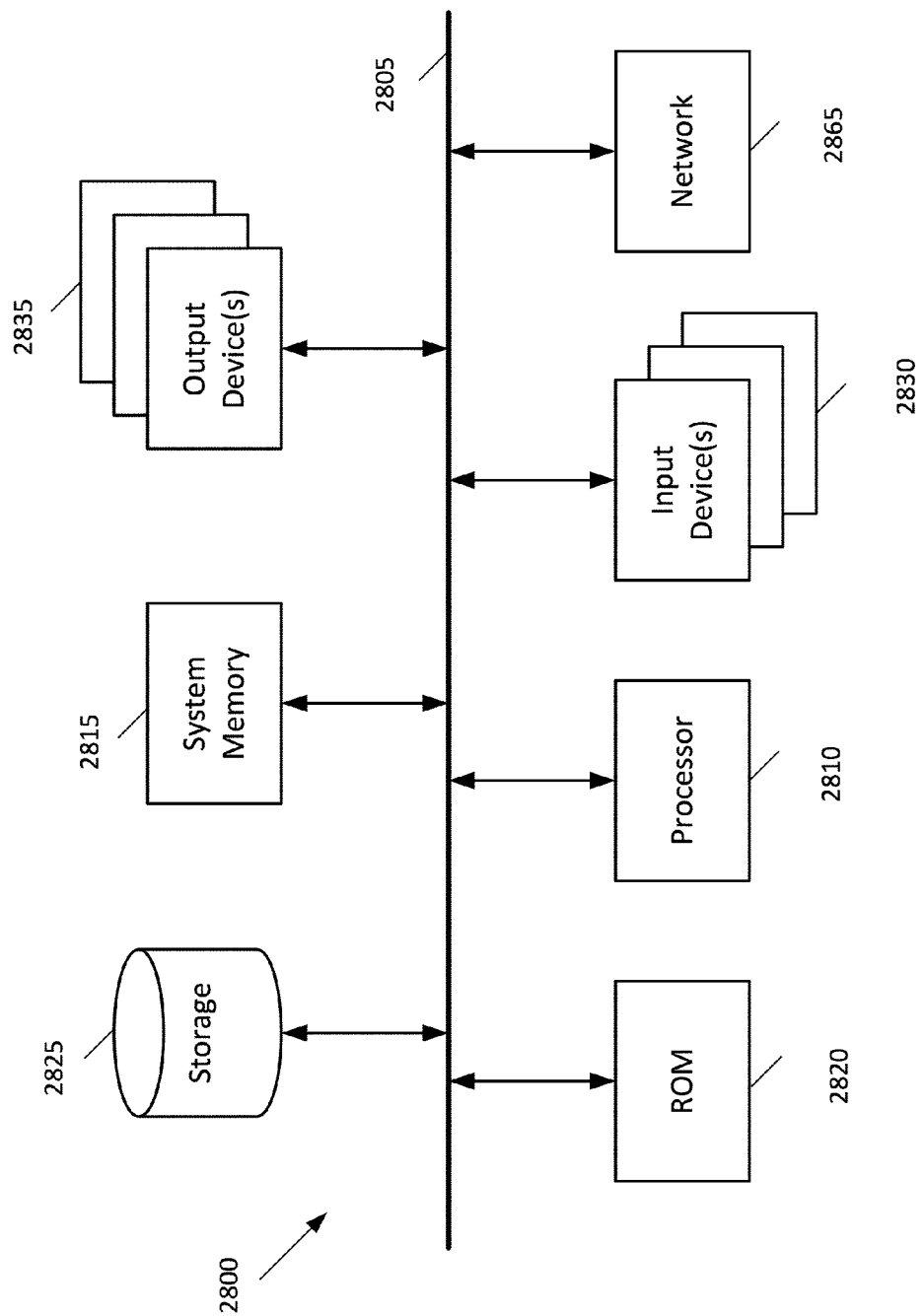
FIG. 28 conceptually illustrates a computer system with which some embodiments of the invention are implemented.

FIG. 28 illustrates a particular machine (e.g., a computer system) with which some embodiments of the invention are implemented. In some embodiments, the particular machine is a computer system that implements one or more specific functions of some embodiments of the above described processes (e.g., extraction, adaptation, etc.). Such a computer system includes various types of computer readable media and interfaces for reading various other types of computer readable media. Computer system 2800 includes a bus 2805, a processor 2810, a system memory 2815, a read-only memory 2820, a permanent storage device 2825, one or more input devices 2830, and one or more output devices 2835.

The bus 2805 collectively represents all system, peripheral, and chipset buses that communicatively connect the numerous internal devices of the computer system 2800. For instance, the bus 2805 communicatively connects the processor 2810 with the read-only memory 2820, the system memory 2815, and the permanent storage device 2825. From these various memory units, the processor 2810 retrieves instructions to execute and data to process in order to execute the processes of the invention.

The read-only-memory ("ROM") 2820 stores static data and instructions that are needed by the processor 2810 and other modules of the computer system. The permanent storage device 2825 of some embodiments, on the other hand, is a read-and-write memory device. This device is a non-volatile memory unit that stores instructions and data even when the computer system 2800 is off. Some embodiments of the invention use a mass-storage device (such as a magnetic or optical disk and its corresponding disk drive) as the permanent storage device 2825.

Other embodiments use a removable storage device (such as a floppy disk, flash drive, or ZIP® disk, and its corresponding disk drive) as the permanent storage device. Like the permanent storage device 2825, the system memory 2815 is a read-and-write memory device. However, unlike the permanent storage device 2825, the system memory 2815 of some embodiments is a volatile read-and-write memory, such a random access memory ("RAM"). The system memory 2815 stores some of the instructions and data that the processor needs at runtime. In some embodiments, the invention's processes are stored in the system memory 2815, the permanent storage device 2825, and/or the read-only memory 2820.

The bus 2805 also connects to the input and output devices 2830 and 2835. The input devices 2830 enable the user to communicate information and select commands to the computer system. The input devices 2830 include alphanumeric keyboards and/or pointing devices (also called "cursor control devices"). The input devices 2830 of some embodiments also include audio input devices (e.g., microphones, MIDI musical instruments, etc.). The output devices 2835 display images generated by the computer system. For instance, these output devices 2835 of some embodiments display a GUI. The output devices include printers and display devices, such as cathode ray tubes ("CRTs") or liquid crystal displays ("LCDs").

Finally, as shown in FIG. 28, the bus 2805 of some embodiments also couples computer 2800 to a network (not shown) through a network adapter 2865. In this manner, the computer can be a part of a network of computers (such as a local area network ("LAN"), a wide area network ("WAN"), an intranet, or a network of networks, such as the Internet. For example, the computer 2800 may be coupled to a web server (through the network adapter 2865) so that a web browser executing on the computer 2800 can interact with the web server as a user interacts with a GUI that operates in the web browser. Any or all components of the computer system 2800 may be used in conjunction with the invention.

As mentioned above, the computer system 2800 of some embodiments includes one or more of a variety of different computer-readable media. Some examples of such computer-readable media include, but are not limited to, tangible media such as RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable Blu-ray® discs, floppy disks, and any other optical or magnetic media. While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A non-transitory computer readable storage medium storing a computer program for execution by at least one processor of a node of a server hosting environment comprising a plurality of nodes, each node for using one or more hypervisors in order to host a plurality of configurations of a plurality of computer systems, the computer program comprising:

a set of instructions for receiving a first configuration of a computer system, the first configuration comprising an operating system that uses a source kernel that interfaces directly with hardware of the computer system;

a set of instructions for automatically identifying a kernel that interfaces with virtual hardware provided by a particular hypervisor of the node;

a set of instructions for automatically modifying the operating system to be compatible with the identified kernel when the identified kernel is not compatible with the operating system; and a set of instructions for installing on the node a second configuration comprising the operating system modified to use the identified kernel for interfacing with the virtual hardware provided by the particular hypervisor.

2. The non-transitory computer readable storage medium of claim 1, wherein the virtual hardware that interfaces with the identified kernel of the second configuration is a first set of virtual hardware, wherein a third configuration concurrently operates on the node and accesses a second, different set of virtual hardware provided by the particular hypervisor.

3. The non-transitory computer readable storage medium of claim 2, wherein the third configuration is based on a fourth configuration of a second, different computer system, wherein the third configuration comprises an operating system unmodified from the fourth configuration that is operable on the particular hypervisor.

4. The non-transitory computer readable storage medium of claim 2, wherein the third configuration comprises the same modified operating system as the first configuration, wherein the modified operating system of the third configuration uses the same identified kernel as the second configuration, said kernel of the third configuration for interfacing with the second set of different virtual hardware provided by the particular hypervisor.

5. The non-transitory computer readable storage medium of claim 2, wherein the particular hypervisor comprises (i) a first mapping of the first set of virtual hardware to a first set of physical hardware components of the node and (ii) a second mapping of the second set of virtual hardware to a second set of physical hardware components of the node, wherein a first virtual hardware component of the first set of virtual hardware is mapped to the same particular physical hardware component to which a second, different virtual hardware component of the second set of virtual hardware is mapped.

6. For a server hosting environment comprising a plurality of nodes, wherein a particular node comprises a hypervisor for hosting one or more computer system configurations, a method comprising:

receiving a configuration comprising a kernel, an operating system, and a set of device drivers, the configuration for directly accessing hardware of a computer system;

when the kernel is not compatible with virtual hardware provided by the hypervisor of the particular node, retrieving information for a compatible destination kernel from a kernel library storing different kernels for interfacing with different hardware on different platforms;

when one or more of the device drivers is not compatible with the destination kernel or a virtual hardware device of the hypervisor corresponding to the device driver, retrieving, for each incompatible device driver, information for a compatible destination device driver from a driver library storing different device drivers for interfacing with different kernels and different hardware on different platforms;

when the operating system is not compatible with the destination kernel, retrieving information for a compatible operating system from an operating system library storing different operating systems for interfacing with different kernels that access different hardware on different platforms; and adapting the configuration with the retrieved information in order for the adapted configuration to be operable on the hypervisor of the particular node for hosting the configuration within the server hosting environment.

7. The method of claim 6, wherein the adapted configuration uses the destination kernel which is retrieved from the kernel library and is different from the kernel of the received configuration in order to access the virtual hardware provided by the hypervisor of the particular node.

8. The method of claim 7, wherein the operating system of the received configuration is compatible with the destination kernel retrieved from the kernel library.

9. The method of claim 7, wherein the operating system of the received configuration is not compatible with the destination kernel retrieved from the kernel library, wherein the adapted configuration uses the compatible operating system which is retrieved from the operating system library.

10. The method of claim 6, wherein each device driver of the received configuration directly interfaces with a physical hardware component of the computer system, wherein the adapted configuration uses a set of destination device drivers retrieved from the driver library, wherein each destination device driver of the adapted configuration directly interfaces with a virtual hardware component that is mapped to a physical hardware component of the particular node.

11. For a server hosting environment comprising a plurality of nodes, each node for using one or more hypervisors in order to host a plurality of configurations of a plurality of computer systems, a method comprising:

receiving a first configuration of a computer system, the first configuration comprising an operating system that directly accesses hardware of the computer system with a set of device drivers compatible with the operating system, each device driver corresponding to a hardware device of the computer system;

for a particular destination node in the plurality of nodes, automatically identifying a virtual hardware device provided by a particular hypervisor that does not correspond to any device driver in the set of device drivers of the first configuration;

automatically replacing a device driver in the set of device drivers with a compatible device driver that corresponds to the virtual hardware device, the replaced device driver incompatible with the virtual hardware device; and installing on the particular destination node a second configuration comprising the operating system and the compatible device driver in order to allow the second configuration to operate on the particular destination node using the compatible device driver to access the virtual hardware device provided by the particular hypervisor.

12. The method of claim 11, wherein the first configuration further comprises a first kernel that interfaces with the operating system of the first configuration and the hardware of the computer system, wherein the method further comprises modifying the first kernel in order to generate a second kernel that interfaces with the operating system and a set of virtual hardware provided by the particular hypervisor.

13. The method of claim 11, wherein the particular hypervisor provides a set of virtual hardware devices that each corresponds to a device driver in the set of device drivers of the first configuration, wherein the second configuration further comprises the set of device drivers to allow the operating system of the second configuration to access the set of virtual hardware devices.

14. The method of claim 13, wherein the particular hypervisor comprises a mapping of the set of virtual hardware devices to a set of physical hardware devices of the particular destination node.

15. The method of claim 11, wherein automatically replacing the device driver comprises:

determining, among a particular set of device drivers stored in a driver library, whether any device driver in the driver library is compatible with the operating system and the virtual hardware device; and retrieving, when a particular device driver in the driver library is determined to be compatible, the particular compatible device driver from the driver library.

16. The method of claim 15, wherein automatically replacing the device driver further comprises generating, when no device driver in the driver library is determined to be compatible, the particular compatible device driver using one of a kernel driver API and a development environment.

17. A method comprising:

remotely accessing a computer system;

from the computer system, extracting a configuration comprising an operating system and a set of device drivers that directly access a first set of physical hardware of the computer system;

generating a first configuration package comprising the operating system and the set of device drivers of the configuration; and providing the first configuration package to an adaptation engine that (1) creates a second configuration package that is a modified version of the first configuration package with different device drivers for accessing a set of virtual hardware corresponding to a second set of physical hardware of a node of a hosting environment that comprises a plurality of nodes for hosting a plurality of configurations, and (2) supplies the second configuration package to the node in order to allow the node to host the configuration.

18. The method of claim 17, wherein the computer system is accessed remotely from a node of the hosting environment by logging into the computer system using a set of predefined log-in parameters.

19. The method of claim 17, wherein extracting the configuration comprises analyzing a file system of the computer system to identify the operating system and the set of device drivers.

20. The method of claim 17, wherein the plurality of nodes form a grid of nodes over which the plurality of configurations are hosted, wherein a particular configuration in the plurality of configurations is logically hosted by a set of two nodes in the grid of nodes.

* * * * *